US012783108B2

(12) United States Patent
Adams

(10) Patent No.: US 12,783,108 B2
(45) Date of Patent: Nov. 3, 2026

(54) MODELING AND MANAGING SYSTEM INFRASTRUCTURE

(71) Applicant: Effodio, Inc., Santa Clara, CA (US)

(72) Inventor: Robert Edward Adams, Santa Clara, CA (US)

(73) Assignee: Effodio, Inc., Santa Clara, CA (US)

( * ) Notice: Subject to any disclaimer, the term of this patent is extended or adjusted under 35 U.S.C. 154(b) by 89 days.

(21) Appl. No.: 18/900,249

(22) Filed: Sep. 27, 2024

(65) Prior Publication Data

US 2025/0119357 A1 Apr. 10, 2025

Related U.S. Application Data

(60) Provisional application No. 63/588,227, filed on Oct. 5, 2023.

(51) Int. Cl.
*G06F 3/0484* (2022.01)
*G06F 3/0482* (2013.01)
(Continued)

(52) U.S. Cl.
CPC .......... *G06F 3/0484* (2013.01); *G06F 3/0482* (2013.01); *G06F 3/04842* (2013.01);
(Continued)

(58) Field of Classification Search
CPC ..... H04L 43/08; H04L 41/145; G06F 3/0484; G06F 3/0482; G06F 3/04842; G06F 3/04845
(Continued)

(56) References Cited

U.S. PATENT DOCUMENTS

2014/0280204 A1* 9/2014 Avery .................. G06F 16/245
707/748
2017/0154026 A1 6/2017 Gong et al.
(Continued)

FOREIGN PATENT DOCUMENTS

WO 2019099558 A1 5/2019

OTHER PUBLICATIONS

International Search Report and Written Opinion dated Dec. 20, 2024, (Applicant first notified on Dec. 16, 2024) for Application No. PCT/US2024/049639.

(Continued)

*Primary Examiner* — Zi Ye
(74) *Attorney, Agent, or Firm* — Weaver Austin Villeneuve & Sampson LLP

(57) ABSTRACT

An abstract system model comprising one or more model elements corresponding to one or more infrastructure elements of a deployed system infrastructure is generated. Each model element specifies one or more selectors, and for each model element, each selector includes an indication of at least one infrastructure element that is associated with the model element. An inventory of the one or more infrastructure elements is built. For at least one model element, at least one infrastructure element of the inventory associated with the at least one model element is identified as indicated by the respective one or more selectors of the at least one model element. A bound system model comprising one or more associations between the model elements of the abstract system model and the inventory of the infrastructure elements is generated.

20 Claims, 45 Drawing Sheets

(51) Int. Cl.

| | |
|---|---|
| ***G06F 3/04842*** | (2022.01) |
| ***G06F 3/04845*** | (2022.01) |
| ***H04L 41/14*** | (2022.01) |
| ***H04L 43/08*** | (2022.01) |

(52) U.S. Cl.
CPC ........ *G06F 3/04845* (2013.01); *H04L 41/145* (2013.01); *H04L 43/08* (2013.01)

(58) Field of Classification Search
USPC .......................................................... 709/224
See application file for complete search history.

(56) References Cited

U.S. PATENT DOCUMENTS

| | | | |
|---|---|---|---|
| 2020/0084112 | A1 | 3/2020 | Kandaswamy et al. |
| 2020/0104401 | A1 | 4/2020 | Burnett et al. |
| 2021/0019194 | A1* | 1/2021 | Bahl .................. H04L 67/1031 |
| 2021/0028993 | A1* | 1/2021 | Kavadimatti ....... G06F 11/3466 |
| 2022/0006701 | A1 | 1/2022 | Patel et al. |
| 2022/0075515 | A1 | 3/2022 | Floren et al. |
| 2023/0011736 | A1 | 1/2023 | Chitalia et al. |
| 2025/0117118 | A1 | 4/2025 | Adams et al. |
| 2025/0117124 | A1 | 4/2025 | Adams et al. |

OTHER PUBLICATIONS

International Search Report and Written Opinion dated Feb. 6, 2025, (Applicant first notified on Feb. 1, 2025) for Application No. PCT/US2024/049638.

International Search Report and Written Opinion dated Jan. 22, 2025, (Applicant first notified on Jan. 19, 2025) for Application No. PCT/US2024/049642.

Juniper Networks: Apstra 4.0 User Guide, Juniper Networks, Accessed Nov. 6, 2024.

Prometheus: Querying Basics, Prometheus Documentation, Accessed Nov. 6, 2024.

International Preliminary Report on Patentability and Written Opinion dated Apr. 16, 2026 in PCT Application No. PCT/US2024/049638.

International Preliminary Report on Patentability and Written Opinion dated Apr. 16, 2026 in PCT Application No. PCT/US2024/049639.

International Preliminary Report on Patentability and Written Opinion dated Apr. 16, 2026 in PCT Application No. PCT/US2024/049642.

* cited by examiner

510

```
{
 "elements": {
  "1bad88d4-472b-45bd-930e-79b7204954ad": {
   "id": "1bad88d4-472b-45bd-930e-79b7204954ad",
   "name": "FooService"
   "selectors": [{
    "types": ["AWSEC2Instance"],
    "matches": [{
     "operator": "In",
     "key": "service",
     "values": ["foo"]
    }]
   }]
  }
 }
}
```

FIG. 5B

630

```
{
 "elements": {
  "1bad88d4-472b-45bd-930e-79b7204954ad": {
   "id": "1bad88d4-472b-45bd-930e-79b7204954ad",
   "name": "FooService"
   "selectors": [{
        "types": ["AWSEC2Instance"],
        "matches": [{
        "key": "service",
        "operator": "In",
        "values": ["foo"]
        }]
}]

"indicators": {
 "e7de9407-780e-4864-9424-f890535c8f27": {
  "name": "CPUUtilization",
  "metrics": [{
   "id": "f9f0c974-f793-4e8c-8ffc-f82ef36a0c48",
   "selectors": [
        "types": ["AWSCloudwatchMetric"],
        "matches": [{
                "key": "Name",
                "operator": "In",
                "values": ["CPUUtilization"]
        },
         {
        "key": "InstanceId",
        "operator": "In",
        "values": ["${parent.InstanceId}"]
        }
      ]
    ]
 }]
}
```

FIG. 6B

MODELING AND MANAGING SYSTEM INFRASTRUCTURE

RELATED APPLICATIONS

This application claims the benefit of U.S. Provisional Application No. 63/588,227, filed Oct. 5, 2023, entitled "MODEL RESOLUTION, MODEL-DRIVEN DASHBOARDING, AND DATA PROCESSING," which is assigned to the assignee hereof, and incorporated herein in its entirety by reference.

FIELD

The present disclosure relates generally to modeling and managing information technology (IT) system infrastructure.

BACKGROUND

Companies generally rely on robust monitoring of their information technology (IT) infrastructure to proactively identify and resolve issues before they impact customers or business operations. A key aspect of such monitoring involves analyzing system logs. System logs often provide detailed records of events, errors, warnings, and other diagnostic information across various components of the IT infrastructure. By centralizing and analyzing these logs, often using log management platforms, companies can gain visibility into the health and performance of their systems. Alerts can be configured to notify IT teams if certain log events or patterns are detected that may indicate a developing problem. Although automated tools may be used to perform aspects of log analysis, manual log analysis by skilled engineers remains an important part of troubleshooting complex IT infrastructures. In general, engineers tasked with troubleshooting IT infrastructures will evaluate logs generated by components of the IT infrastructure to identify error messages, pinpoint the root cause of issues, uncover hidden correlations between events, and trace problems across interconnected components or services.

BRIEF SUMMARY

A system of one or more computers can be configured to perform particular operations or actions by virtue of having software, firmware, hardware, or a combination of them installed on the system that in operation causes or cause the system to perform the actions. One or more computer programs (or engines) can be configured to perform particular operations or actions by virtue of including instructions that, when executed by data processing apparatus, cause the apparatus to perform the actions. One general aspect includes a method of modeling a deployed system infrastructure of a cloud computing environment. The method also includes generating, by one or more processors, an abstract system model may include one or more model elements corresponding to one or more infrastructure elements of the deployed system infrastructure, where: each model element of the one or more model elements specifies one or more selectors, and for each model element of the one or more model elements, each selector of the respective one or more selectors of the model element includes an indication of at least one infrastructure element, from the one or more infrastructure elements, that is associated with the model element. The method also includes building, by the one or more processors, an inventory of the one or more infrastructure elements. The method also includes for at least one model element of the one or more model elements, identifying, by the one or more processors, the at least one infrastructure element of the inventory associated with the at least one model element as indicated by the respective one or more selectors of the at least one model element. The method also includes generating, by the one or more processors, a bound system model may include one or more associations between the one or more model elements of the abstract system model and the inventory of the one or more infrastructure elements, where the one or more associations are determined based at least in part on the identified at least one infrastructure element of the inventory associated with the at least one model element. The method also includes outputting, by the one or more processors, data indicative of a status of the deployed system infrastructure, an incident occurring within the deployed system infrastructure, or both, the data generated using the bound system model. Other embodiments of this aspect include corresponding computer systems, apparatus, and computer programs recorded on one or more computer storage devices, each configured to perform the actions of the methods.

Implementations may include one or more of the following features. The method where the one or more infrastructure elements may include: one or more physical elements of the deployed system infrastructure, one or more virtual elements of the deployed system infrastructure, or a combination thereof. Building the inventory of the one or more infrastructure elements may include obtaining information regarding the one or more infrastructure elements from: a service hosting the deployed system infrastructure, an application programming interface (API), or a combination thereof. The respective one or more selectors of the at least one model element include, in the indication of the at least one infrastructure element associated with the at least one model element, one or more aspects of an ancestor element, the one or more aspect of the ancestor element used to determine the one or more associations between the one or more model elements of the abstract system model and the inventory of the one or more infrastructure elements. The one or more aspects of the ancestor element may include: a label of the ancestor element, a property of the ancestor element, or a combination thereof. Identifying the at least one infrastructure element of the inventory associated with the at least one model element may include: (i) evaluating a first portion of the respective one or more selectors of the at least one model element that do not reference to the ancestor element, (ii) subsequent to operation (i), evaluating a second portion of the respective one or more selectors of the at least one model element that reference the ancestor element, and (iii) repeating operations (i) and (ii) until all of the respective one or more selectors of the at least one model element are evaluated. Identifying the at least one infrastructure element of the inventory associated with the at least one model element may include using: a label-based match, a query, a heuristic, or a combination thereof. The respective one or more selectors of the at least one model element include, in the indication of the at least one infrastructure element associated with the at least one model element, one or more variables to substitute for one or more aspects of an ancestor element of the at least one model element. The at least one model element may include a stream of telemetry associated with an ancestor element, the stream of telemetry may include: a metric, a log, an event trace, or a combination thereof. A child element may include a relationship between abstract system model elements and/or inventory elements. The method may include updating the bound system model in response to a detected change in the inventory of the one or more infrastructure elements. The method may include maintaining a history indicative of times at which the bound system model is updated. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes providing. The providing also includes define at least one selector, the at least one selector may include a rule, used by the one or more processors, for binding a set of one or more infrastructure elements of the deployed system infrastructure to a first model element of the one or more model elements; and define at least one indicator used by the one or more processors to identify at least one stream of metric data for the first model element from a metric data source. The providing also includes responsive to receiving user input defining the at least one selector, binding, with the one or more processors, the set of one or more infrastructure elements to the first model element. The providing also includes responsive to receiving user input defining the at least one indicator, identifying, with the one or more processors, the at least one stream of metric data for the first model element. The providing also includes updating the GUI, with the one or more processors, to include a representation of: the set of one or more infrastructure elements bound to the first model element, and the at least one indicator. Other embodiments of this aspect include corresponding computer systems, apparatus, and computer programs recorded on one or more computer storage devices, each configured to perform the actions of the methods.

Implementations may include one or more of the following features. The method where the GUI is further configured to enable a user to define a state of the first model element based on metric data from the at least one stream of metric data. The method may include, responsive to receiving user input defining the state of the first model element: determining, with the one or more processors, the first model element is in the state; and updating the GUI, with the one or more processors, to include a representation of first model element being in the state. The state of the first model element is based on whether a condition is satisfied, and where the one or more processors use the metric data to determine whether the condition is satisfied. The GUI is configured to enable a user to define a relationship between the first model element and a second model element of the one or more model elements, and where the method further may include, responsive to receiving user input defining the relationship, updating the GUI, with the one or more processors, to include a representation of the relationship. The relationship indicates how the state of the first model element impacts the second model element, how a state of the second model element impacts the first model element, or both. the method where the one or more model elements further include one or more child elements of the first model element and where the relationship further indicates how a state of the one or more child elements impacts the second model element, how a state of the second model element impacts the one or more child elements, or both. The GUI is configured to enable a user to view historical data indicative of the state of the first model element at previous moments in time. The metric data may include data indicative of: a root cause of an incident in the deployed system infrastructure, a cost associated with operating the deployed system infrastructure, or any combination thereof. The metric data source may include a metric data source of the set of one or more infrastructure elements, a metric data source other than the set of one or more infrastructure elements, or both. To enable a user to define the at least one selector, the GUI is configured to display an inventory of infrastructure elements, including the set of one or more infrastructure elements. The GUI is configured to provide an apparent state simulating a failure condition or incident based on user input specifying information about a hypothetical system state. The GUI is configured to enable a user to view a hypothetical state of a deployed system infrastructure by adjusting one or more states of the one or more model elements. Implementations of the described techniques may include hardware, a method or process, or computer software on a computer-accessible medium.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes accessing. The accessing also includes providing, using the one or more processors, a graphical user interface (GUI), where the GUI provides options to visually construct a metric pipeline template to be associated with the bound system model. The accessing also includes determining, using the one or more processors, a definition for the metric pipeline template based at least in part on user input via the GUI, where the metric pipeline template may include a plurality of nodes that process inputs to generate derived metrics. The accessing also includes establishing, using the one or more processors, a link between at least one data source associated with the deployed system infrastructure and the metric pipeline template based on user input via the GUI. The accessing also includes generating, using the one or more processors, one or more derived metrics based at least in part on metric data obtained based on the link established between the at least one data source and the metric pipeline template. Other embodiments of this aspect include corresponding computer systems, apparatus, and computer programs recorded on one or more computer storage devices, each configured to perform the actions of the methods.

Implementations may include one or more of the following features. The method where the GUI provides options to define the metric pipeline template as one or more input nodes, one or more analysis nodes, and one or more output nodes. Establishing the link between the at least one data source associated with the deployed system infrastructure and the metric pipeline template may include: defining the at least one data source as a source connection for the at least one input node included in the metric pipeline template. The at least one data source is an indicator that is defined to select a set of metrics from the one or more data sources associated with the deployed system infrastructure. The one or more analysis nodes includes a metric operation node that is configured to apply a metric operation that converts a first time series to a second time series. The metric operation includes one of: a maximum value in a time window, a minimum value in a time window, a standard deviation over a time window, a percentile over a time window, an increase over a time window, or a rate of increase over a time window. The one or more analysis nodes includes a combiner node that is configured to apply a metric operation to combine multiple time series into a single value. The metric operation includes one of: a summation, an average, or converting a count into a rate. The link between at least one data source associated with the deployed system infrastructure and the metric pipeline template is defined for a first model element of the abstract system model. The one or more derived metrics are provided in association with the first model element of the abstract system model, and where the GUI provides one or more graphs that plot the one or more derived metrics over a window of time. Implementations of the described techniques may include hardware, a method or process, or computer software on a computer-accessible medium.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

FIGS. 5A-5B illustrate an example model element definition and related JSON code according to some embodiments.

FIGS. 6A-6B illustrate another example model element definition and related JSON code according to some embodiments.

Like reference symbols in the various drawings indicate like elements, in accordance with certain example implementations. In addition, multiple instances of an element may be indicated by following a first number for the element with a letter or a hyphen and a second number. For example, multiple instances of an element 110 may be indicated as 110-1, 110-2, 110-3, etc. or as 110*a*, 110*b*, 110*c*, etc. When referring to such an element using only the first number, any instance of the element is to be understood (e.g., element 110 in the previous example would refer to elements 110-1, 110-2, and 110-3 or to elements 110*a*, 110*b*, and 110*c*).

DETAILED DESCRIPTION

In modern cloud-based system infrastructure, applications are often designed using a distributed architecture where various components and processes run on different physical and cloud-based systems. This architectural approach allows for greater flexibility, scalability, and resilience compared to traditional monolithic systems.

With so many components running various processes, monitoring and managing such system infrastructure efficiently is challenging, but necessary to maximize system uptime. Further, the monitoring and management of system infrastructure should be done in a timely manner to reduce downtime. However, conventional approaches that rely on manual analysis of system logs to identify issues are limited and typically result in a longer mean time-to-insight metric, which is a measure of the amount of time it takes to identify a problem within a deployed system infrastructure from the time an alert is generated. Given increasing cybersecurity threats against both physical and cloud-based computing systems, there exists an urgent need for an improved solution to better visualize and manage deployed system infrastructure, so that any incidents can be addressed proactively with a shorter mean time-to-insight metric.

Figure 1:
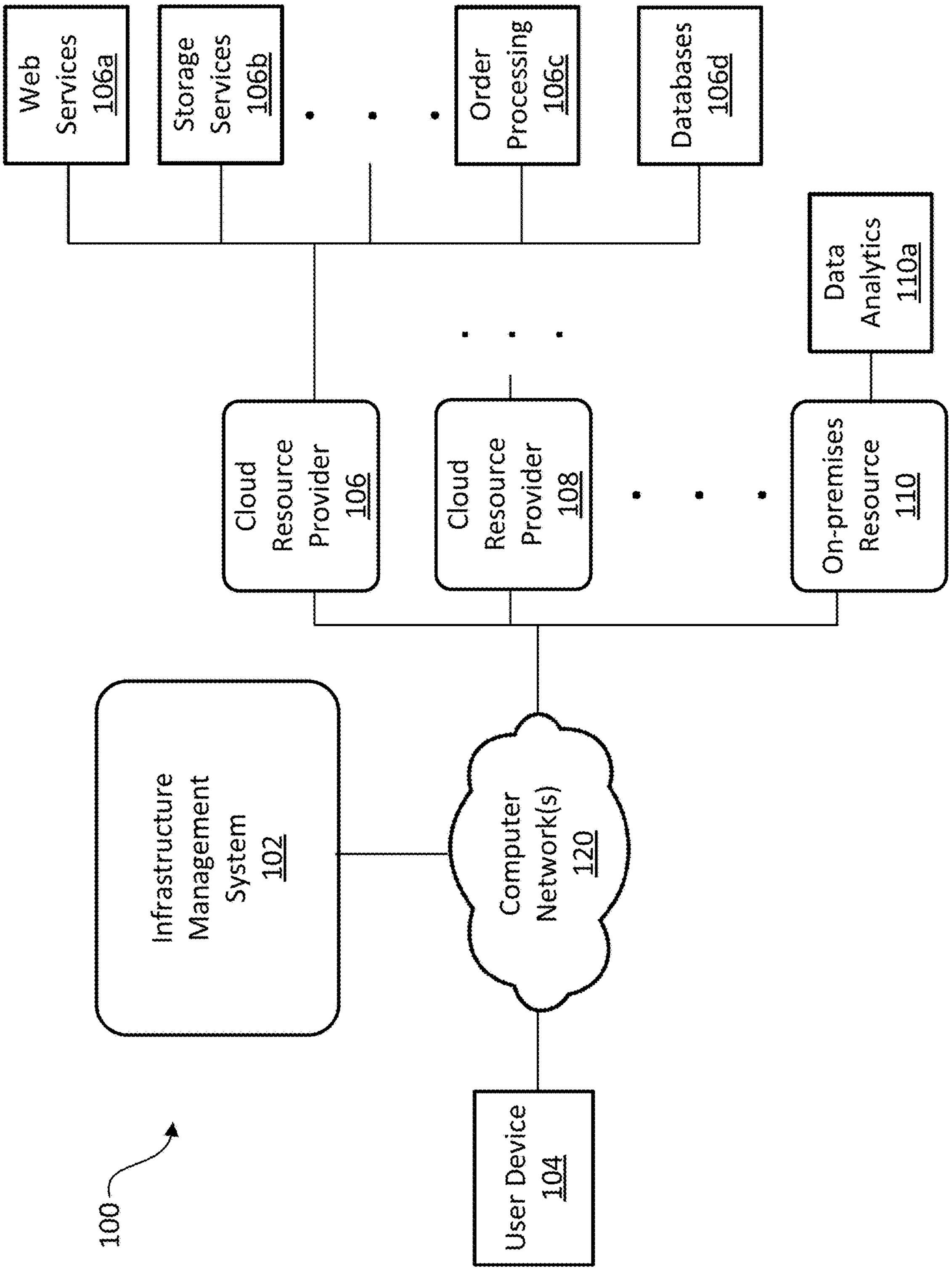
FIG. 1 is a block diagram of an example computing environment according to some embodiments.

A claimed solution described herein provides an improved solution that is rooted in computer technology in order to overcome a problem specifically arising in the realm of computer networks. For example, FIG. 1 is a block diagram of an example computing environment 100 in accordance with embodiments described herein. The computing environment 100 may enable entities (e.g., users, companies, organizations, etc.) to build and deploy system infrastructure in a physical, cloud, or hybrid computing environment.

In this example, the computing environment 100 includes an infrastructure management system 102, a user device 104, a cloud resource provider 106, a cloud resource provider 108, and on-premises resources 110, all of which can communicate electronically over one or more computer networks 120 (e.g., the Internet).

The cloud resource provider 106 may be a cloud computing provider that provides functionality for provisioning cloud computing instances that run various applications or services, such as web services 106*a*, storage services 106*b*, order processing 106*c*, databases 106*d*, inventory management systems, recommendation engines, payment processing, shipping processing, data analytics, among others.

The cloud resource provider 108 may be a different cloud computing provider that provides similar functionality for provisioning cloud computing instances that run various applications or services. The on-premises resource 110 may be one or more computing systems that are housed at a location outside of the cloud.

Each resource (e.g., cloud instances, servers, etc.) and any applications or services running on that resource may output various types of metric data, including CPU utilization, memory usage, disk input-out (I/O), network traffic, log messages generated by applications running on the resource (or application logs), log messages generated by the operating system running on the resource, among others.

For example, a system infrastructure on which an e-commerce application runs may consist of multiple infrastructure elements that work together. The front-end processes, such as the website or mobile app, may serve a user interface for presenting products, handling user interactions, and facilitating the shopping experience. These front-end components can be deployed on instances running web services 106*a* through the cloud resource provider 106. The back-end processes of the e-commerce application may be run on multiple instances from different cloud resource providers to handle critical tasks, such as order processing 106*c*, databases 106*d*, inventory management, shipping processing, payment processing, data analytics, among others.

Over time, the number of instances allocated to a particular application or service may change. For example, instances may be added when there is a spike in demand and similarly removed when demand is low. Such recurring changes within a deployed system infrastructure can make it difficult to maintain a real-time model of the system infrastructure that permits low-level insight and management into any instances in a deployed system infrastructure including any applications and services running on those instances.

The infrastructure management system 102 may be configured to provide functionality for modeling and managing deployed system infrastructure to enable granular-level insight and management of instances, applications, services, among other operations. Further details describing the infrastructure management system 102 are provided in reference to FIG. 2.

Figure 2:
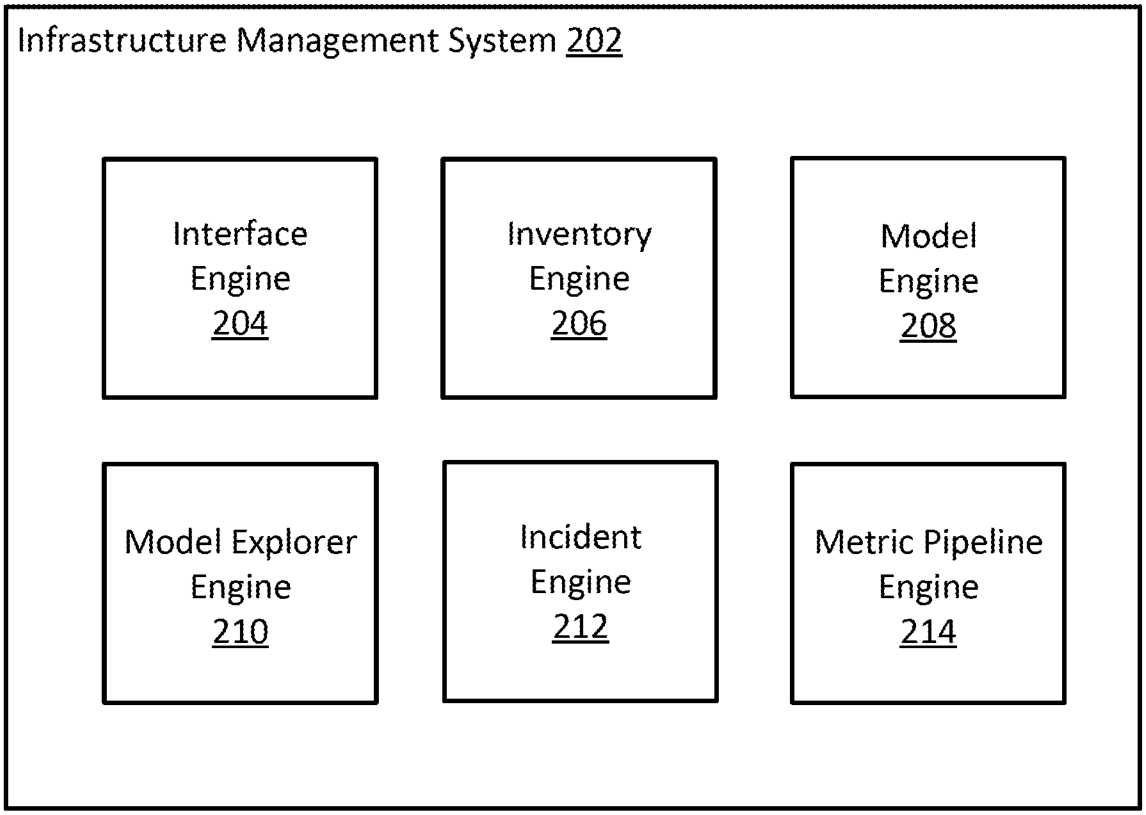
FIG. 2 is a block diagram of components of an infrastructure management system according to some embodiments.

FIG. 2 depicts a block diagram of an example infrastructure management system 202 according to some embodiments. The infrastructure management system 202 may be implemented in a computing system that includes at least one processor, memory, and communication interface. The computer system can execute software, such as system infrastructure management software, which performs any number of functions described in relation to FIG. 2.

The infrastructure management system 202 includes an interface engine 204, an inventory engine 206, a model engine 208, a model explorer engine 210, an incident engine 212, and a metric pipeline engine 214.

The interface engine 204 may provide an interface (e.g., a graphical user interface) to enable users to perform various functionality as described herein.

In some embodiments, the interface engine 204 may provide an interface through which a user can specify any data sources associated with a deployed system infrastructure. The data sources may provide system logs from physical servers or any information that may be retrieved via an application programming interface (API). As an example, the deployed system infrastructure may run on instances from a particular cloud resource provider. In this example, the user may interact with the interface to identify that cloud resource provider and provide any related details (e.g., credentials, APIs, etc.) needed to obtain information about those instances. The data sources may be used to build an inventory of elements associated with the deployed system infrastructure, as described below in relation to the inventory engine 206.

In some embodiments, the interface engine 204 may provide a model editor through which a user can specify (or define) an abstract system model of the deployed system infrastructure. The abstract system model may be represented as a block diagram that consists of model elements. A model element may represent an application, service, or logical entity associated with the deployed system infrastructure.

Figure 3:
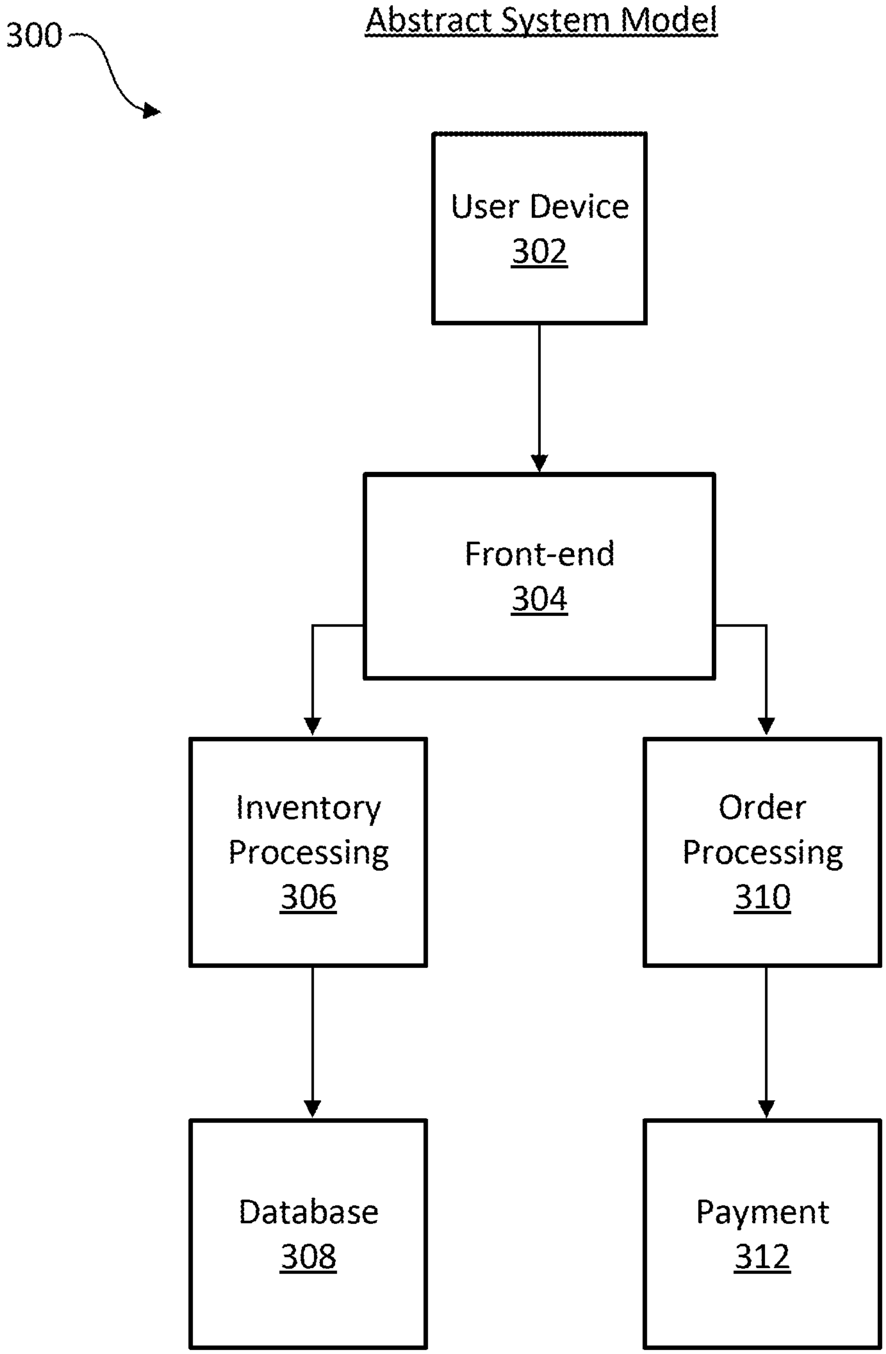
FIG. 3 is a block diagram of an example abstract system model according to some embodiments.

For example, FIG. 3 illustrates an example abstract system model 300 for a deployed system infrastructure that supports an e-commerce application. In FIG. 3, the abstract system model 300 includes model elements that correspond to various logical components of the system infrastructure. For example, a model element 304 corresponds to front-end functionality that interacts with a user device 302. The front-end may include various cloud-based resources, such as compute instances, which provide functionality for hosting the e-commerce application. Further, a model element 306 corresponds to inventory processing functionality that supports the system infrastructure, a model element 308 corresponds to database functionality that supports the system infrastructure, a model element 310 corresponds to order processing functionality that supports the system infrastructure, and a model element 312 corresponds to payment functionality that supports the system infrastructure. The interface engine 204 may provide an interface that allows a user to define selectors and indicators for each model element, as discussed herein.

Figure 4:
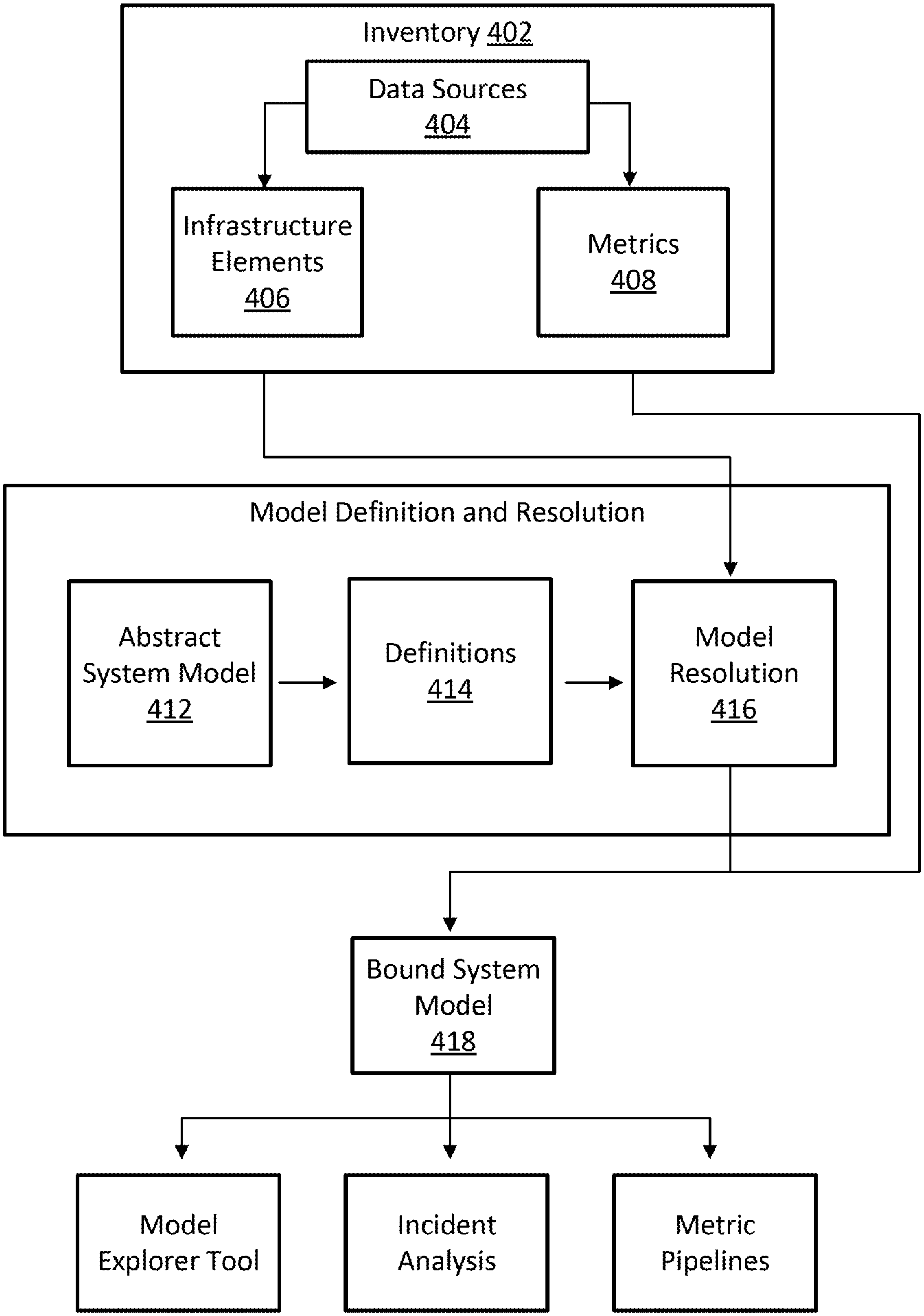
FIG. 4 is a block diagram of example operations that may be performed by an infrastructure management system according to some embodiments.

The inventory engine 206 may be configured to build an inventory of the deployed system infrastructure, as illustrated in the example of FIG. 4. The inventory 402 may identify infrastructure elements 406 associated with the deployed system infrastructure. For example, an infrastructure element may reference a physical or virtual computing system, such as a cloud compute instance. The inventory engine 206 may build the inventory 402 based on any data sources 404 that were identified by a user. For example, the inventory engine 206 may make calls through various cloud-based application programming interfaces (APIs) to identify compute instances that are present in the deployed system infrastructure at a given time. As examples, the APIs may be provided by cloud resource providers (e.g., Amazon Web Services®, Azure®, Google Cloud Platform®, etc.) or deployment frameworks, such as Kubernetes.

The inventory 402 may also identify a list of metrics 408 that are retrievable from each of the infrastructure elements 406. As an example, the list of metrics 408 can include any information that can be retrieved from an instance via a ListMetrics API call. For example, the list of metrics 408 may include information relating to CPU utilization, memory usage, disk I/O, network traffic, cloud metrics, web services, inventory management, shipping processing, payment processing, databases, storage services, among others.

In some embodiments, the inventory 402 may be defined as a schema that includes a set of inventory elements. For example, the inventory 402 may include the following elements:

ID: a unique ID,

Source ID: identifies a data source in which the inventory element was identified, Type: a type for the inventory element, such as AWS EC2 instance, Name: a human-readable name for the inventory element, and Key: a unique key for the inventory element appropriate for its type.

In addition, for each inventory element, the inventory engine 206 may keep track of a set of labels for the inventory element over time in the form of an inventory details item. The inventory details item allows properties like tags or other fields to change over time. For example, the inventory details may include the following:

Element ID: the inventory element ID,

Start time: the time when the inventory element was discovered,

End time: the time when the inventory element was removed, and

Labels: a set of key/value pairs associated with the inventory element.

In general, a single inventory detail item exists for a given instance at a given time. Further, an inventory detail may be active over some interval [start time, end time]. In various embodiments, the inventory schema may be used to determine a state of the inventory 402 at a particular moment in time by looking at the start and end times in the inventory details.

When built, the inventory 402 represents all of the potential sources of information (or telemetry) that are available to be accessed and processed to facilitate real-time monitoring and management of the deployed system infrastructure. In various embodiments, the inventory engine 206 may periodically (e.g., every second, minute, hour, etc.) update the inventory 402 by polling the data sources, so that any changes in the deployed system infrastructure, such as the addition or deletion of an instance, can be recognized at or near real-time.

The model engine 208 may be configured to perform various functionality in relation to modeling and managing the deployed system infrastructure.

In various embodiments, the model engine 208 may enable users to define selectors provided in the abstract system model 300. For example, a model element may be associated with one or more selectors. In some embodiments, a selector operates as a live query that can be used to match a model element to an infrastructure element included in the inventory 402.

A model element may be associated with a logical entity in the deployed system architecture, as defined in the abstract system model 300, such as front-end service. Further, a model element may also be associated with any individual instances that are assigned to the logical entity. For example, the model element 304 may be associated with a front-end service as well as any cloud instances that are running to support the front-end service.

Figure 5A:
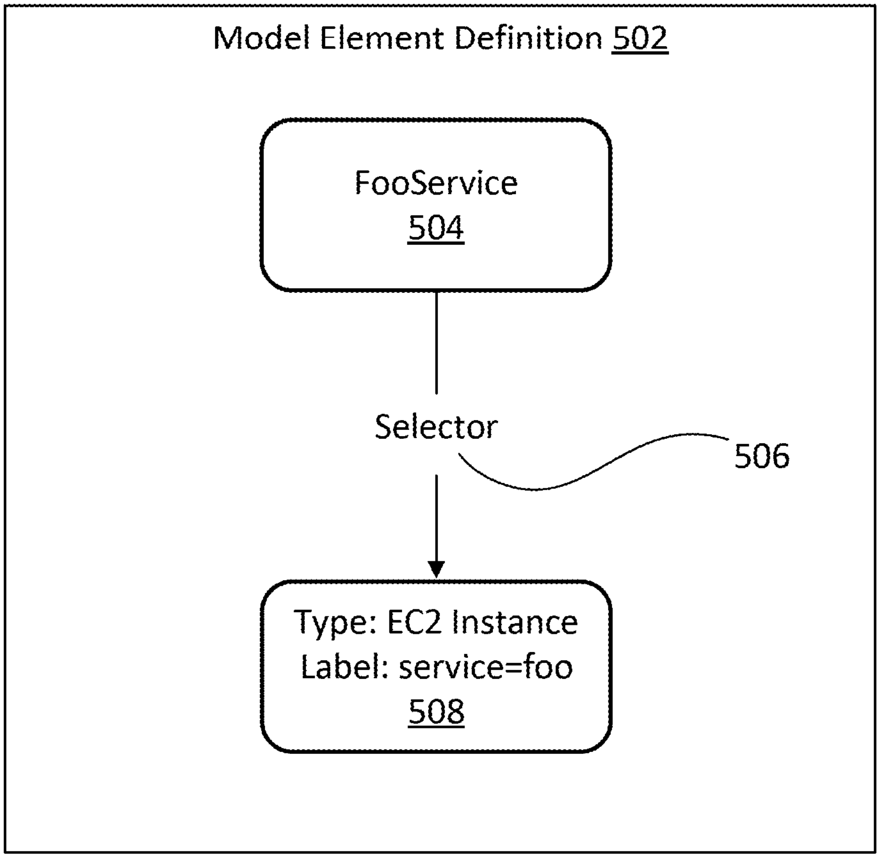

When defining a selector for a model element, a user may define matching criteria that can be used to match the selector to infrastructure elements in the inventory 402. For example, FIG. 5A illustrates an example model element definition 502 for a service 504 called FooService. In this example, a selector 506 is defined for the service 504. The selector 506 is associated with matching criteria 508 for matching the selector 506 to infrastructure elements in the inventory 402. In various embodiments, the matching criteria may be expressed as a label-based match (or query) and/or a heuristic. In the example of FIG. 5A, the matching criteria 508 is defined to identify any EC2 cloud computing instances in the deployed system infrastructure that are associated with a "service" label having a value of "foo". As an example, the model element definition 502 may be expressed in JavaScript Object Notation (JSON) 510, as shown in FIG. 5B.

In various embodiments, model elements may be organized hierarchically. That is, a model element may have one or more "parent" (or ancestor) model elements and/or "child" model elements. A selector may use one or more aspects of an ancestor model element to assist in matching one or more child model element. For example, matching criteria for the selector may utilize any combination of labels, properties, or characteristics associated with the ancestor model element.

The model engine 208 may also enable users to define indicators for model elements. In some embodiments, an indicator operates as a live query that can be used to retrieve information associated with one or more infrastructure elements, such as metrics, data, or any other telemetry that may be available from the specified data sources. Such information may inform the health of a given infrastructure element as well as the health of a service that is supported by that infrastructure element.

Figure 6A:
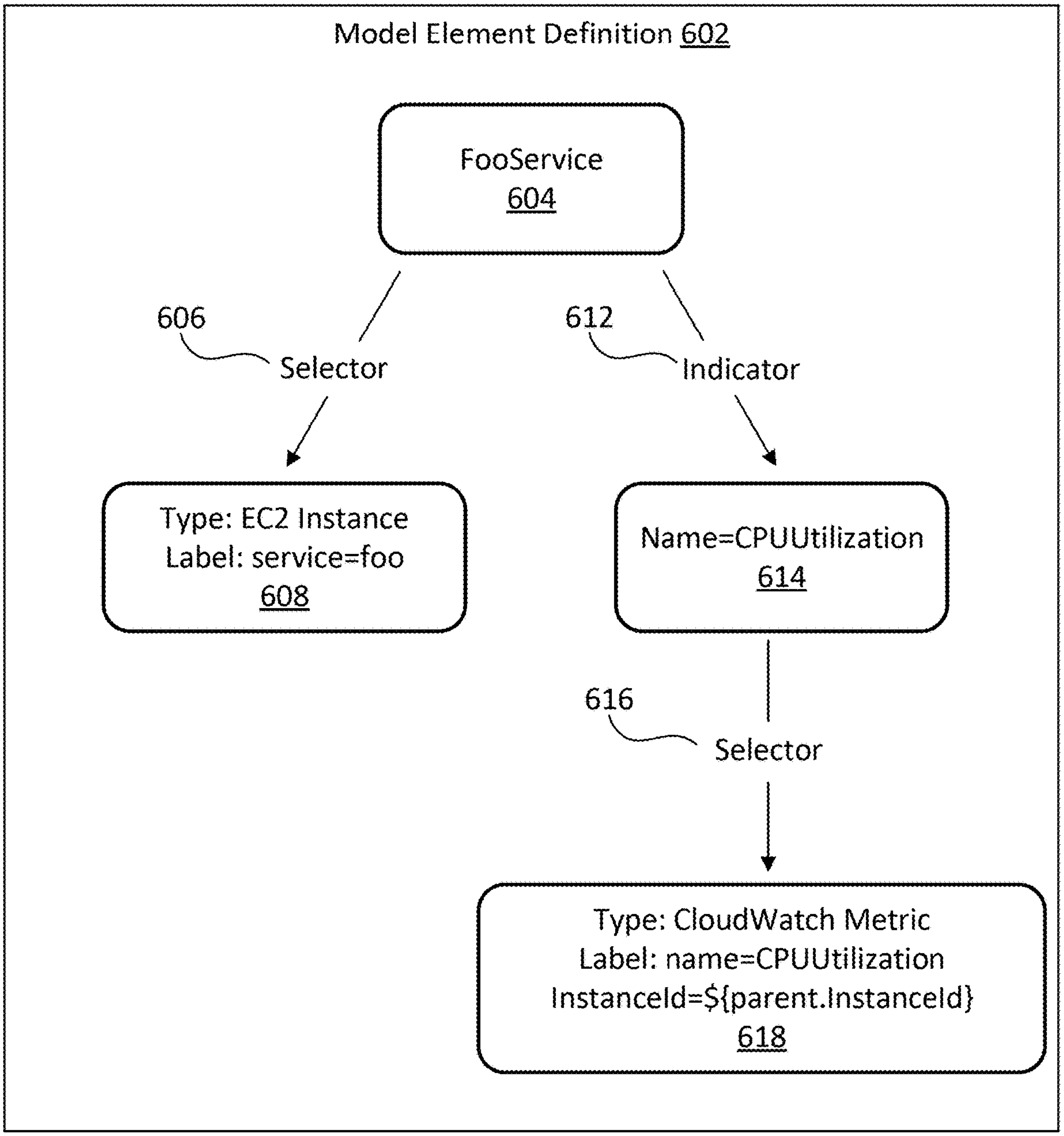

For example, FIG. 6A illustrates an example model element definition 602 for the service 604 called FooService. In this example, a selector 606 is defined to match infrastructure elements in the inventory 402 based on matching criteria 608, as described above in reference to FIG. 5A.

The model element definition 602 also includes an indicator 612 that specifies a CloudWatch metric 614 called "CPUUtilization" that can be used to measure the health of the service 604. The CPUUtilization metric may provide various information about the utilization of CPU resources allocated to an instance. To measure the health of the overall service 604, the indicator 612 needs to be configured to obtain CPUUtilization metrics from all of the instances associated with the service 604. Accordingly, the indicator 612 is associated with another selector 616. The selector 616 may be associated with criteria 618 that can be used to match the selector 616 to elements in the inventory 402. In this example, the matching criteria 618 is defined to identify a metric included in the inventory 402 that has properties identifying the metric is a "CloudWatch Metric" type and having a "CPUUtilization" label. The matching criteria 618 also specifies a "InstanceId=${parent.InstanceId}" expression. This expression takes advantage of the hierarchical context of model elements and allows a corresponding CPUUtilization metric to be obtained from each of the instances that run the service 604. That is, because the service 604 is bound to the underlying instances using the selector 606, the CPUUtilization metrics for each instance can be easily identified using the ${parent.instanceID} expression. As an example, the model element definition 602 may be expressed in JavaScript Object Notation (JSON) 630, as shown in FIG. 6B. In general, an indicator may be defined for any metric, log, event trace, or other stream of telemetry.

Once model elements are defined, the model engine 208 can be configured to perform model resolution. In various embodiments, model resolution 416 involves combining inventory elements from the inventory 402 with an abstract system model 412. For example, the inventory elements may be combined with the abstract system model 412 based on model definitions 414 (e.g., model element definitions, selectors, indicators, etc.), as illustrated in FIG. 4. The result of this combination is a bound system model 418 that maps model elements defined for the abstract system model 412 to relevant inventory elements from the inventory 402. The model resolution may be performed hierarchically so that the results of an inventory match might affect the results of another inventory match.

In various embodiments, the bound system model 418 may consist of three types of bindings: element bindings, data (or metric) bindings, and relationship bindings. For example, the bound system model 418 may consist of a set of element bindings that map inventory elements to model elements. For example, an element binding may be associated with the following properties:

- ID: a unique ID for the element binding,
- ModelElementID: the ID of the abstract model element,
- InventoryElementID: the ID of the inventory element in the mapping,
- InventoryDetailID: the detail ID for the inventory element at the time of the model resolution, and
- ParentID: if applicable, this property contains the ID of the element binding for a parent model element.

The bound system model 418 may also include a set of data (or metric) bindings that map metrics or other data from the inventory 402 to element bindings. For example, a data binding may refer to a metric for an indicator. In some embodiments, the data binding may also refer to an associated element binding with which the data binding is associated. For example, a data binding may be associated with the following properties:

- ID: a unique ID for the data binding,
- IndicatorID: the ID of the indicator,
- ElementBindingID: the ID of the parent element binding,
- MetricID: the ID of the inventory element for the metric in the mapping,
- MetricDetailID: the detail ID for the inventory element at the time of model resolution, and
- MetricSummarization: the summarization type for the metric, which may be needed when retrieving the metric.

Further, the bound system model 418 may include a set of relationship bindings that identify relationships between element bindings. Relationship bindings may be used for model relationships that have a selector. For example, a relationship binding may be associated with the following properties:

- ID: a unique ID for the relationship binding,
- RelationshipID: the ID of the relationship object that created this relationship binding,
- SourceModelElementID: the model element ID for the source of the relationship,
- DestElementBindingID: the destination of the relationship, which is an element binding. The destination is therefore a particular bound inventory element within the destination model element,
- RelationshipID: the ID of the relationship object that created this relationship binding,
- PropagationTo: represents any conditions propagating along this binding from the source to the destination, and
- PropagationFrom: represents any conditions propagating along this binding from the destination to the source.

Figure 7:
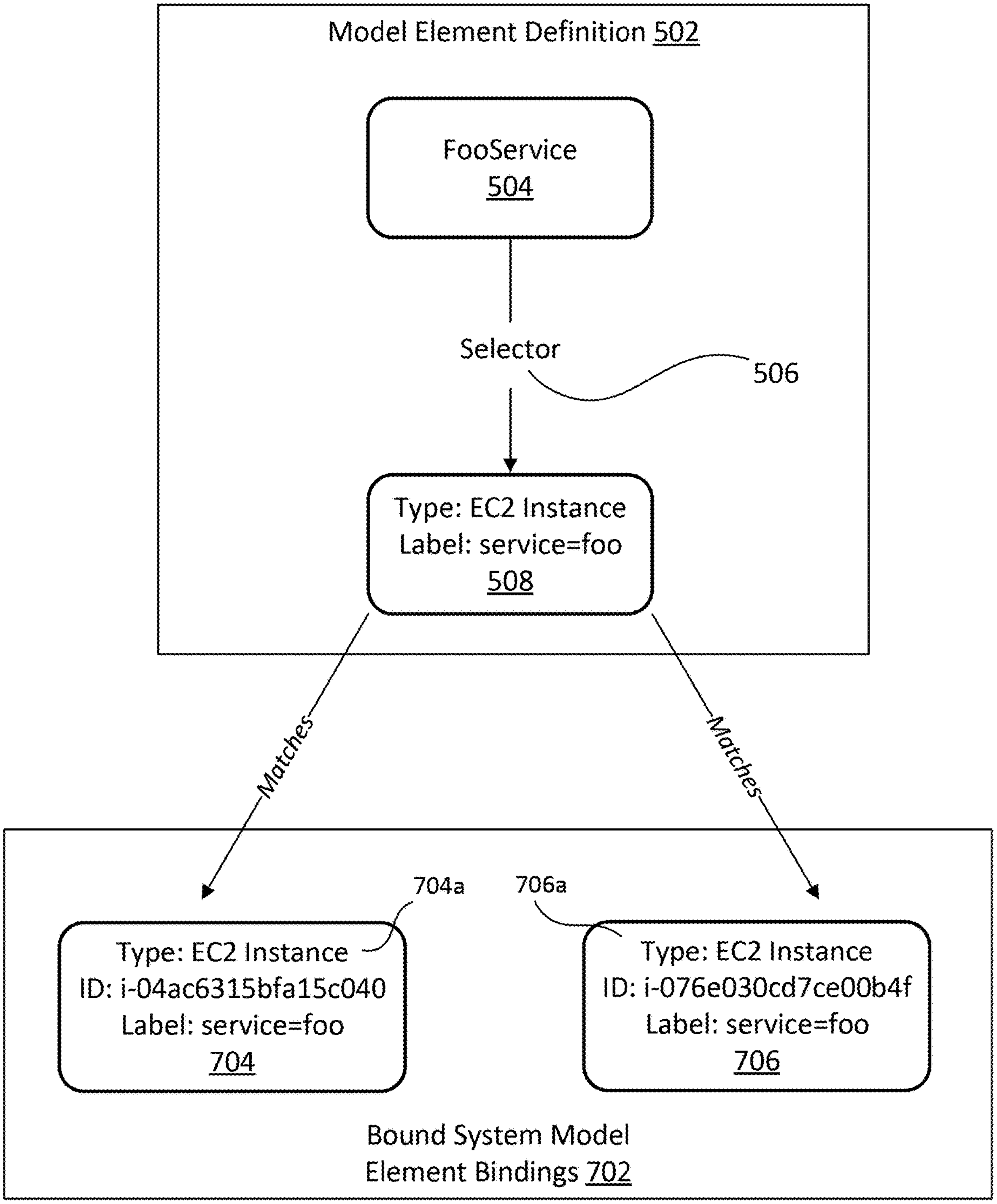
FIG. 7 illustrates an example model resolution process with respect to the model element definition of FIGS. 5A-5B according to some embodiments.

As an example, FIG. 7 illustrates an example model resolution that may be performed by the model engine 208 in reference to the model element definition 502. In this example, the model engine 208 has found a set of inventory elements 704, 706 that match the selector 506. For example, the model engine 208 may determine the matching inventory elements 704, 706 based on matching criteria associated with the selector 506. In this example, the matching criteria is defined to identify inventory elements that are associated with a type "EC2 Instance" and a label "service-foo", which matches properties 704*a*, 706*a* associated with the inventory elements 704, 706. The inventory elements 704, 706 may be represented as element bindings 702 in the bound system model 418. Each of the inventory elements 704, 706 are real instances that are bound to the model element definition 502.

Figure 8:
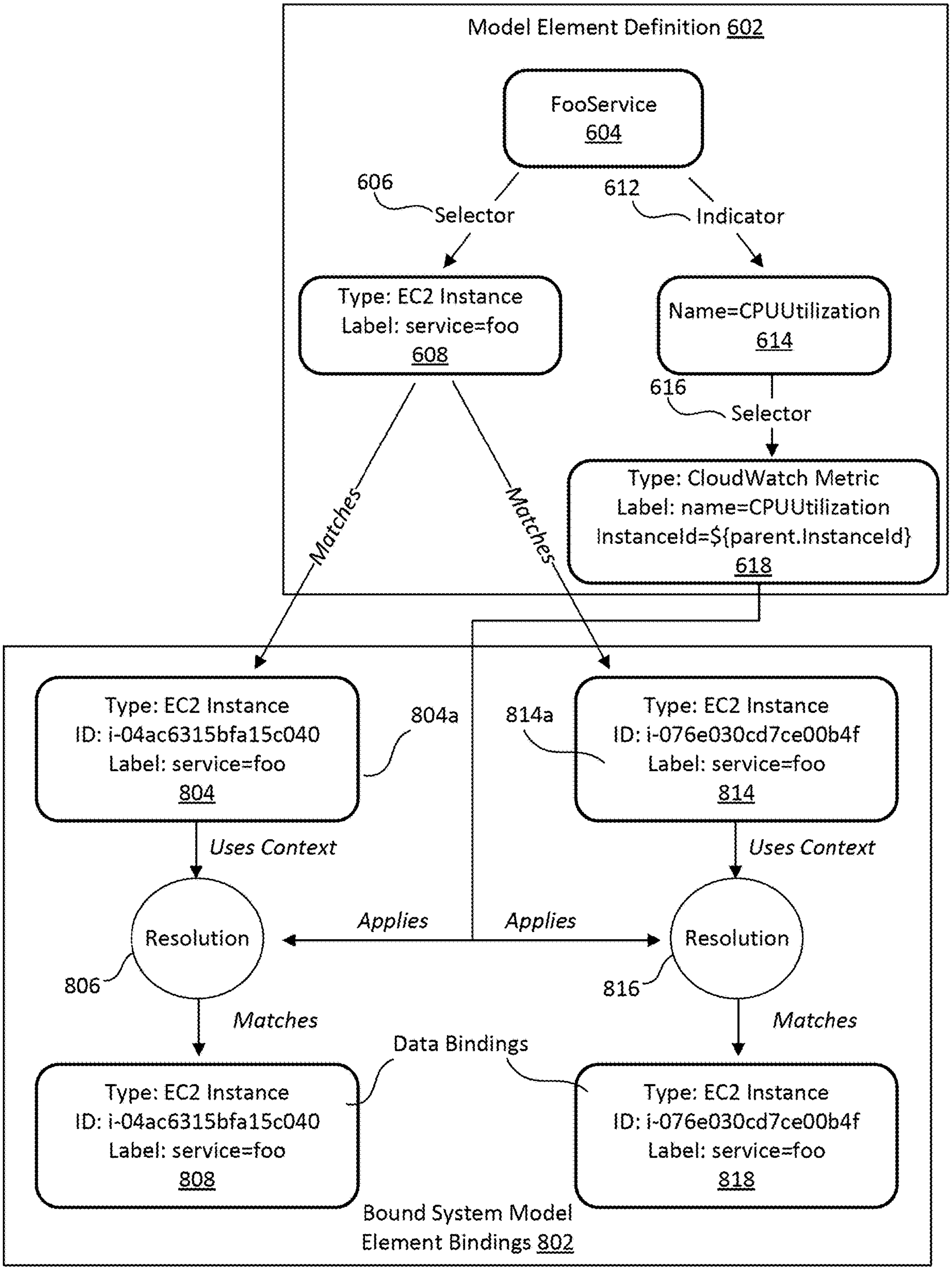
FIG. 8 illustrates another example model resolution process with respect to the model element definition of FIGS. 6A-6B according to some embodiments.

As another example, FIG. 8 illustrates another example model resolution that may be performed by the model engine 208 in reference to the model element definition 602. In this example, the model engine 208 has found a set of inventory elements 804, 814 that match the selector 606. For example, the model engine 208 may determine the matching inventory elements 804, 814 based on matching criteria associated with the selector 606. In this example, the matching criteria is defined to identify inventory elements that are associated with a type "EC2 Instance" and a label "service=foo", which matches properties 804*a*, 814*a* associated with the inventory elements 804, 814. The inventory elements 804, 814 may be represented as element bindings 802 in the bound system model 418. Each of the inventory elements 804, 814 are real instances that are bound to the model element definition 602.

Additionally, in the example of FIG. 8, the model engine 208 additional model resolutions to resolve the selector 616 associated with the indicator 612 for a metric "CPUUtilization", as described above. The selector 616 is associated with matching criteria 618 for inventory elements associated with a type "CloudWatch Metric" and label "name-CPUUtilization". The matching criteria 618 also includes an expression "InstanceId=${parent.InstanceId}" which is used to specify the InstanceId value during model resolution. The model engine 208 may be configured to resolve selectors and indicators in the model based on their hierarchical context. For example, when resolving data bindings, the model engine 208 may determine the respective context for each matched inventory element. In the example of FIG. 8, the model engine 208 may perform the model resolution twice, once for each EC2 instance matched based on selector 606. When performing a model resolution for a given matched instance, the model engine 208 may access labels from a parent of the matched instance and apply those labels using a variable substitution. The syntax ${parent.InstanceId} says to use the value of the label InstanceId from the parent context.

Accordingly, FIG. 8 illustrates that the model engine 208 runs a model resolution process for each indicator and inventory element binding. The model resolution performed by the model engine 208 applies the indicator selector using the context from the inventory element binding. The result is a data binding that binds the correct CPUUtilization metric to each model binding. This same hierarchical model resolution process used for bindings can also be used for component model elements. In various embodiments, a component model element is a model element that is logically nested inside a parent element, and model resolution for a component element can use a context of the parent as variables for the model resolution.

In some embodiments, when performing model resolution, the model engine 208 may resolve a model based on hierarchical context, such as by evaluating selectors without references to ancestor elements first, followed by evaluating selectors with references to ancestor elements when the references to ancestor elements can be evaluated, and repeating these operations as needed to evaluate all of the selectors in the model.

The model engine 208 may output the bound system model 418 upon completing model resolution. The bound system model 418 may consist of a set of model bindings which map elements in the inventory 402 to elements in the abstract system model 412. The bound system model 418 will correspond to a point-in-time snapshot of the system infrastructure, so that the state of the inventory 402 when the bound system model 418 was created is what is used in all subsequent uses of the bound system model 418.

The bound system model 418 outputted by the model engine 208 may include associations between model elements of the abstract system model 412 and infrastructure elements included in the inventory 402, including myriad element bindings, data bindings, and relationship bindings. In various embodiments, the model engine 208 re-generates the bound system model 418 whenever a change is detected in the inventory 402. For examples, if the inventory 402 changes due to addition or deletion of instances, the model engine 208 again performs model resolution so that the bound system model 418 is an up-to-date model of the abstract system model 412 with corresponding telemetry.

The model engine 208 may be configured to evaluate various model relationships, including single static elements, highly available services, and single dynamic elements.

For example, a single static element may not dynamically map to anything. Single static elements are typically not used to describe anything physical, but it would be useful when describing things that are treated as black boxes from the perspective of a user. For single static elements, the model engine 208 may still access telemetry that indicates their health, and such insight may be applied to potentially identify root cause fault for a number of situations. Some examples of single static elements include AWS AZ, region, or service and COCKROACH CLOUD.

A model element representing a highly available service may especially be useful for monitoring infrastructure health. Here, there is a natural top-level overall element representing the overall service status, while the selectors match against individual elements that collectively provide that service. For this case, the model engine 208 may access telemetry related to the health of each individual element, as well as telemetry related to the overall health of the service. The overall telemetry might be generated based on some combination of the telemetry from individual service instances, or it could come from some other natural source of such data, such as metrics from a load balancer or service mesh. For such highly available services, a bound system model may model how the overall service can become degraded because of faults in the individual components, as well as how faults in the overall service can affect other systems that might depend on it. Some examples of a highly available service can include a customer-created microservice that runs as a Kubernetes deployment. In this example, individual Kubernetes pods would be bound to the service. Another example is a database deployed on an EC2 instance.

A single dynamic element may have a component that is found in an inventory having only a single instance. For example, the component may be a logical object that does not correspond to physical infrastructure or may not be a highly available service. For this kind of object, the model engine 208 may access telemetry related to the health of the specific object, which is the same as the health of the element as a whole. Here, the model engine 208 may utilize the resolution context to match against the correct telemetry, so we might not be able to easily just use only a top-level indicator. This type of element is qualitatively different from the others since the single matched element is effectively treated as a top-level element. Some examples of single dynamic elements include AWS Elastic Kubernetes Cluster and AWS Elastic Load Balancer.

The model explorer engine 210 of the infrastructure management system 202 may provide a model explorer tool (or interface) for exploring a bound system model. The model explorer tool may allow users to access dashboard interfaces, incident alerts and summaries, metrics, among other types of information, as discussed herein. For example, the model explorer engine 210 may generate a visual representation of a bound system model corresponding to a deployed system infrastructure. The visual representation may be provided in a dynamic dashboard, for example. The dashboard may be configured to model the system infrastructure based on attributes defined for inventory elements, such as relationships, states, and conditions. Based on these attributes, the model explorer engine 210 may generate the dynamic dashboard representing the system infrastructure, which may be provided to a user in a graphical user interface (GUI). Unlike conventional dashboards, which typically plot some value over time, the dashboard generated by the model explorer engine 210 may represent the dynamic nature of various aspects of the system infrastructure. Further application of the model explorer engine 210 is described below in reference to the example flowchart 900 of FIG. 9 and FIGS. 10A-10P.

The incident engine 212 may be configured to generate model-driven incident summaries and condition graphs whenever an incident is detected in a deployed system infrastructure. The incident summaries may be presented in an interface provided by the interface engine 204. Further details regarding the incident engine 212 are described below in reference to the example flowchart 1100 of FIG. 11 and FIGS. 12A-12C.

The metric pipeline engine 214 may provide functionality for modeling and generating model-driven derived metrics. In various embodiments, derived metrics may be metrics that are generated by performing some sort of query or computation against other metrics or data. There may be many use cases for derived metrics. As one example, users may simply want to see some computed value when they access and explore their bound system models. For this case, when a user drills down into a model element, they may see graphs for computed derived metrics associated with the model element or with specific bound inventory elements. As another example, when running incident analysis, users may need to transform or combine metrics in order to get a value that can be mapped to statuses using thresholds. This could include something like converting a count into a rate, or computing an average, or sum over some data. Further details regarding the metric pipeline engine 214 are described below in reference to the example flowchart 1300 of FIG. 13 and FIGS. 14A-14I.

Figure 9:
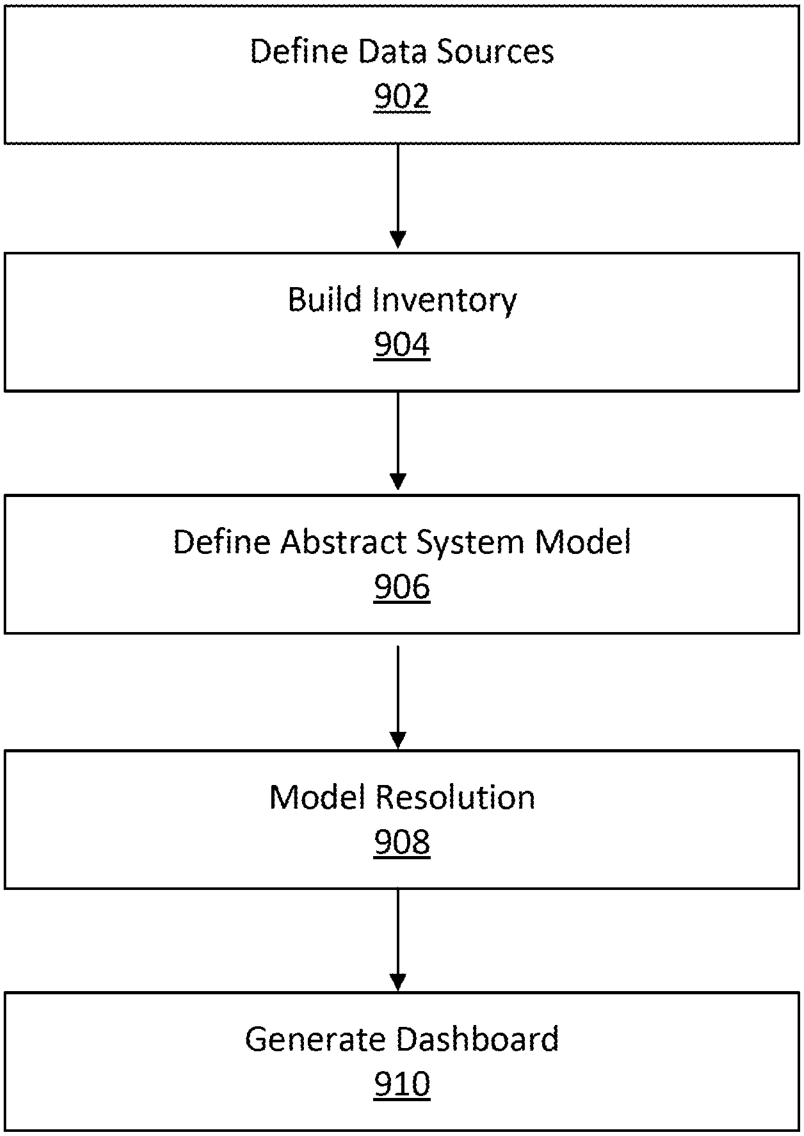
FIG. 9 is an example flowchart for modeling deployed system infrastructure according to some embodiments.
Figure 10A:
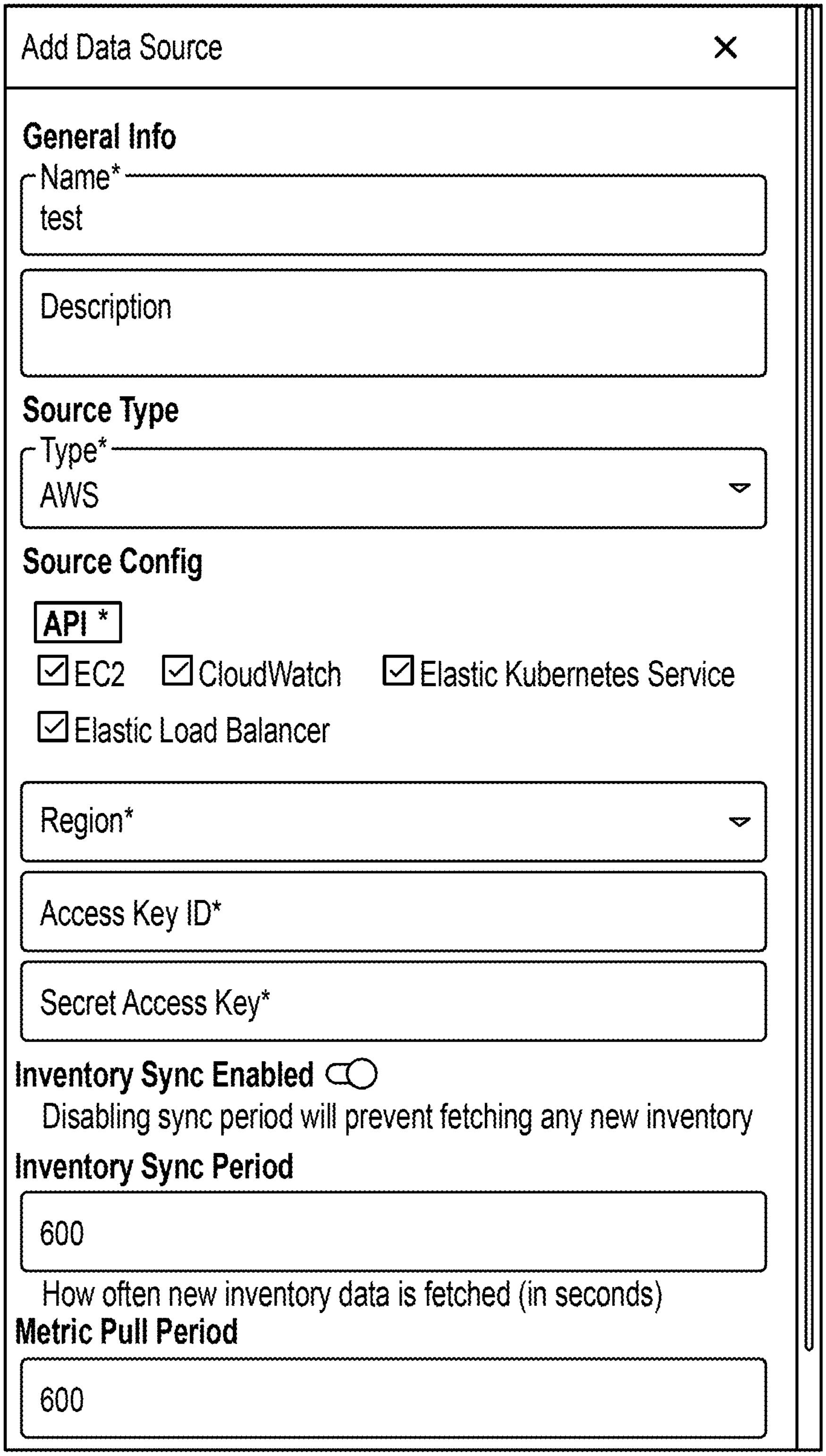
FIGS. 10A-10P illustrate examples related to defining aspects of a system model and generating a dynamic dashboard according to some embodiments.
Figure 10B:
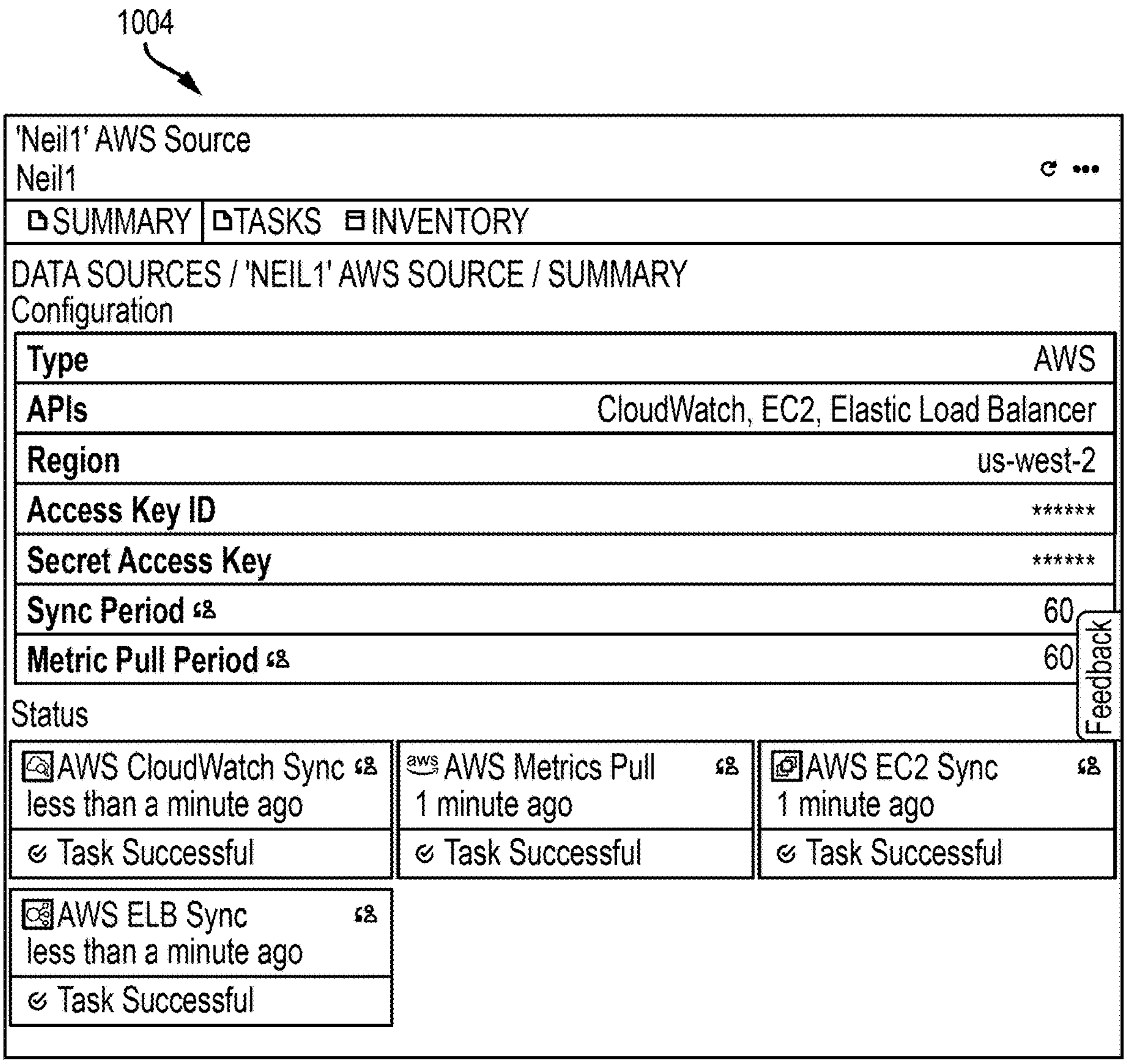

FIG. 9 illustrates an example flowchart 900 for modeling deployed system infrastructure and generating dashboards. In step 902, the infrastructure management system 202 provides an interface (e.g., graphical user interface, application programming interface) that allows a user to define data sources associated with a deployed system infrastructure. For example, FIG. 10A illustrates an example interface 1002 that allows a user to add a data source. The interface 1002 allows the user to specify a name for the data source, a source type (e.g., cloud computing provider), a source configuration list of application programming interfaces (APIs) to use (e.g., EC2, CloudWatch, Elastic Kubernetes Service, Elastic Load Balancer, etc.), and credentials for accessing the data source (e.g., access key). The example of FIG. 10B illustrates another example interface 1004 that confirms when the data source is added. The interface 1004 may also provide a respective synchronization status for each of the applicable APIs indicating whether the infrastructure management system 202 was able to connect to a respective endpoint for each of the APIs based on the credentials provided.

Figure 10C:
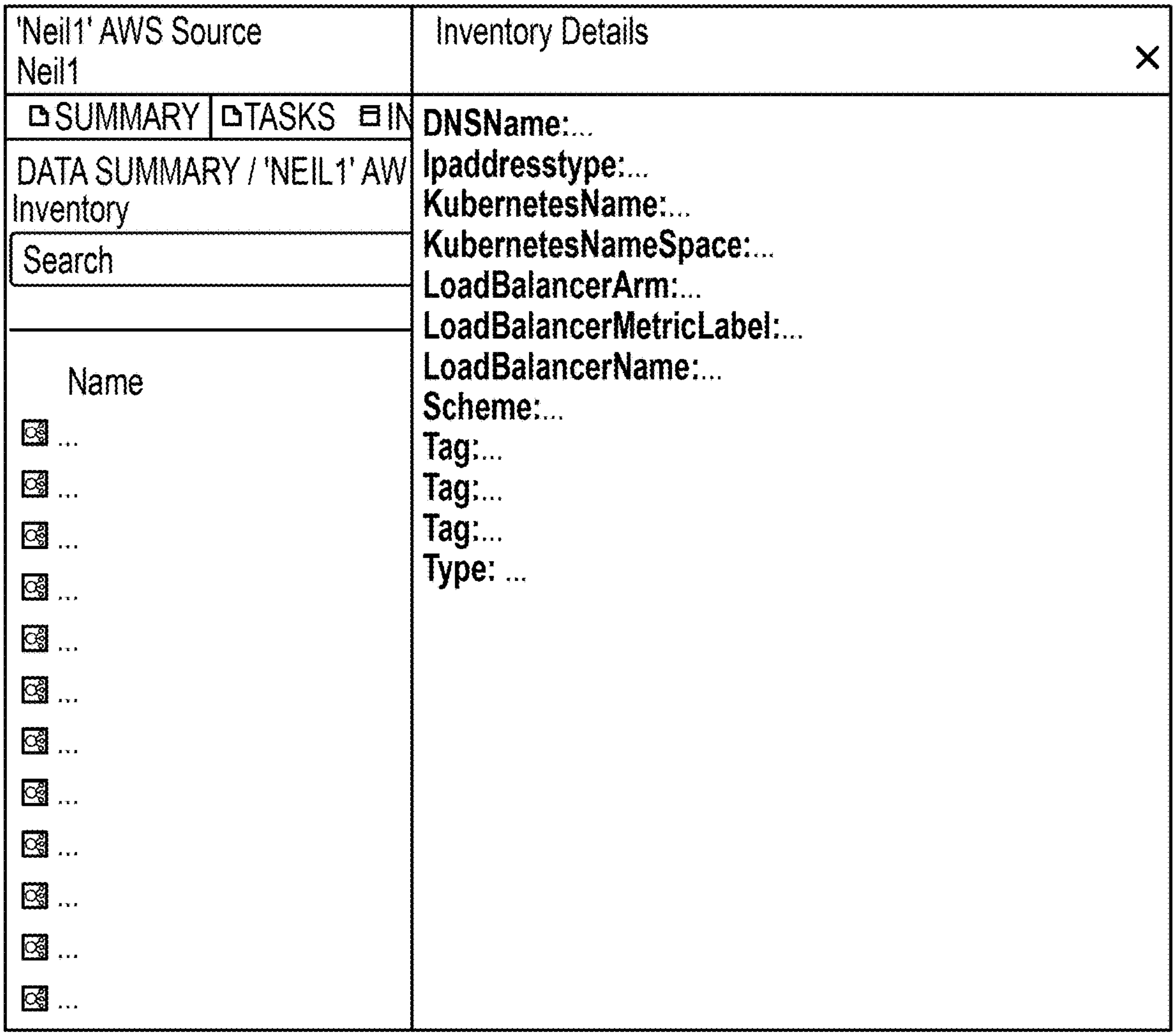
Figure 10D:
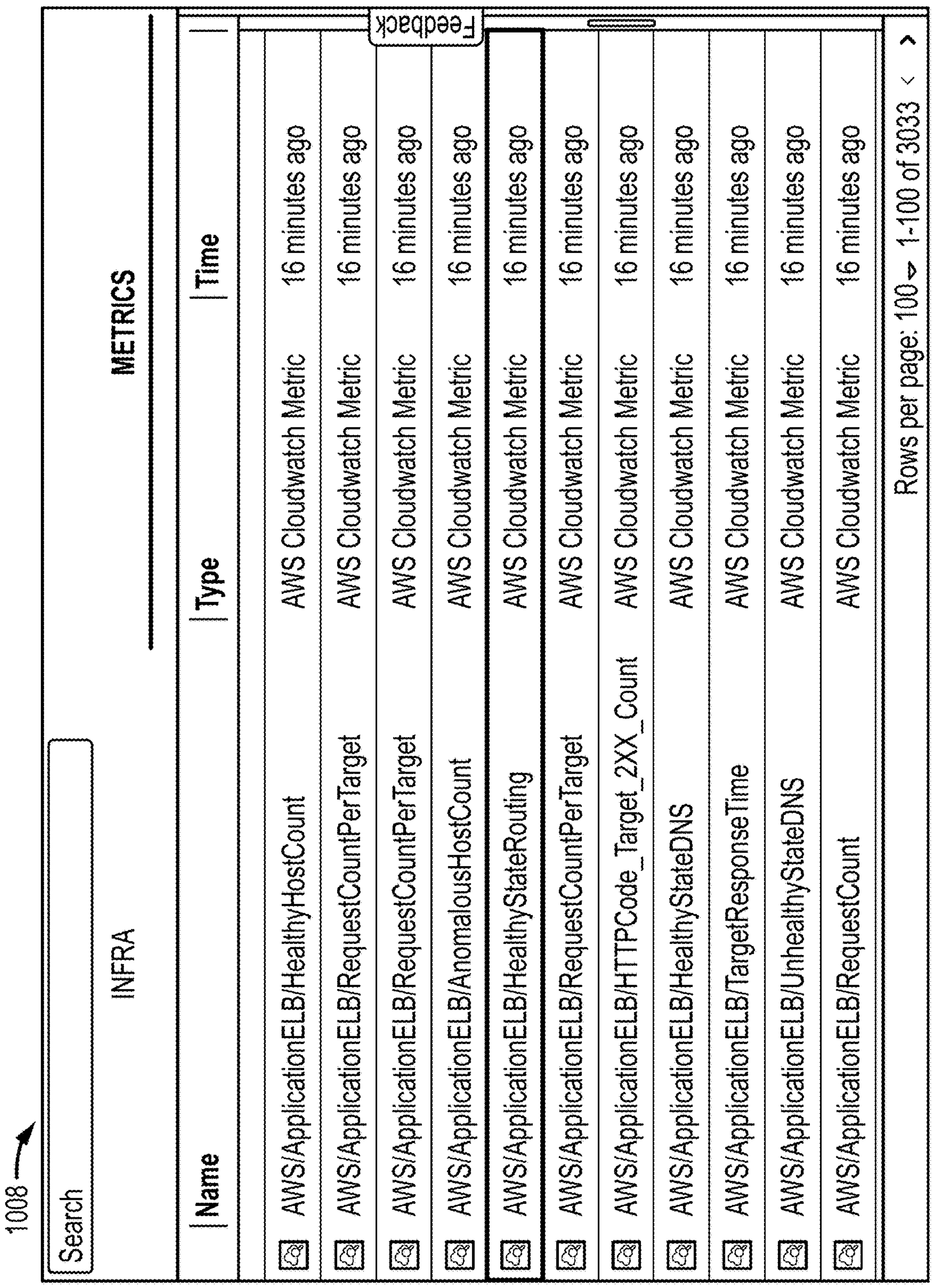

In step 904, the infrastructure management system 202 may build an inventory based on the data sources that were added, as described above. FIG. 10C illustrates an example interface 1006 that may be provided. The interface 1006 may show a list of data sources and inventory details, such as a CanonicalHostedZoneId, DNSName, IpAddressType, KubernetesIngressName, KubernetesIngressNamespace, LoadBalancer, LoadBalancerMetricLabel, LoadBalancerName, Scheme, Tags, Type, Vpcid, among others. The infrastructure management system 202 may provide another interface 1008 that shows a list of inventory elements, as shown in the example of FIG. 10D. The interface 1008 may also identify a list of infrastructure elements and a list of metrics that may be retrieved from those infrastructure elements, as determined based on the data sources.

Figure 10E:
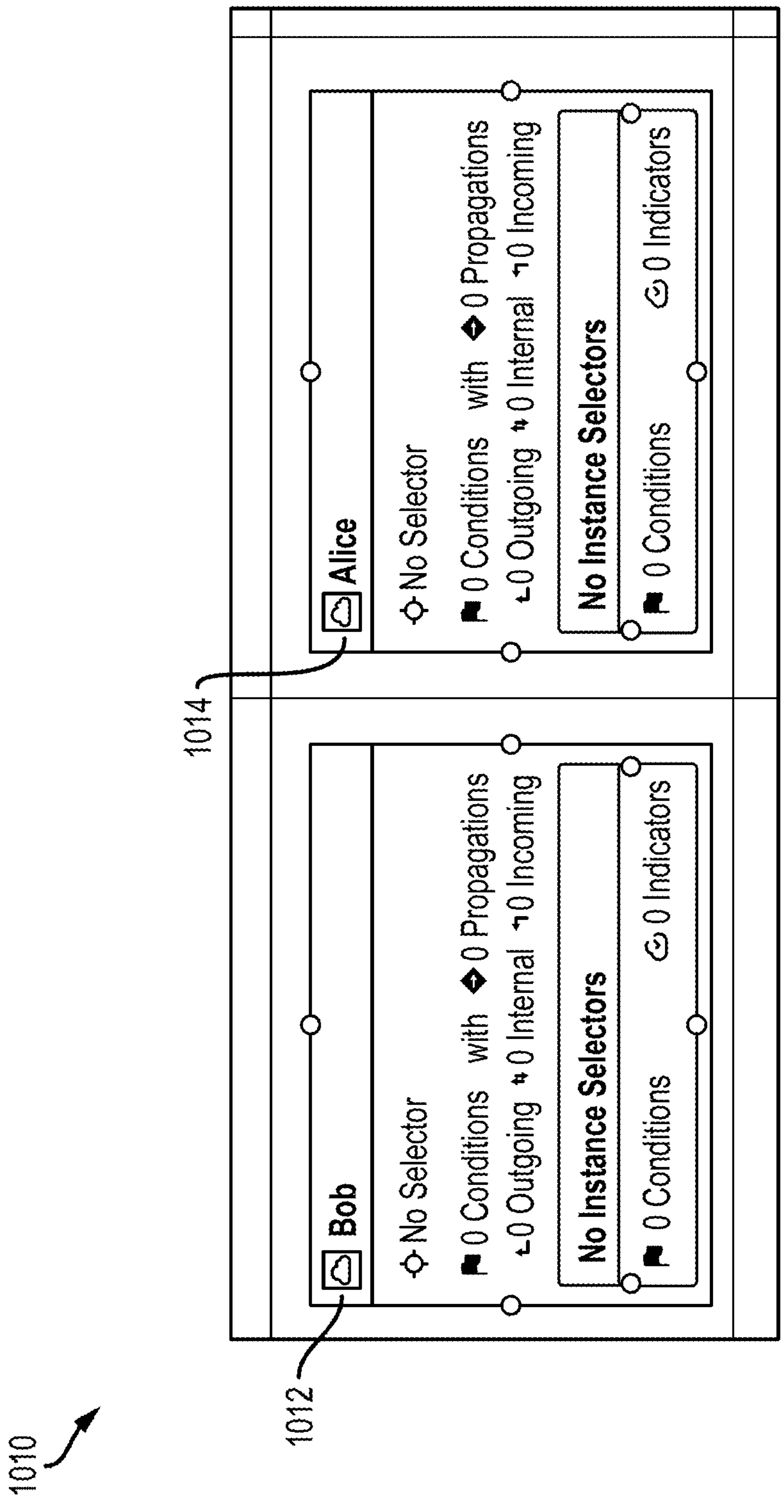

In step 906, the infrastructure management system 202 may provide interfaces that allow a user to define an abstract system model of the deployed system infrastructure, as described above. For example, the user may interact with an interface 1010 to define the abstract system model. In FIG. 10E, the user creates a first element referencing an entity named "Bob" 1012 and a second element referencing an entity named "Alice" 1014 associated with the abstract system model. Both the first element 1012 and the second element 1014 may represent different logical entities associated with the deployed system infrastructure.

Figure 10F:
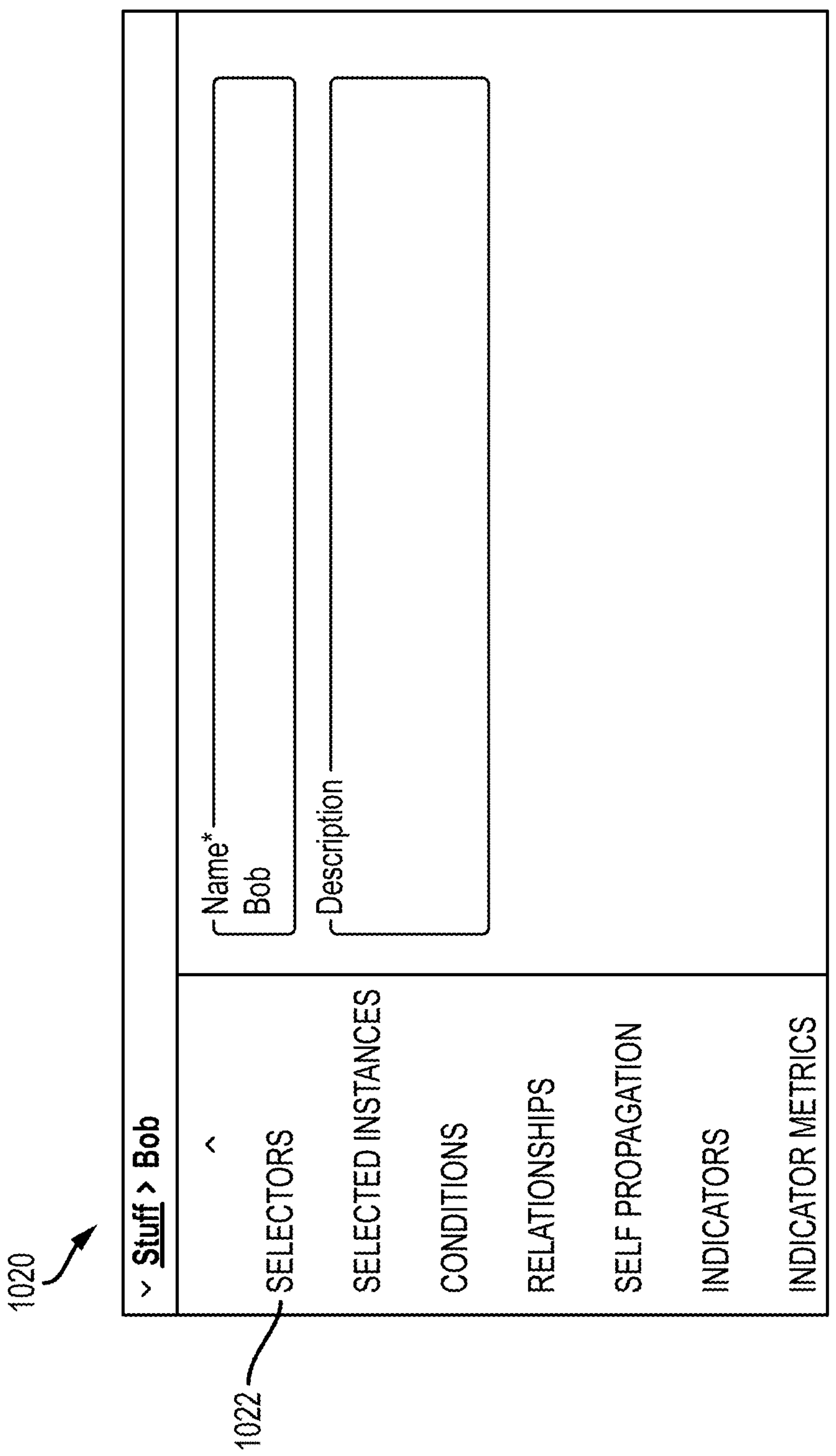

The user may also specify attributes for each element. For example, FIG. 10F illustrates an example interface 1020 that may be provided by the infrastructure management system 202. The interface 1020 may be provided when the user selects an option to define attributes associated with the first element 1012. In this example, the interface 1020 may provide options 1022 for defining one or more selectors, indicators, indicator metrics, conditions, relationships, propagations, states, among other attributes.

In some embodiments, a state may measure anything related to an element (e.g., health, cost, etc.). Such states may be used based on a hierarchy associated with elements in an abstract system model to determine how a state of a given element may influence other elements, such as a parent element influencing child elements.

Figure 10G:
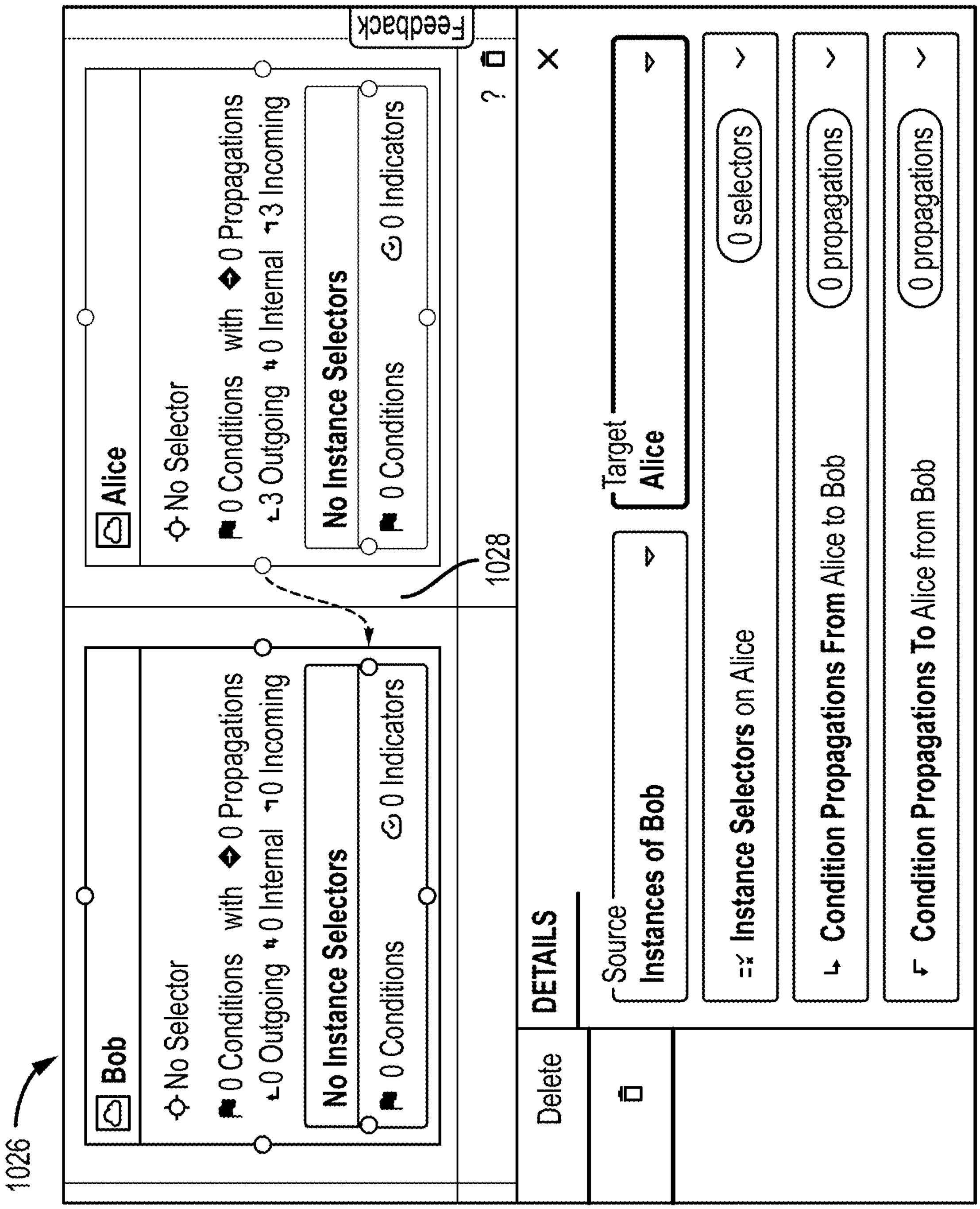

In some embodiments, a relationship between two elements may indicate whether a first element influences a second element, whether second element influences the first element, or whether both the first element and the second element influence each other. Such relationships model how actions related to one element may affect another element. The relationships may be used in conjunction with rules. For example, a user may define a rule to attribute a cost to the number of instances needed for the entity Bob and the number of instances needed for the entity Alice. The rule may specify a relationship between Bob and Alice, a ratio of a number of instances needed for Bob to a number of instances needed for Alice, and a function for determining a cost associated with the instances. In this example, the infrastructure management system 202 may process the rule to report a cost associated with running Bob and Alice at any given time. Thus, if there is ever a need to reduce compute cost, the risks of reducing instances for Bob and Alice, and the effort on each of those related entities can be determined. For example, FIG. 10G illustrates an example interface 1026 in which a relationship between Bob and Alice is specified. In the example of FIG. 10G, the specified relationship indicates that Alice influences Bob, which is shown visually with an arrow 1028 in the abstract system model.

Figure 10H:
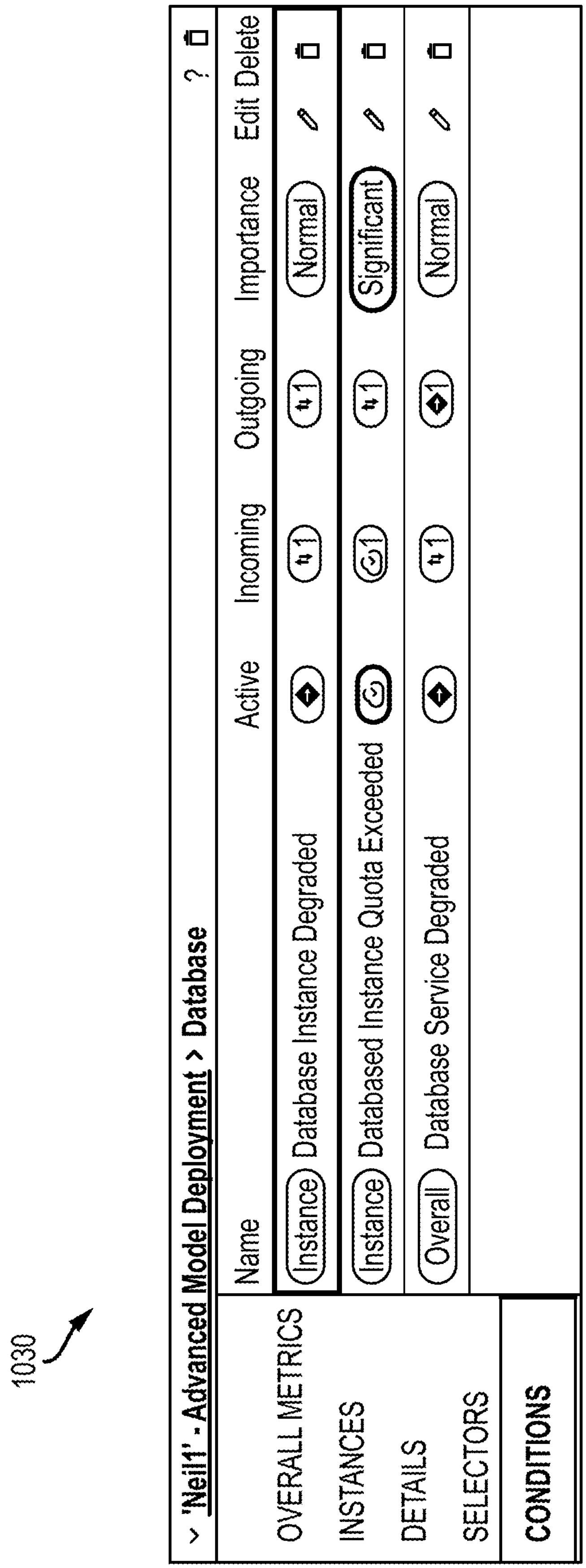

FIG. 10H illustrates an example interface 1030 that may be provided when the user selects an option to define conditions for an element. In some embodiments, a condition may be bound to a data source. In this example, the interface 1030 provides a list of conditions associated with a database associated with the deployed system infrastructure. Some example conditions that could be applied include "Database Instance Degraded", "Database Instance Quota Exceeded", and "Database Service Degraded".

Figure 10I:
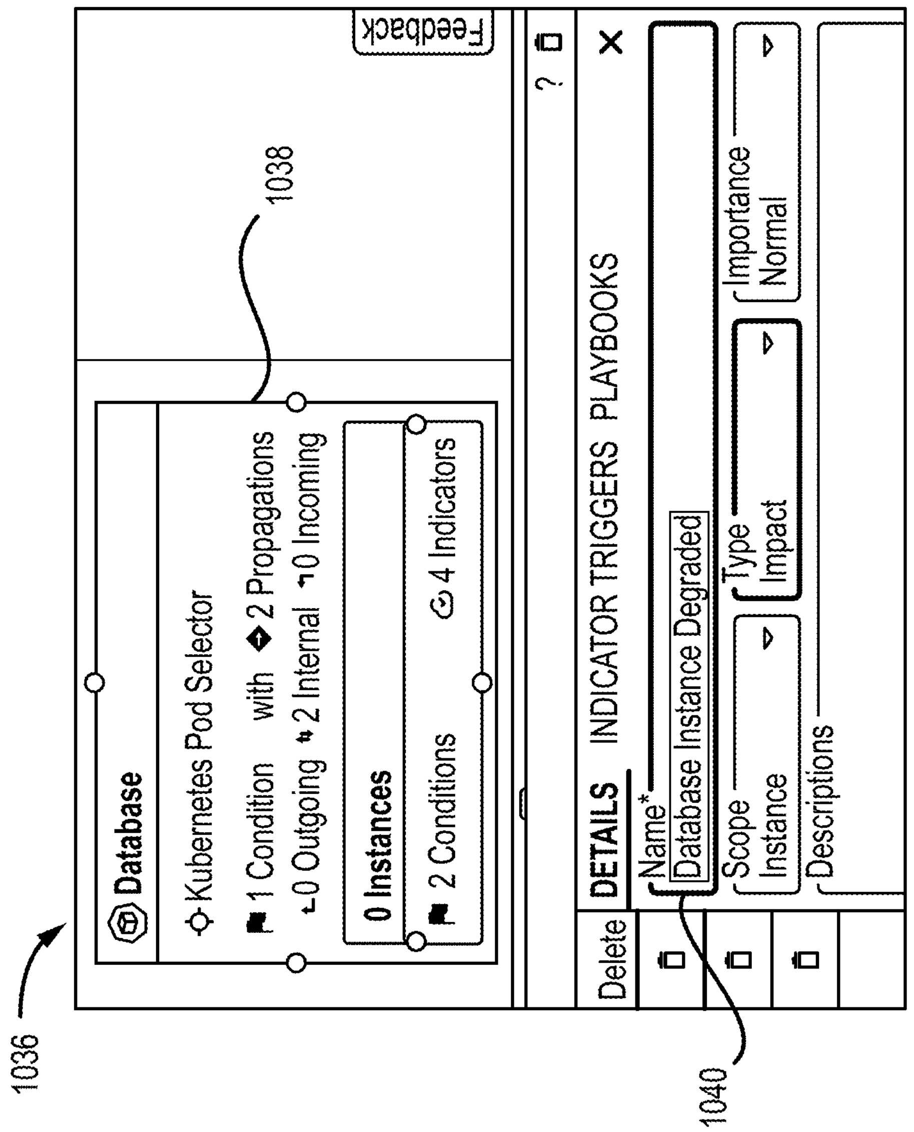
Figure 10J:
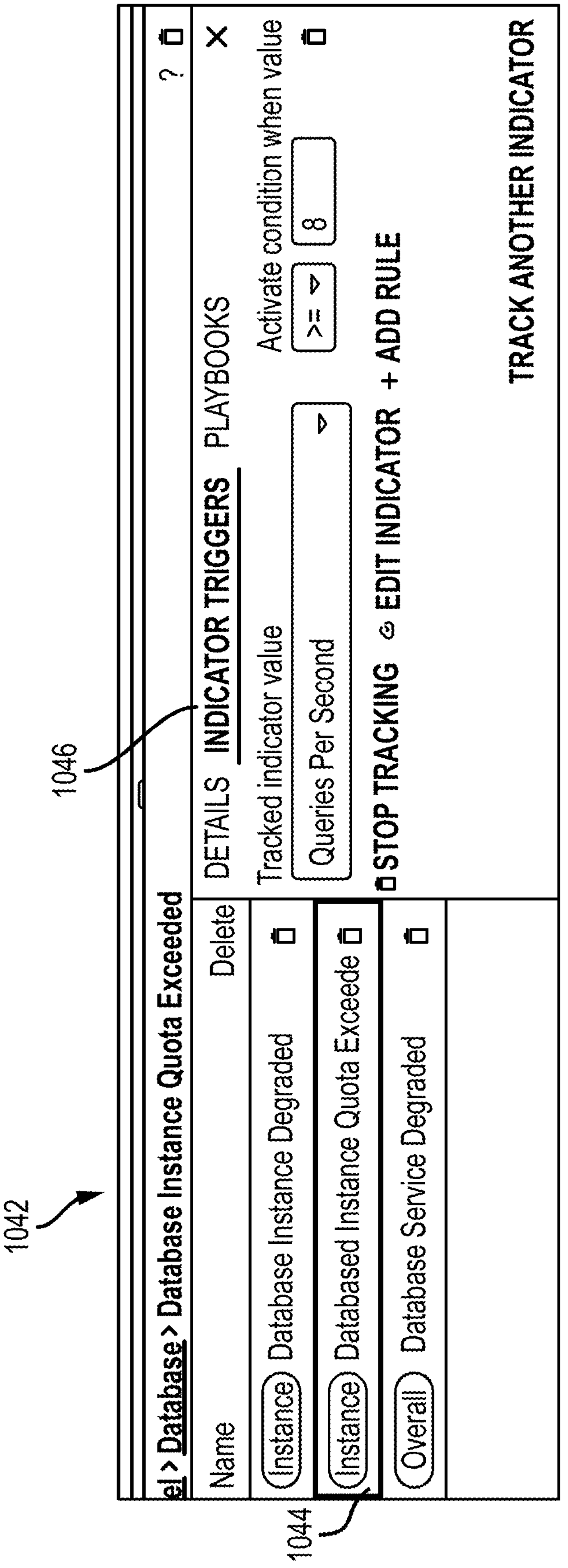

FIG. 10I illustrates an example interface 1036 showing a database element 1038 that is associated with a condition "Database Instance Degraded" 1040. The condition may be defined with scope, type, important, and description values. In this example, the condition 1040 is defined with a scope value of "Instance", type value of "Impact", and importance value of "Normal". In this example, the database element 1038 has a condition "Database Instance Degraded" that, on a per-instance level, has an impact with a normal importance. Effectively, this condition is standalone and need not operate as a trigger (e.g., a "happiness" state). In contrast, FIG. 10J illustrates an example interface 1042 showing a condition "Database Instance Quota Exceed" 1044 that is associated with a trigger 1046. The trigger 1046 matches on a data source, which can be different than the selector data source for the database element 1038. In this case, the database element 1038 has a Kubernetes data source, but the trigger 1046 is configured to use data from a Prometheus data source to determine whether the condition is met. The ability to configure triggers as such offers many advantages. For example, a trigger may be defined so that the existence of an element (e.g., "The instance exists") can be obtained from one data source, and a metric (e.g., CPUUtilization) for the element may be obtained from another data source.

Figure 10K:
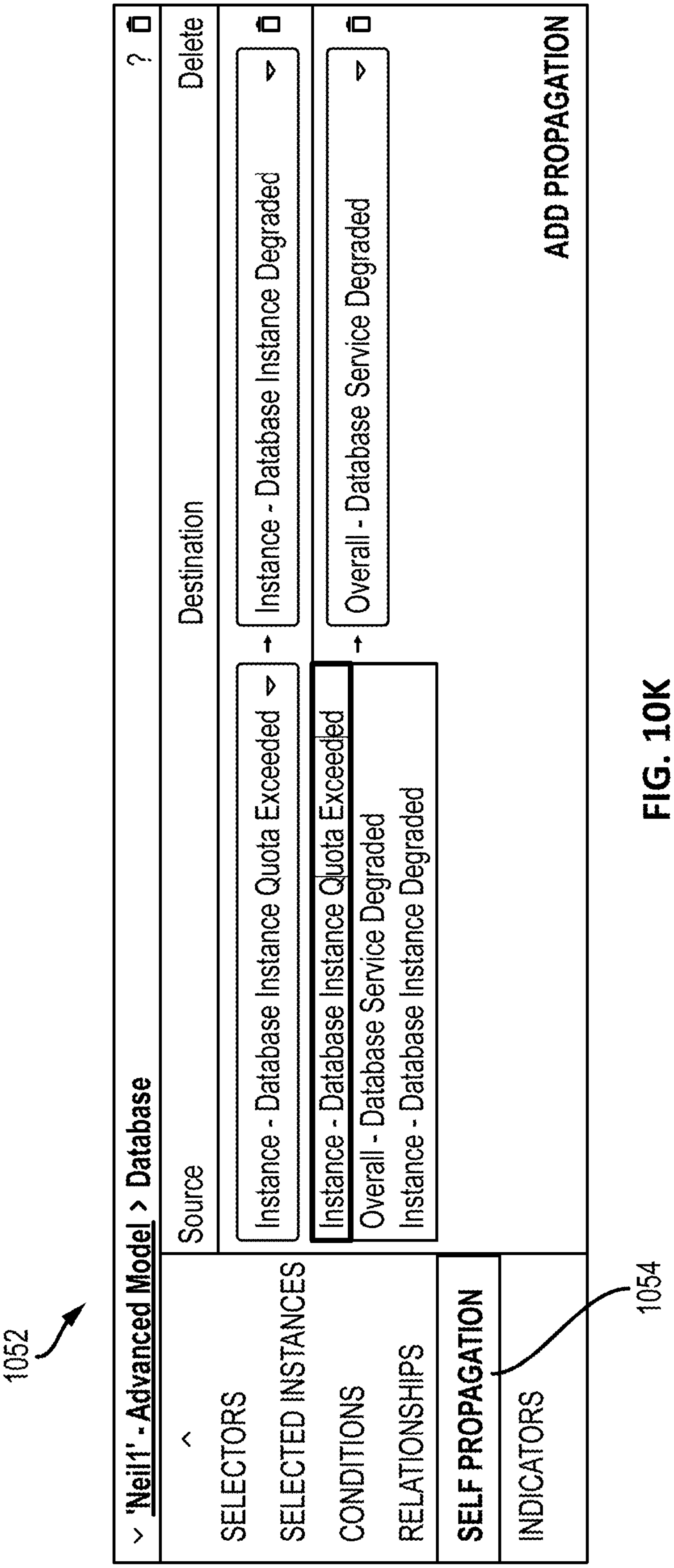
Figure 10L:
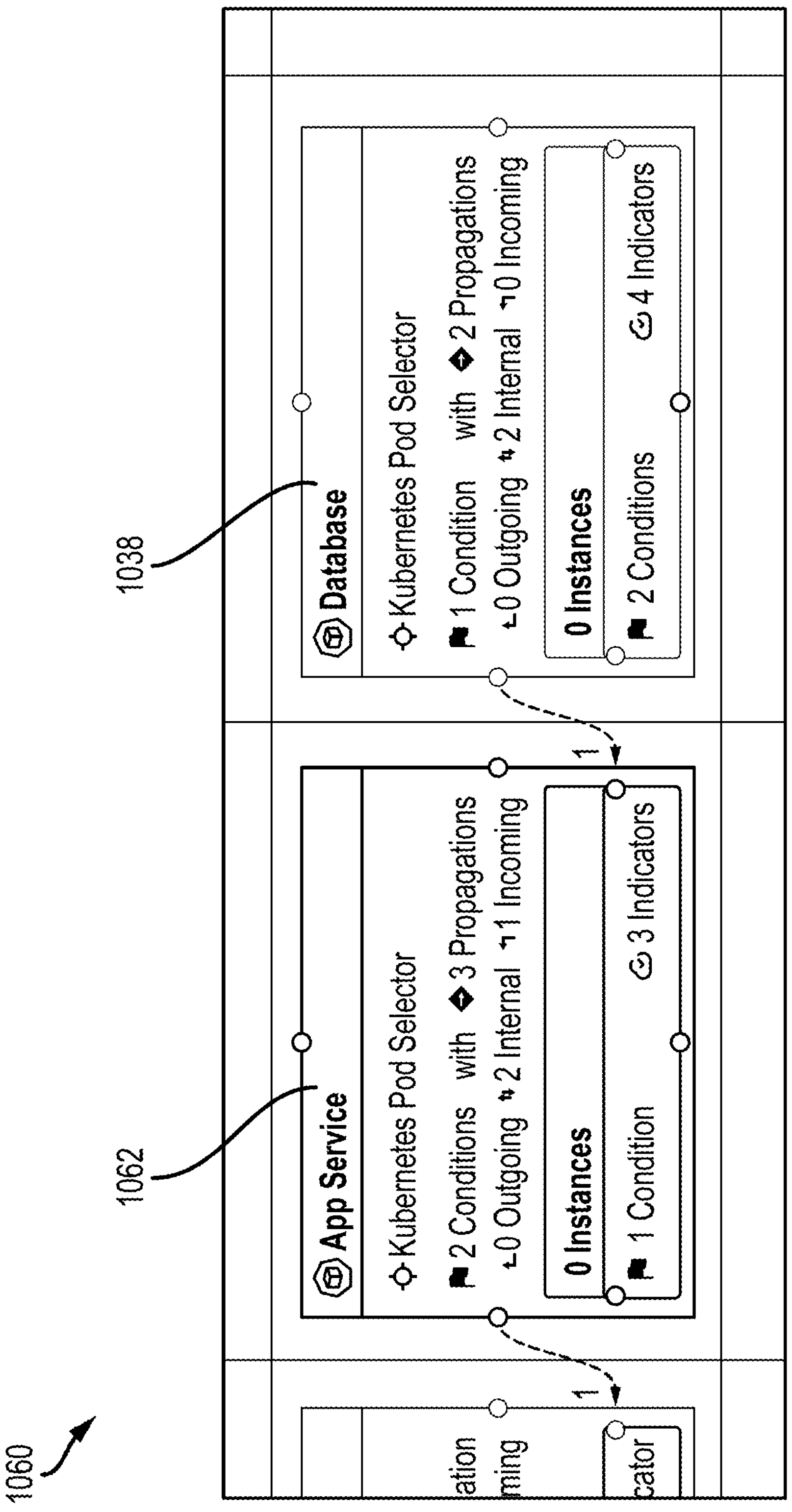
Figure 10M:
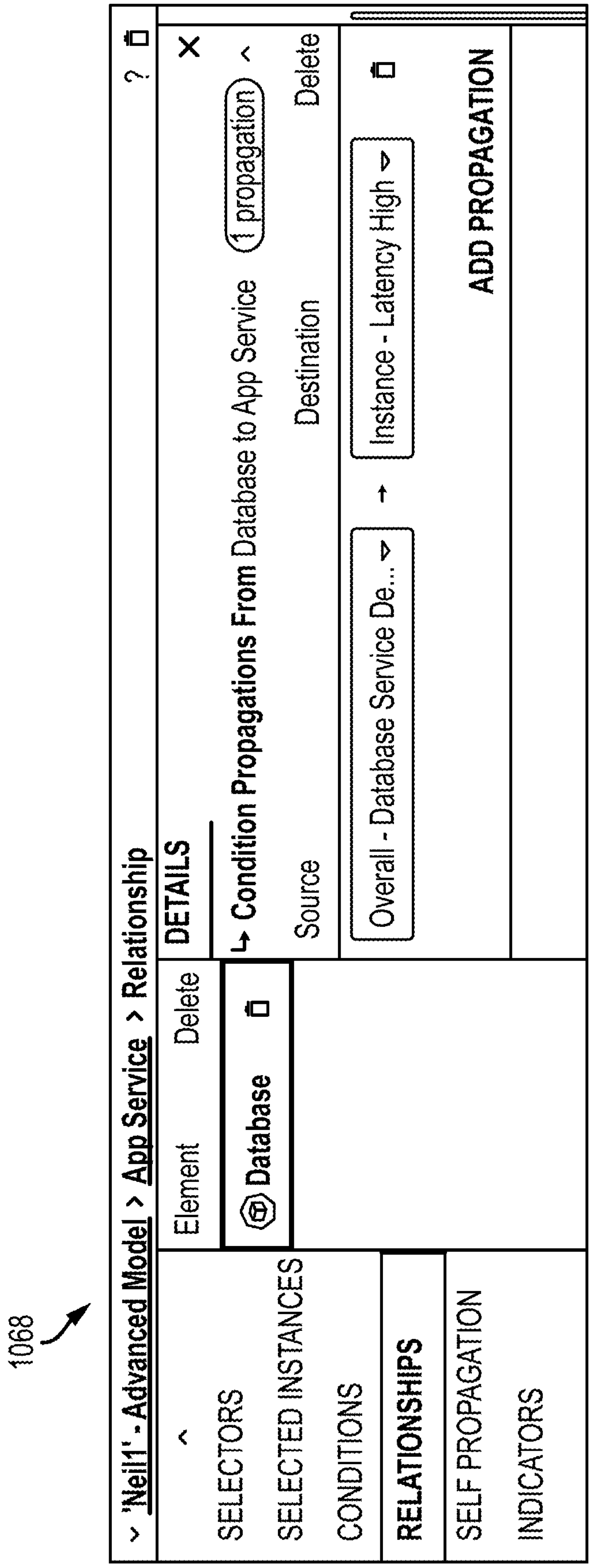

FIG. 10K illustrates an example interface 1052 showing a propagation 1054 associated with the database element 1038. In this example, the database element 1038 propagates to an app service. For example, FIG. 10L illustrates an example interface 1060 showing the database element 1038 propagates to an app service element 1062 when the database element 1038 is in a certain state, as shown in the example interface 1068 of FIG. 10M. In this example, based on the defined propagation, if the database is degraded, then latency for the app service instances will be high.

In step 908, the infrastructure management system 202 may perform model resolution, as described herein.

Figure 10N:
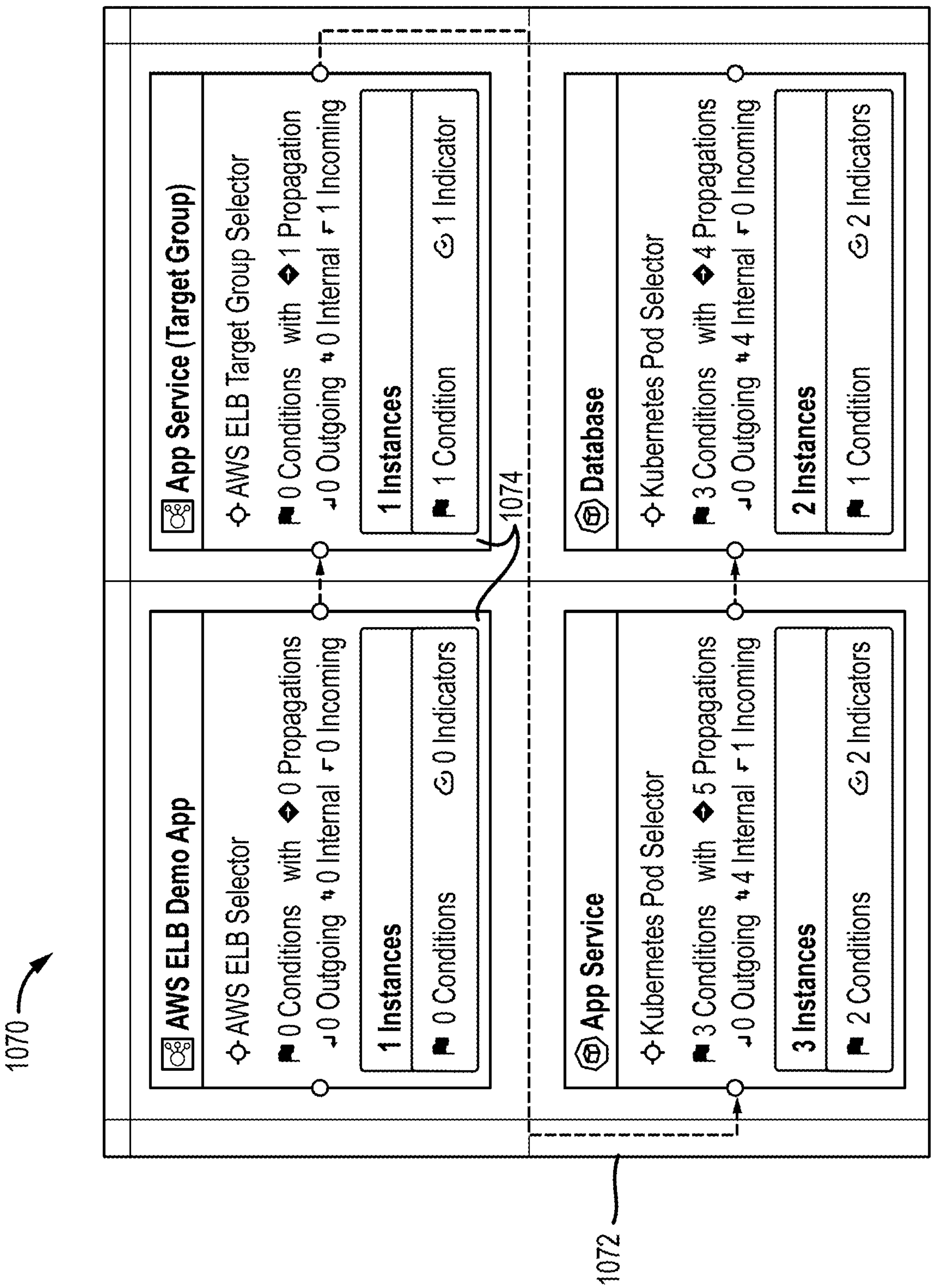

In step 910, the infrastructure management system 202 may generate a dynamic dashboard that allows users to visualize an abstract model representing a deployed system infrastructure and related information. For example, FIG. 10N illustrates an example interface 1070 showing a dynamic dashboard 1072 representing a system infrastructure. The dynamic dashboard 1072 shows corresponding elements 1074 representing various components of the system infrastructure, including an "AWS ELB Demo App" element, "App Service (Target Group)" element, "App Service" element, and "Database" element. Each element may provide various related information, such as conditions, propagations (outgoing, internal, incoming), number of associated instances, and any related conditions and indicators. Although in this example, the infrastructure management system 202 generates the dynamic dashboard, other applications are contemplated. For instance, once model resolution is complete, the infrastructure management system 202 may be applied for incident analysis or to generate derived metrics, as described herein.

Figure 10O:
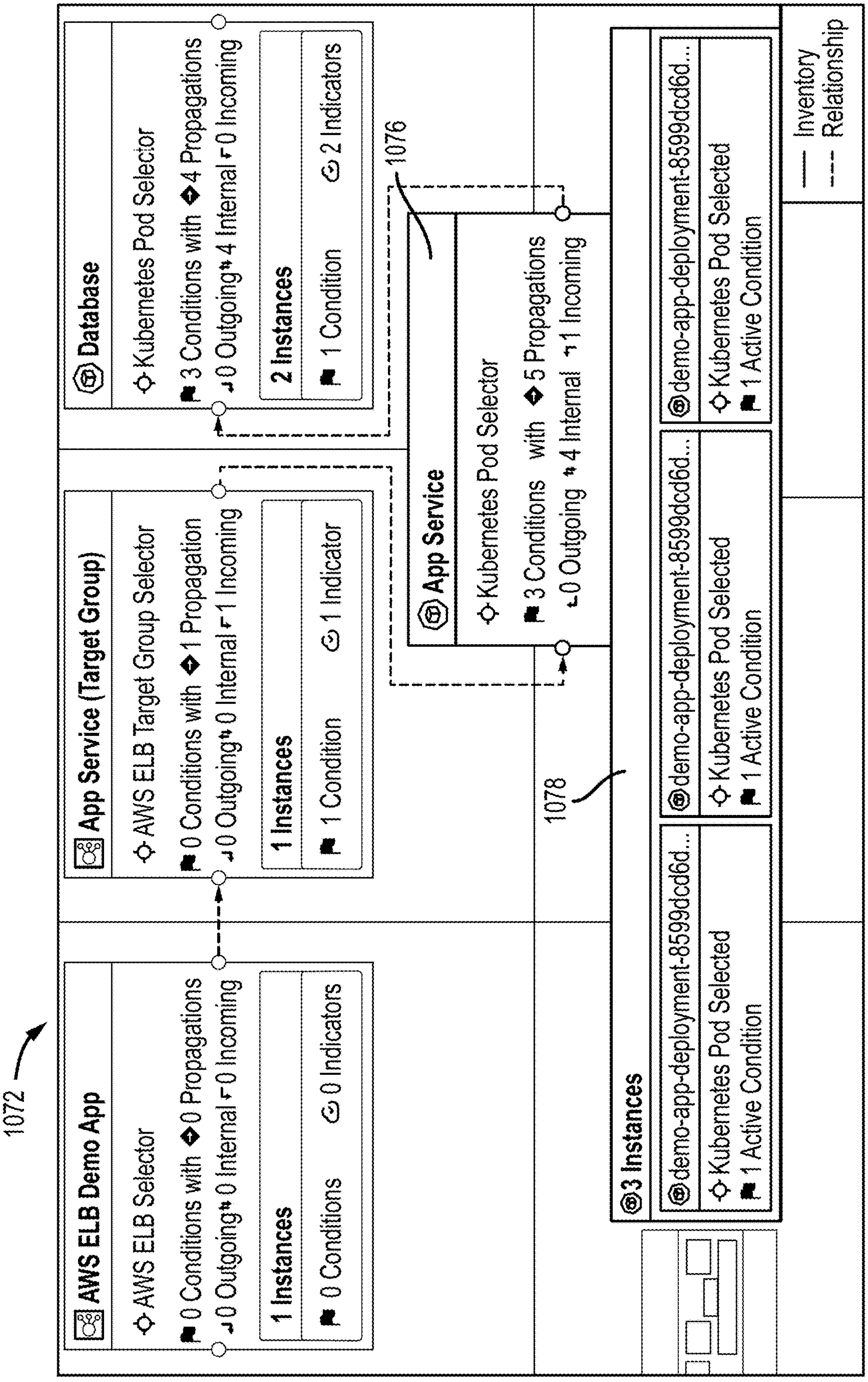

FIG. 10O illustrates dynamic capabilities of the dynamic dashboard 1072. A user interacting with the dynamic dashboard 1072 may select an element 1076 corresponding to the "App Service". In response, the dynamic dashboard 1072 may be updated to show inventory elements bound to the element 1076. In this example, the bound inventory elements include instances 1078, in addition to various related information. The "App Service" element 1076 is a top-level model element that represents the overall health of the highly available App Service. The instances 1078 were matched to the App Service element 1076 based on selectors and are updated in real-time.

Figure 10P:
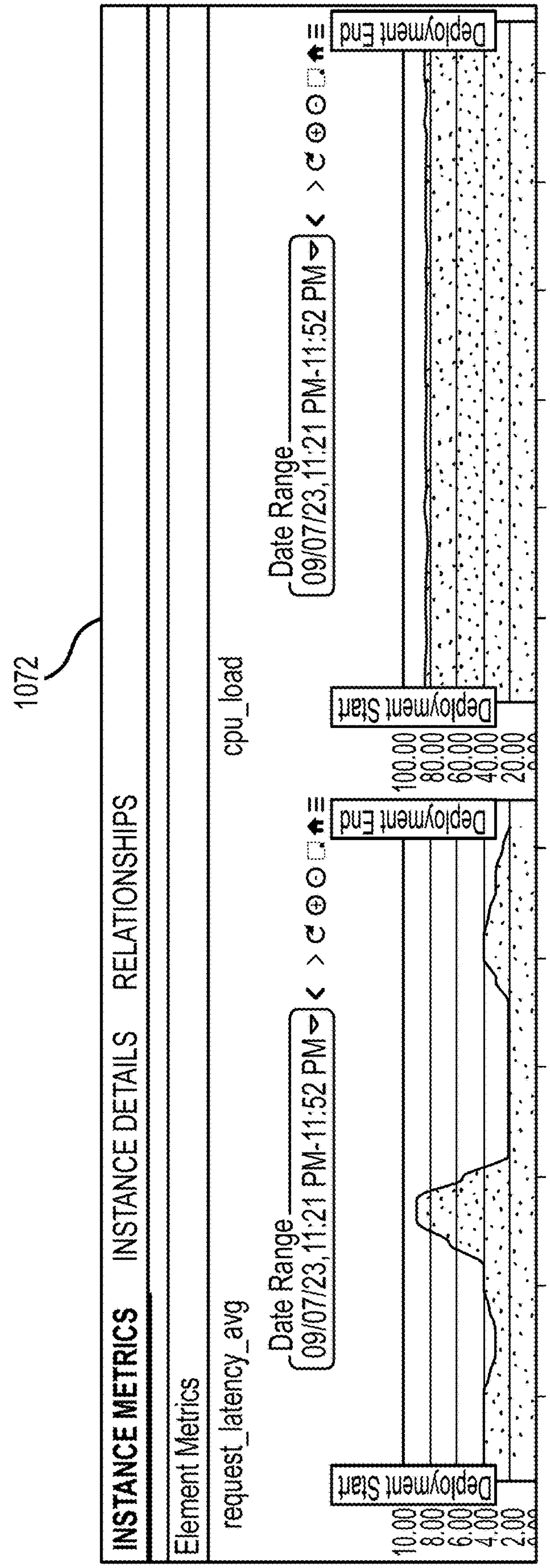

In some embodiments, when a user drills down into a model element, they may see graphs for any metrics and any derived metrics associated with the model element or with specific bound inventory elements. For example, FIG. 10P illustrates further dynamic capabilities of the dynamic dashboard 1072. In this example, the dynamic dashboard 1072 provides access to graphs for various metrics associated with an instance 1078. In this example, the graph plots request latency over some window of time. The window of time may be adjusted to visualize changes in the metric over some desired period of time. Many variations are possible.

Figure 11:
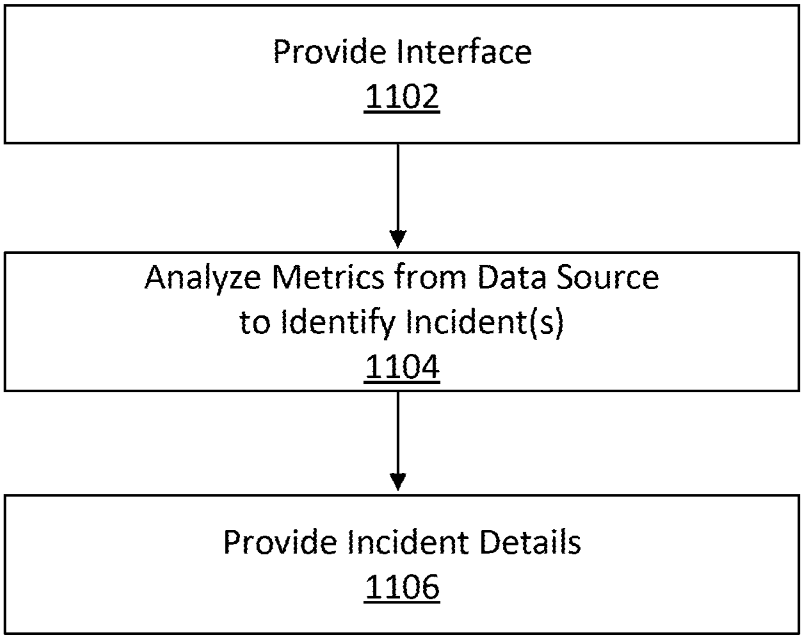
FIG. 11 is an example flowchart for model-driven incident analysis according to some embodiments.
Figure 12A:
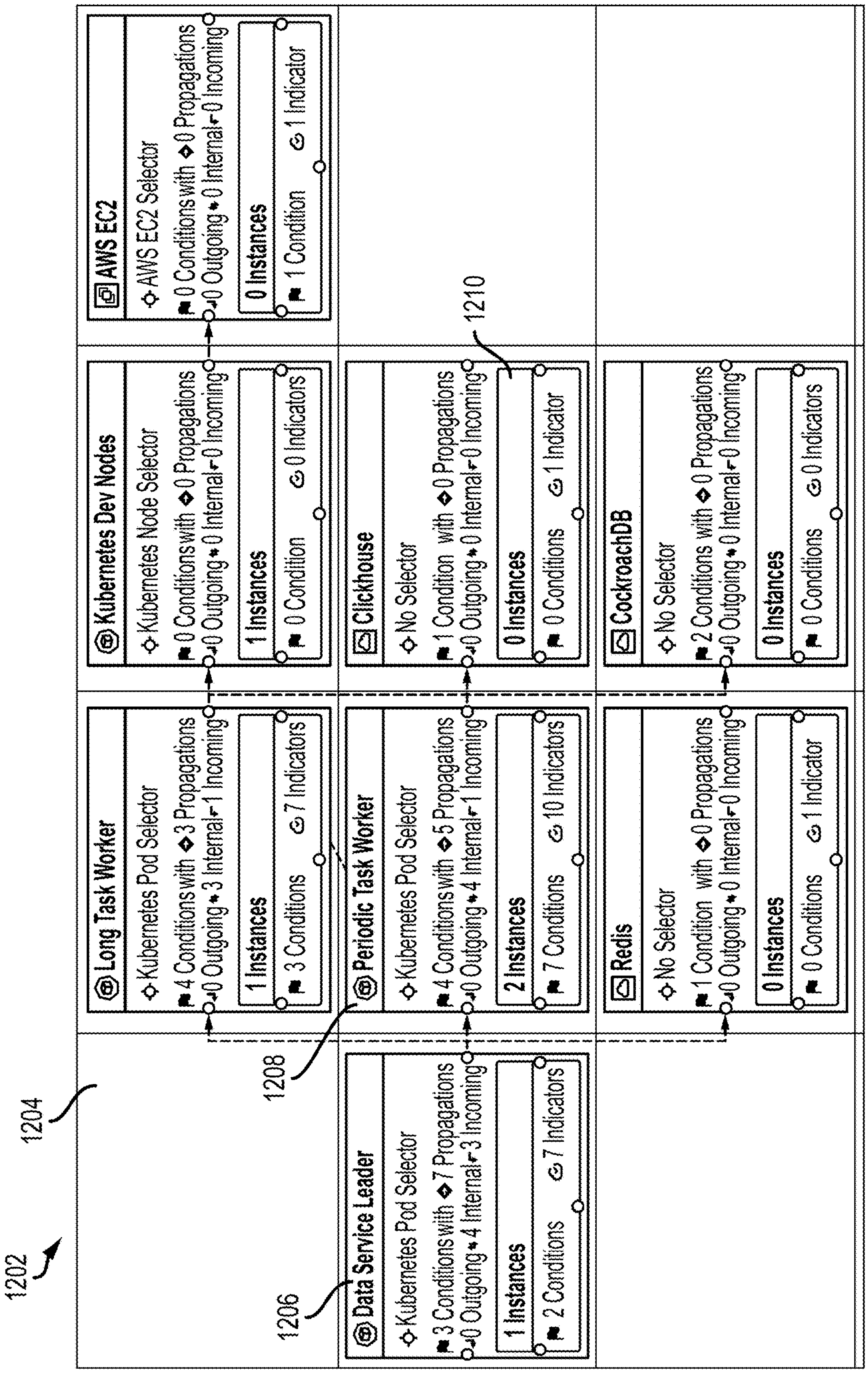
FIGS. 12A-12C illustrate examples related to incident analysis according to some embodiments.

FIG. 11 illustrates an example flowchart 1100 for model-driven incident analysis. In step 1102, the infrastructure management system 202 provides a graphical user interface 1202 that allows access to a model explorer tool, as illustrated in the example of FIG. 12A. The interface 1202 allows a user to visualize elements of a bound system model 1204 representing a deployed system infrastructure. The bound system model 1204 includes a data service leader element 1206 that is responsible for directing inventory and data ingestion as well as model and data pipeline processing. The bound system model 1204 also includes a periodic task worker element 1208 that is responsible for executing tasks for syncing inventory, pulling metrics, and running model resolution. Further, the bound system model 1204 includes a Clickhouse element 1210. In this example, Clickhouse is a third-party cloud service with limited telemetry. The Clickhouse service may be observed indirectly by monitoring errors from other services provided by the bound system model 1204.

In step 1104, the infrastructure management system 202 may analyze metric data from various data sources to identify any incidents that arise. In various embodiments, incidents may be triggered on an element-by-element basis based on respective metrics associated with those elements. For example, an incident may be triggered when one or more metrics satisfy threshold over some window of time. In some embodiments, incidents may be linked to model root causes.

In the example of FIG. 12A, an incident may arise due to a configuration error that makes queries in Clickhouse fail only from certain Kubernetes pods, which causes ingest and data processing to fail. In this example, this infrastructure management system 202 may detect the incident based on a root cause model that identifies relationships between model elements, including causal edges and impact edges between model elements.

Figure 12B:
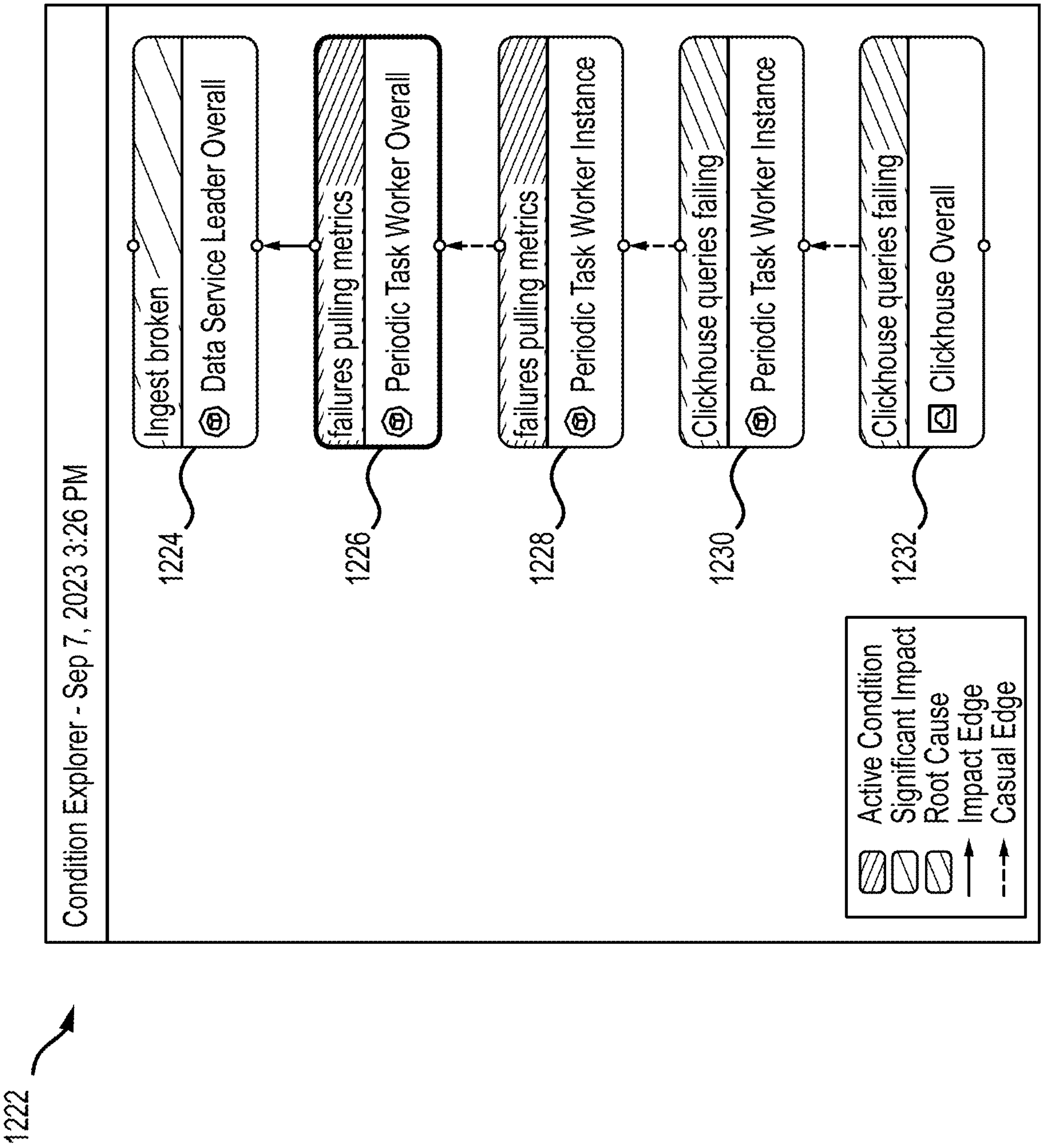

The root cause may be modeled in an interface 1222, as illustrated in the example of FIG. 12B. In FIG. 12B, the data service leader element 1206 is associated with an "Ingest Broken" (Significant Impact) modeled impact condition 1224. Further, the periodic task worker element 1208 may be associated with the following modeled impacts: "Failure pulling metrics" (overall) 1226, "Failure pulling metrics" (instance) 1228, and "Clickhouse queries failing" (instance) 1230. The periodic task worker element 1208 may be associated with the following indicators: "Rate of errors pulling metrics" (for each instance), "Sum of rate of errors pulling metrics" (overall), and "Rate of errors querying clickhouse" (for each instance). Further, the periodic task worker element 1208 may be associated with the following propagations: "Failure pulling metrics" (overall) propagates to "Ingest Broken" and "Failure pulling metrics" (instance) propagates to "Failure pulling metrics" (overall). The Clickhouse element 1210 may be associated with the following modeled root causes: "Clickhouse queries failing" (overall) 1232. The Clickhouse element 1210 may be associated with the following indicator: "Sum of rate of errors querying Clickhouse" (aggregated across pods that use Clickhouse). Further, the Clickhouse element 1210 may be associated with the following propagation: "Clickhouse queries failing" (overall) propagates to "Failure pulling metrics" (instance).

In some embodiments, when an incident occurs in the deployed system infrastructure of FIG. 12A, the infrastructure management system 202 may analyze information or outputs (e.g., metrics) generated by elements, for example, based on associated selectors and indicators, with respect to any modeled root causes. In various embodiments, incidents may be modeled based on other criteria, such as a cost associated with operating the deployed system infrastructure.

Figure 12C:
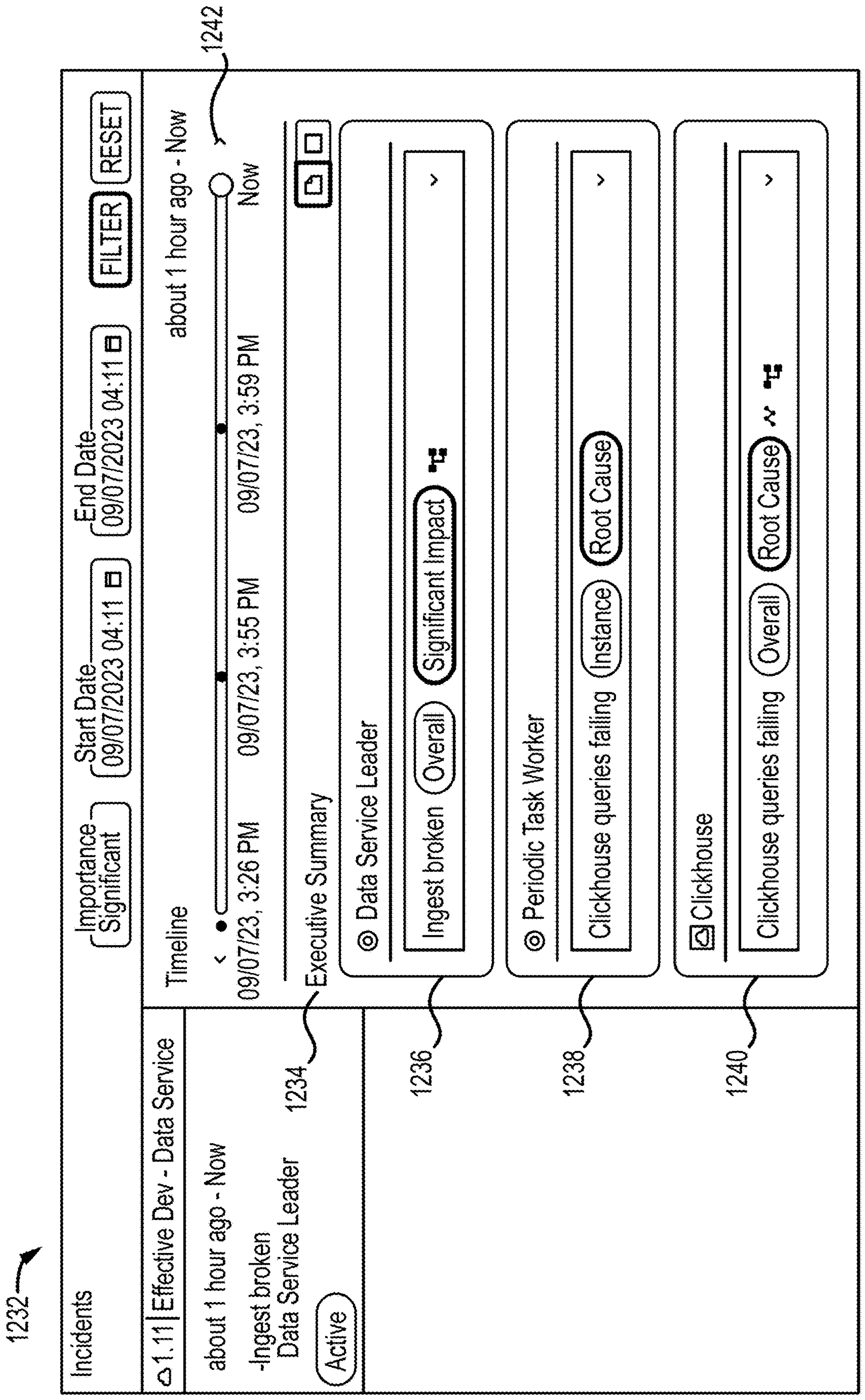

In step 1106, based on the incident analysis, the infrastructure management system 202 may provide incident details in one or more interfaces. For example, in some embodiments, the infrastructure management system 202 may generate and provide an executive summary 1232, as shown in the example of FIG. 12C. The executive summary 1232 may provide a hierarchical overview 1234 of the elements involved in the incident. In this example, the executive summary 1232 indicates that an ingest broken condition 1236 is triggered with a "significant impact". Further, a root cause 1238 shows Clickhouse queries failing on a periodic task worker instance. Further still, a root cause 1240 is also shown, since an aggregate metric for Clickhouse is triggered with an overall high error rate for all queries against Clickhouse. Many variations are possible. In some embodiments, a timeline selector 1242 may be used to access information (e.g., root causes, impacts, etc.) at a particular time or during some period of time.

In some embodiments, the infrastructure management system 202 may provide a condition graph in addition to the executive summary 1232. The condition graph may be represented similar to the example of FIG. 12B, and may show a chain of causality for a propagation condition related to the incident. For example, the condition graph may show that "Clickhouse queries failing" is triggered for Clickhouse Overall, which propagates to "Clickhouse queries failing" being triggered for Periodic Task Worker Instance, which propagates to "Failure pulling metrics" for the Periodic Task Worker Instance, which propagates to "Failure pulling metrics" for Periodic Task Worker Overall, which finally propagates to "Ingest Broken" for Data Service Leader Overall.

In some embodiments, the infrastructure management system 202 may be configured to provide an apparent state simulating a failure condition or incident based on user input specifying information about a hypothetical state of a deployed system infrastructure. For example, the hypothetical state may be created via a GUI that includes options to adjust states of model elements associated with the deployed system infrastructure.

Figure 13:
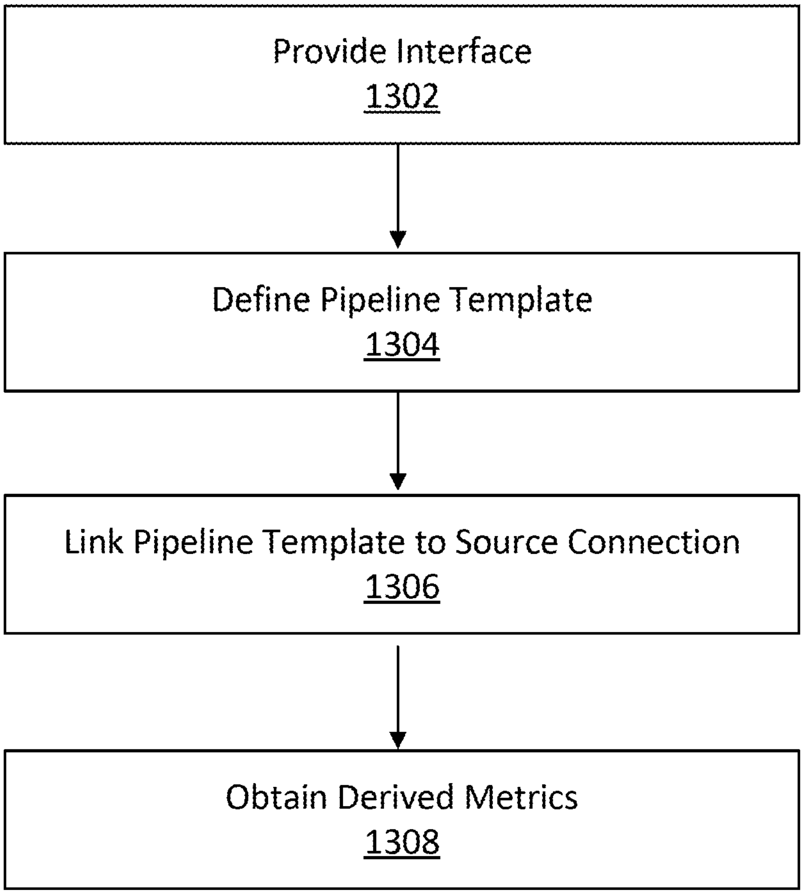
FIG. 13 is an example flowchart for applying model-driven metric pipelines to generate derived metrics according to some embodiments.
Figure 14A:
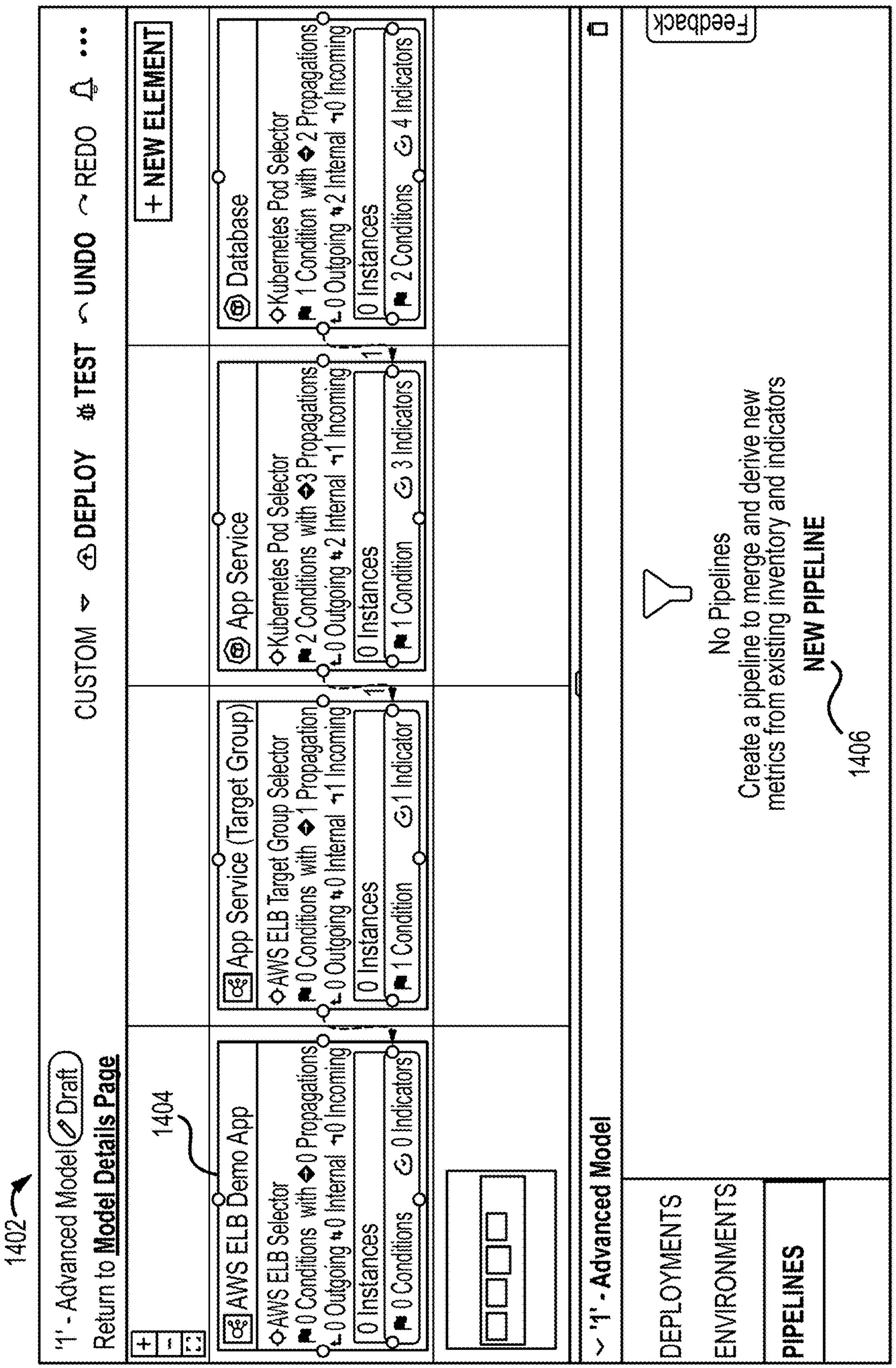
FIGS. 14A-14I illustrate examples related to applying model-driven metric pipelines to generate derived metrics according to some embodiments.

FIG. 13 illustrates an example flowchart 1300 for applying model-driven metric pipelines to generate derived metrics. In step 1302, the infrastructure management system 202 provides a graphical user interface 1402 that allows access to a bound system model 1404 representing a deployed system infrastructure, as illustrated in the example of FIG. 14A. The interface 1402 allows a user to visualize elements of the bound system model 1404.

The infrastructure management system 202 may provide options 1406 for adding new metric pipelines that may generate derived metrics by applying any number of operations and combinations to outputs generated by any number of elements. In various embodiments, derived metrics may be metrics that are generated by performing some sort of query or computation against other metrics or data. A derived metric in the bound system model may be the result of processing one or more other metrics into a new metric. For example, an indicator in the system model may be defined to select a set of metrics, and a user can then specify a metric pipeline that should be run on the metrics selected by the indicator in order to compute a final derived metric.

In step 1304, the infrastructure management system 202 may be used to define a metric pipeline template that may be bound to various dynamic data sources and used in the context of a hierarchical model. Notably, the underlying data sources may be associated with different types of databases having their own query language. However, according to the embodiments herein, users do not need to understand how to implement such query languages in order to build a metric pipeline template. Rather, users simply identify data sources from which metric data is to be obtained, for example, using associated selectors or indicators.

In some embodiments, a metric pipeline may consist of one or more analysis nodes. An analysis node may consist of: (1) A set of inputs with an ID and a name. An input represents a set of time series streams; (2) A combiner. A combiner takes multiple time series streams and combines them into a single result through some operation. An example of a combiner would be taking the sum of all the input metrics at each point in time. Some combiners can take any number of streams in their inputs while others need exactly one stream to make sense; and (3) A set of input actions. An input action takes an input and applies a list of metric operations to each input metric and then maps the output to the input of the combiner. A metric operation is an operation that takes a single time series and converts it to another time series. Further, the metric pipeline may also consist of: (1) Its own set of inputs, similar to a node, (2) An output, which is the ID of an analysis node whose output will be used as the overall output for the pipeline, (3) A set of input connections that connect inputs to the inputs of analysis nodes, and (4) A set of node connections that connect the output of analysis nodes to the input of other analysis nodes.

Figure 14B:
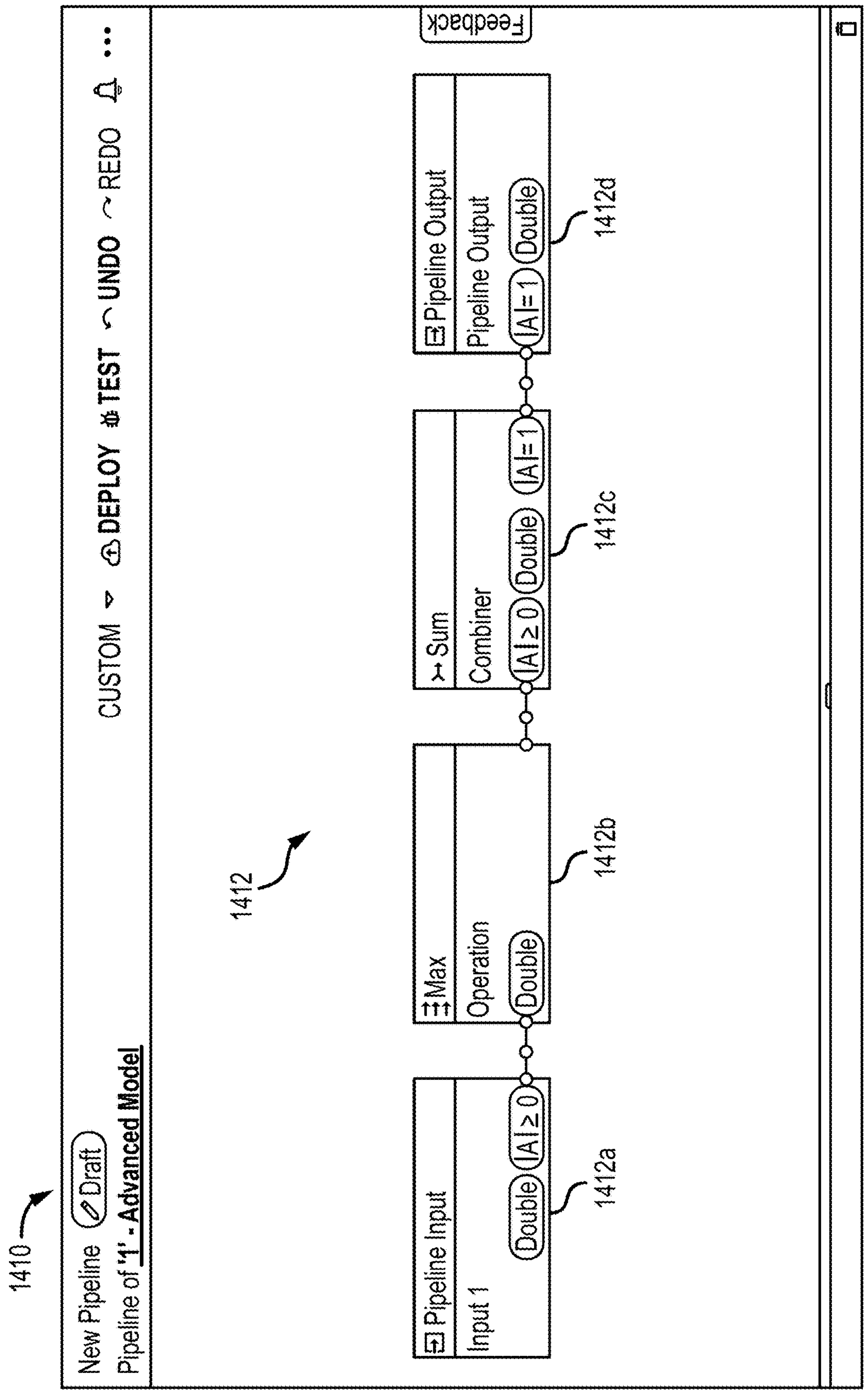

For example, FIG. 14B illustrates an example interface 1410 for defining a metric pipeline 1412. The interface 1410 allows users to graphically model the pipeline to process metrics from various data sources. In this example, the metric pipeline 1412 includes a number of analysis nodes, including a pipeline input node 1412*a*, a metric operation node 1412*b*, a combiner node 1412*c*, and a pipeline output node 1412*d*. Each of the nodes (e.g., operations, combiners, etc.) may be associated with metadata (or properties), including name, description, and information about the inputs and parameters that are required for that definition.

Figure 14C:
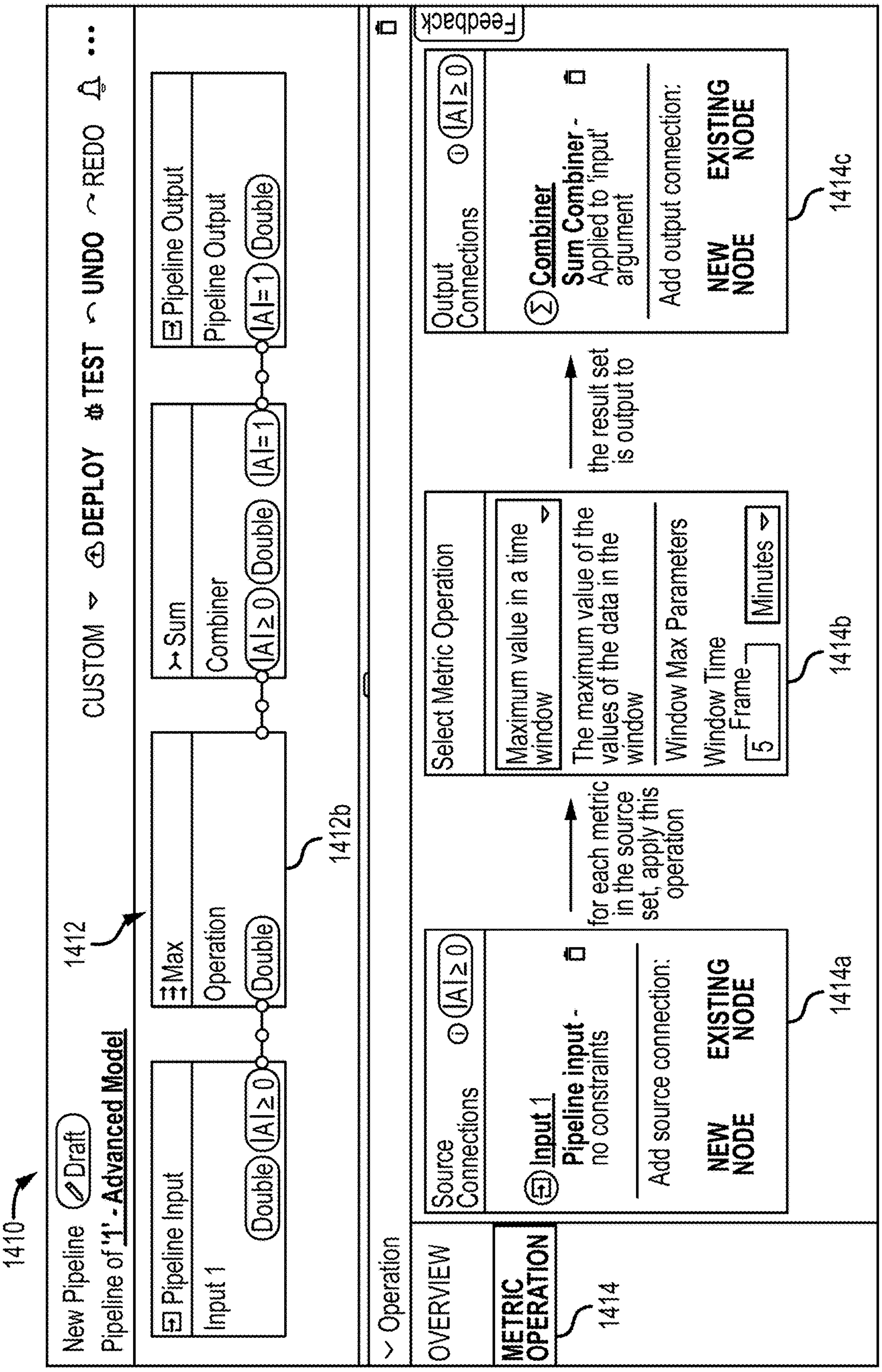

For example, FIG. 14C illustrates the example interface 1410 which has been updated to show details concerning a metric operation 1414 associated with the metric operation node 1412*b*. In this example, the metric operation 1414 is defined so that inputs 1414*a* for the metric operation 1414 are received from the “Pipeline input” node 1412*a* (i.e., source connection). Importantly, the input 1414*a* is not associated a static resource but is rather resolved dynamically based on information provided by any elements or indicators that are linked to the “Pipeline input” node 1412*a*. Thus, the metric pipeline 1412 may be a template that may be reused in different scenarios and for different input sources.

In FIG. 14C, the metric operation 1414 is also defined so that a metric operation 1414*b* (e.g., “maximum value in a time window”) is performed for input data received from the “Pipeline input” node 1412*a* over a window time frame (e.g., 5-minute window). Further, according to the metric pipeline 1412 definition, any results determined by the metric operation 1414*b* are provided to one or more output connections 1414*c*. In this example, the results are provided as inputs to the combiner node 1412*c* which is configured to apply a sum combiner to the inputs.

Figure 14D:
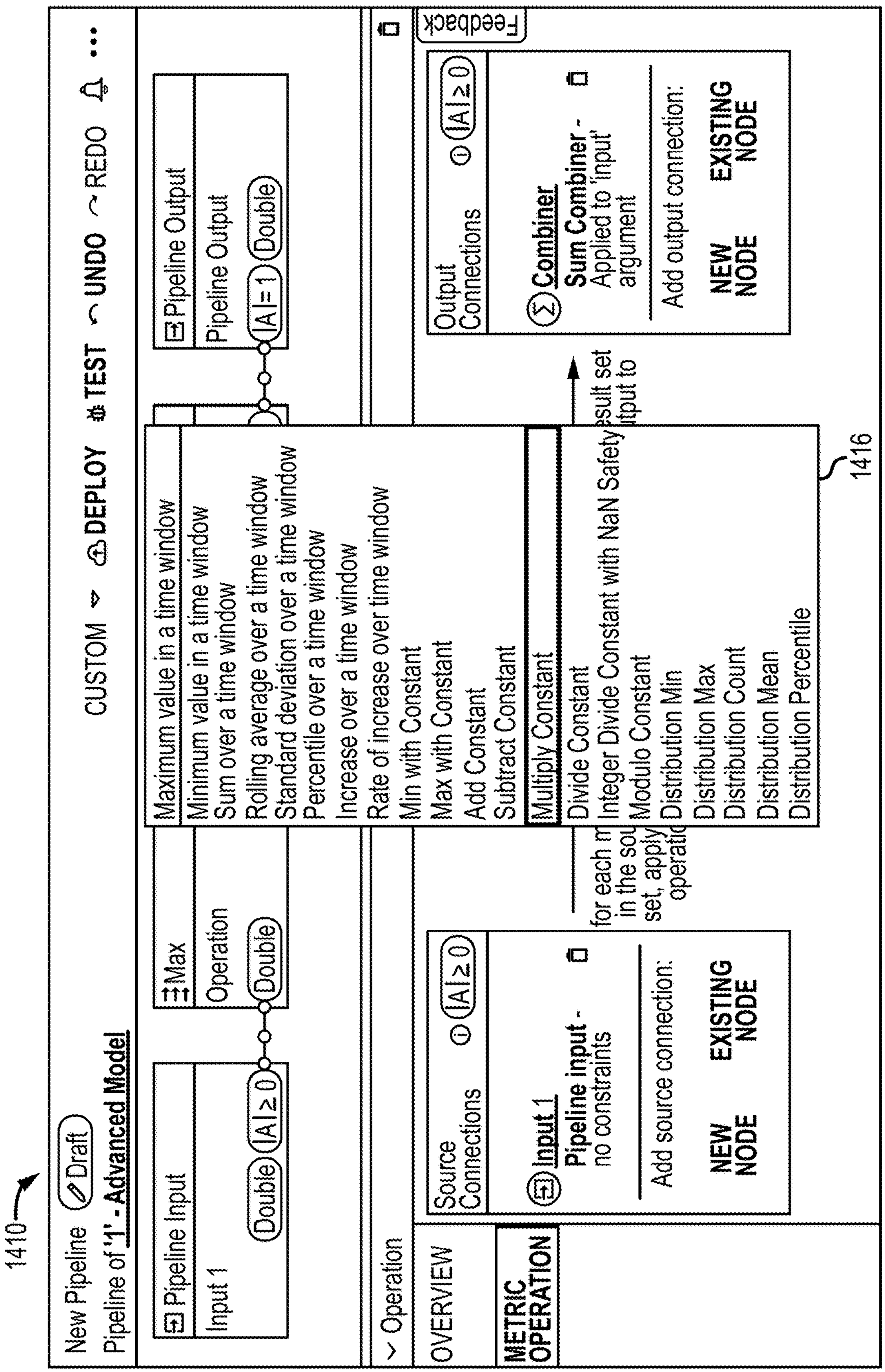
Figure 14E:
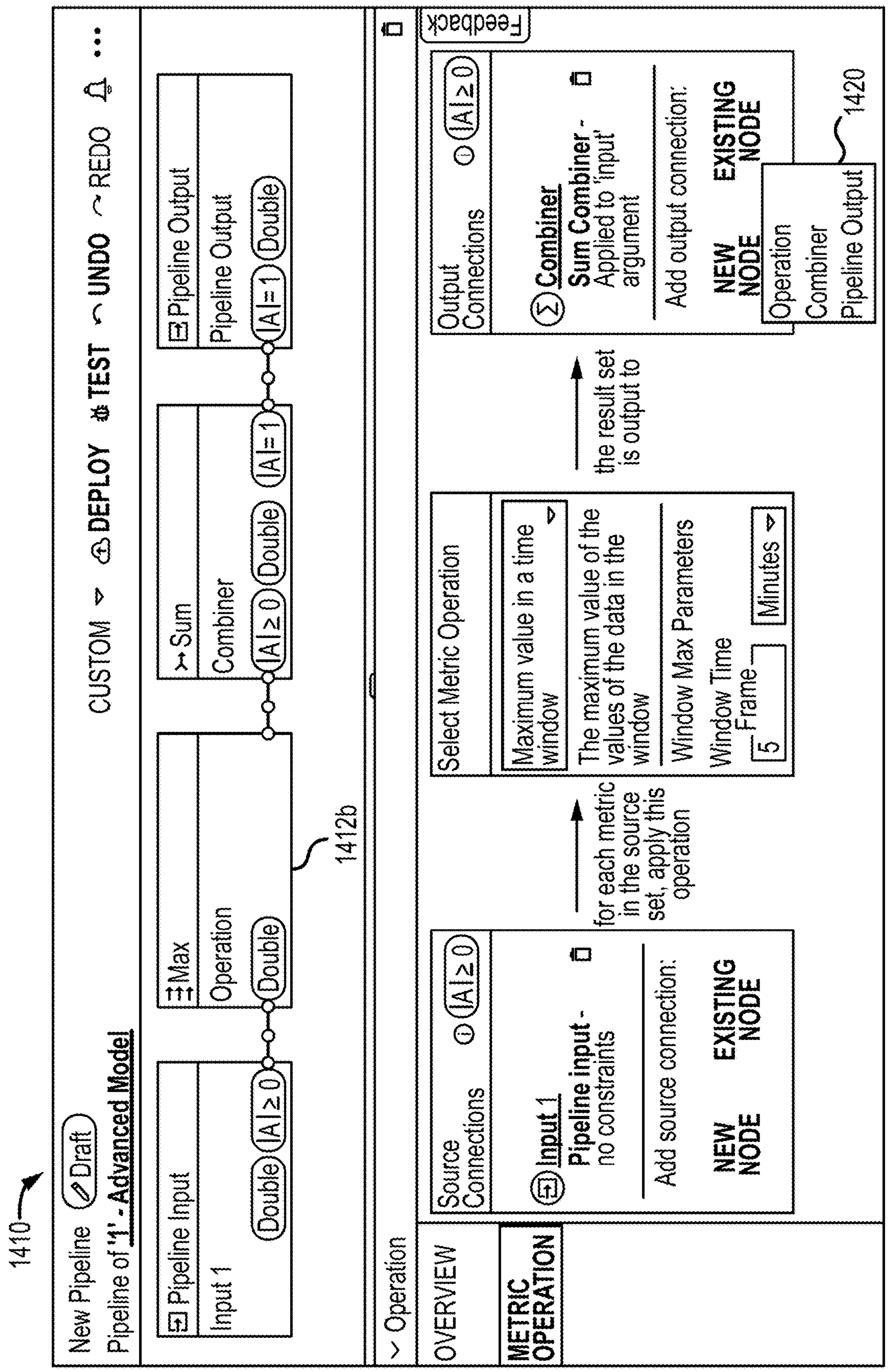

FIG. 14D illustrates an example list 1416 of pre-defined metric operations that may be associated with the metric operation node 1412*b*, including “sum over a time window”, “rolling average over a time window”, “standard deviation over a time window”, among others. The list 1416 is provided as an example and, in various embodiments, users may be able to custom-define their own metric operations to be applied by a given metric node.

Figure 14F:
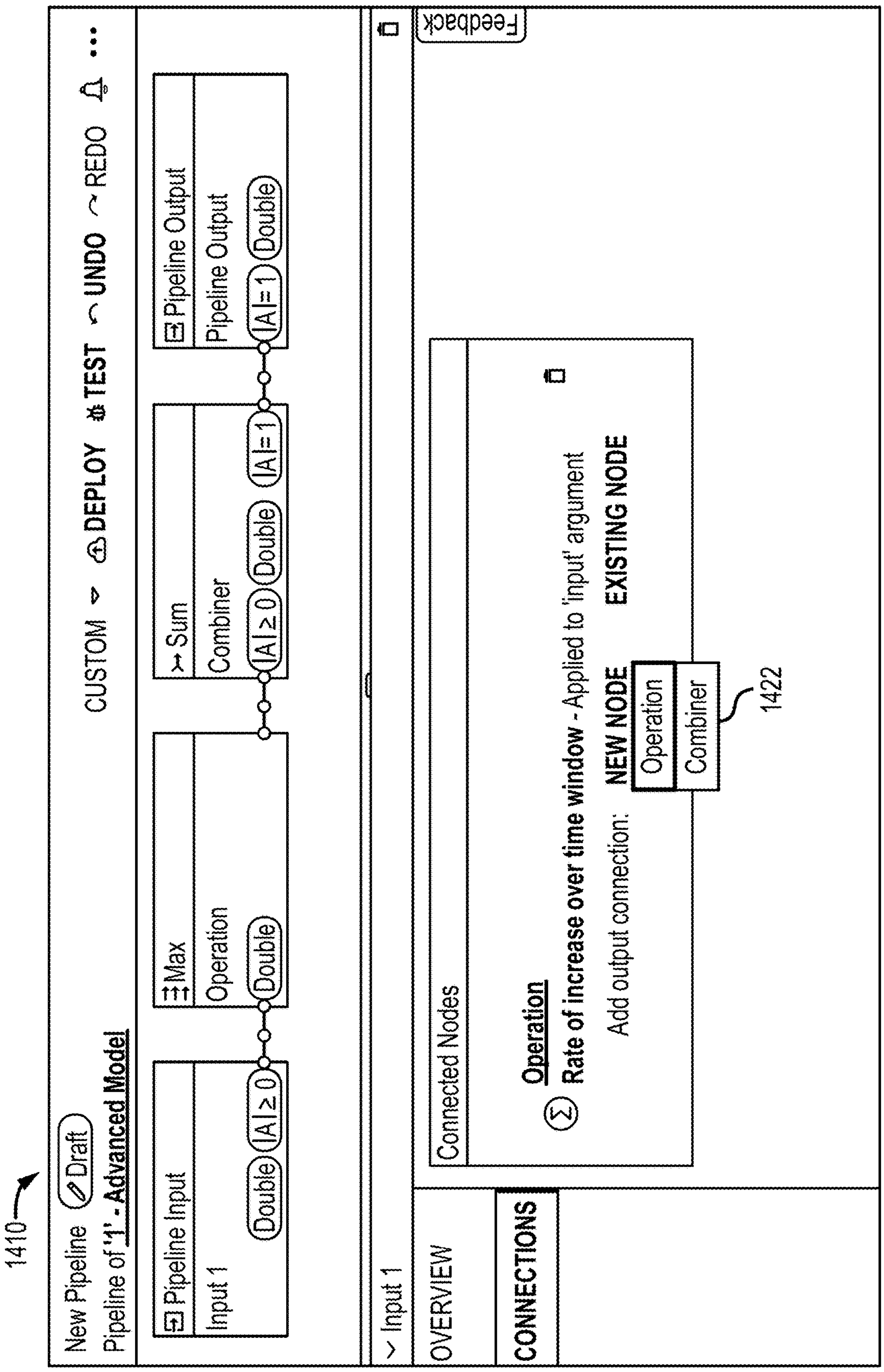
Figure 14G:
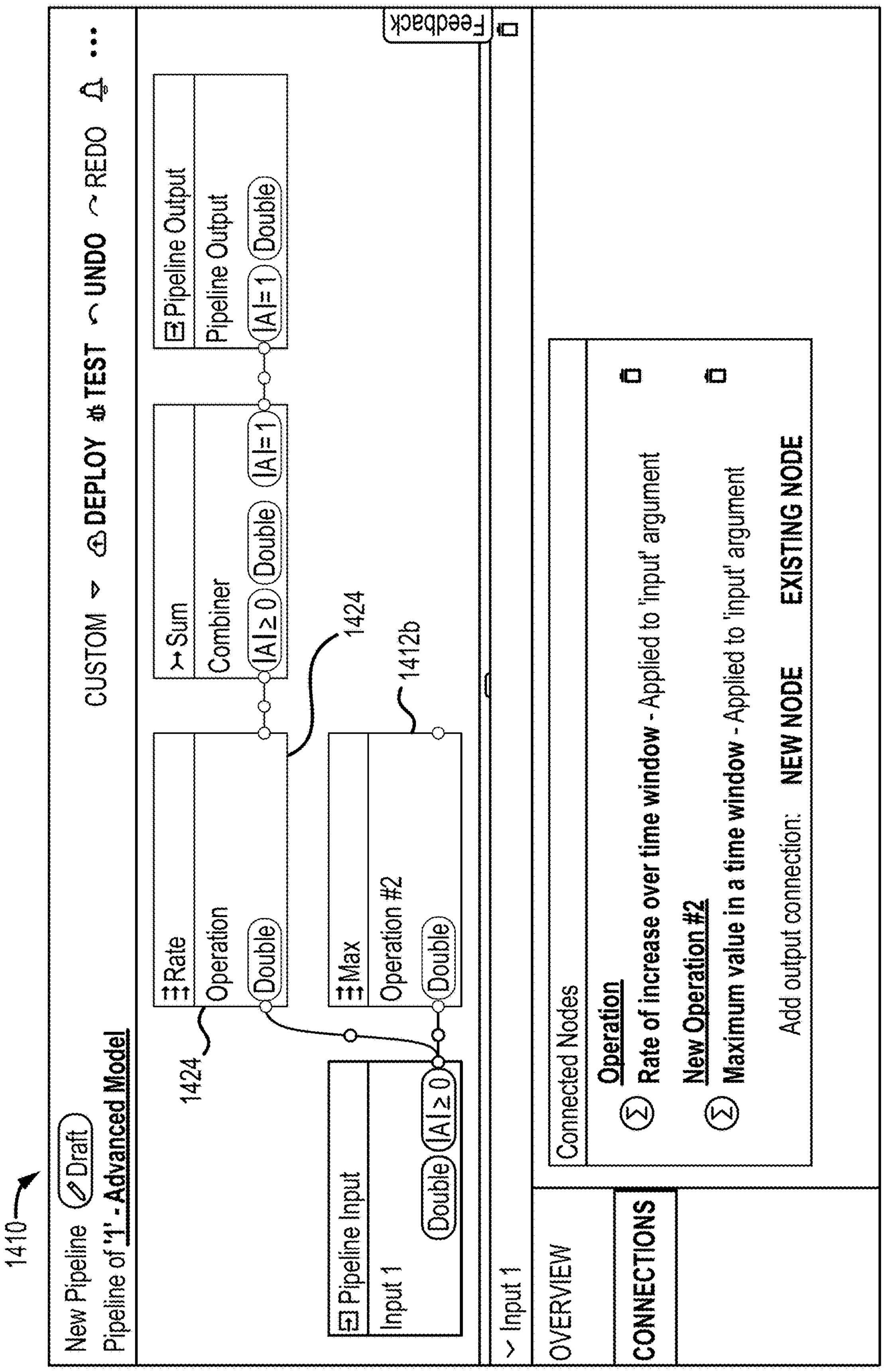

The infrastructure management system 202 may provide options to build more complex metric pipelines by piping outputs from existing nodes to new nodes. For example, in FIG. 14E, the interface 1410 provides an option 1420 that allows outputs from the combiner node 1412*c* to be connected to a new or existing node. In another example, FIG. 14F shows an option 1422 to connect the “Pipeline input” node 1412*a* to a new metric operation node or a new combiner node. In this example, a new node for computing a “rate” metric operation is created, as shown in FIG. 14G. In this example, outputs from the “Pipeline input” node 1412*a* are provided to the “max” metric operation node 1412*b* and the new “rate” metric operation node 1424.

Figure 14H:
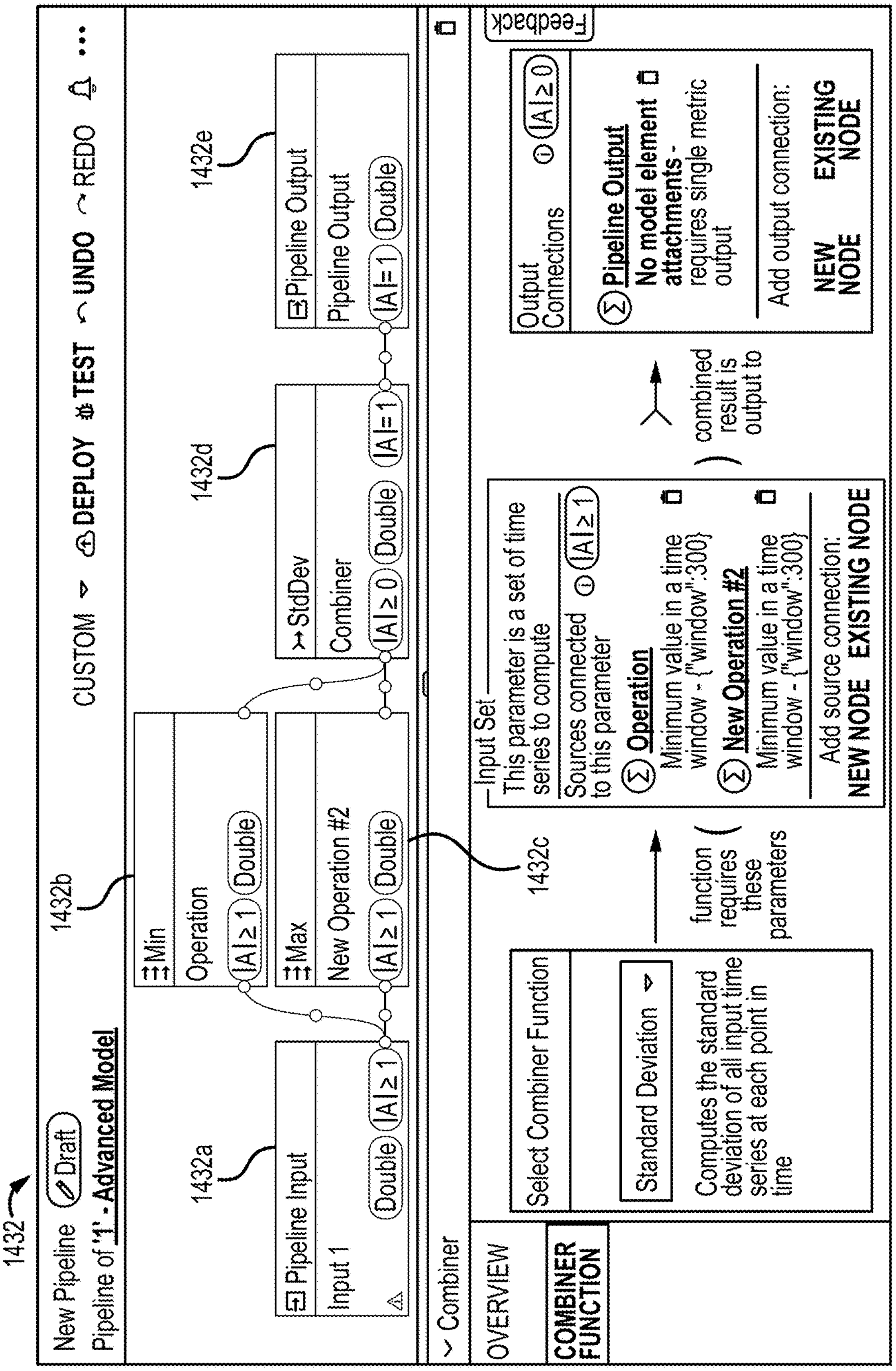

FIG. 14H illustrates another example metric pipeline 1432 that may be created and applied to a bound system model. In FIG. 14H, the metric pipeline 1432 includes an input node 1432*a* that outputs to a first metric operation node 1432*b* (e.g., a “min” operation) and a second metric operation node 1432*c* (e.g., a “max” operation). The outputs from the metric operation nodes 1432*b*, 1432*c* are provided to a combiner node 1432*d*. The combiner node 1432*d* is configured to perform a standard deviation of all input time series at each point in time, as provided by the metric operation nodes 1432*b*, 1432*c*. The combiner node 1432*d* is further configured to provide its output to a pipeline output node 1432*e*. Again, many variations are possible.

In some embodiments, the infrastructure management system 202 may utilize metrics groups. A metric group allows selecting a set of metric time series streams and can be used for metric pipelines. A metric group may consist of: (1) A set of selectors which match on the metric to include; (2) A summarization type that indicates how the matched metrics should be summarized when reducing the cardinality of the data; (3) An interpolation type that indicates a policy for how we should interpolate between two values in the stream; (4) A extrapolation type that indicates how we should extrapolate data past the end of the stream (as long as data window has not expired); and (5) A data window after which the metric should be considered missing. If the data stream is missing, it will be assumed to take on the missing value specified.

In some embodiments, the infrastructure management system 202 may allow indicators to be configured with derived metrics. That is, rather than directly using a selector, indicators may instead configure a set of metric groups. If the user specifies only a single metric group with a single metric, then this can be used directly as the value for the indicator. The user can also include an analysis pipeline to apply to the metric groups. If they do this, they may include pipeline connections that connect the metric groups to the input of the analysis pipeline. The user will be able to visualize all of the matched primary metrics as well as derived metrics which are the result of the computed pipeline in interfaces provided by the infrastructure management system 202.

In some embodiments, the infrastructure management system 202 may implement two selector types: inventory selectors and indicator selectors. In some embodiments, an inventory selector matches on inventory using filtering by data sources and inventory labels. In some embodiments, an indicator selector does not directly match on inventory, but rather picks the resulting metric(s) of the target indicator. If the target indicator is associated with a pipeline, then any metrics generated by the pipeline may be used.

Figure 14I:
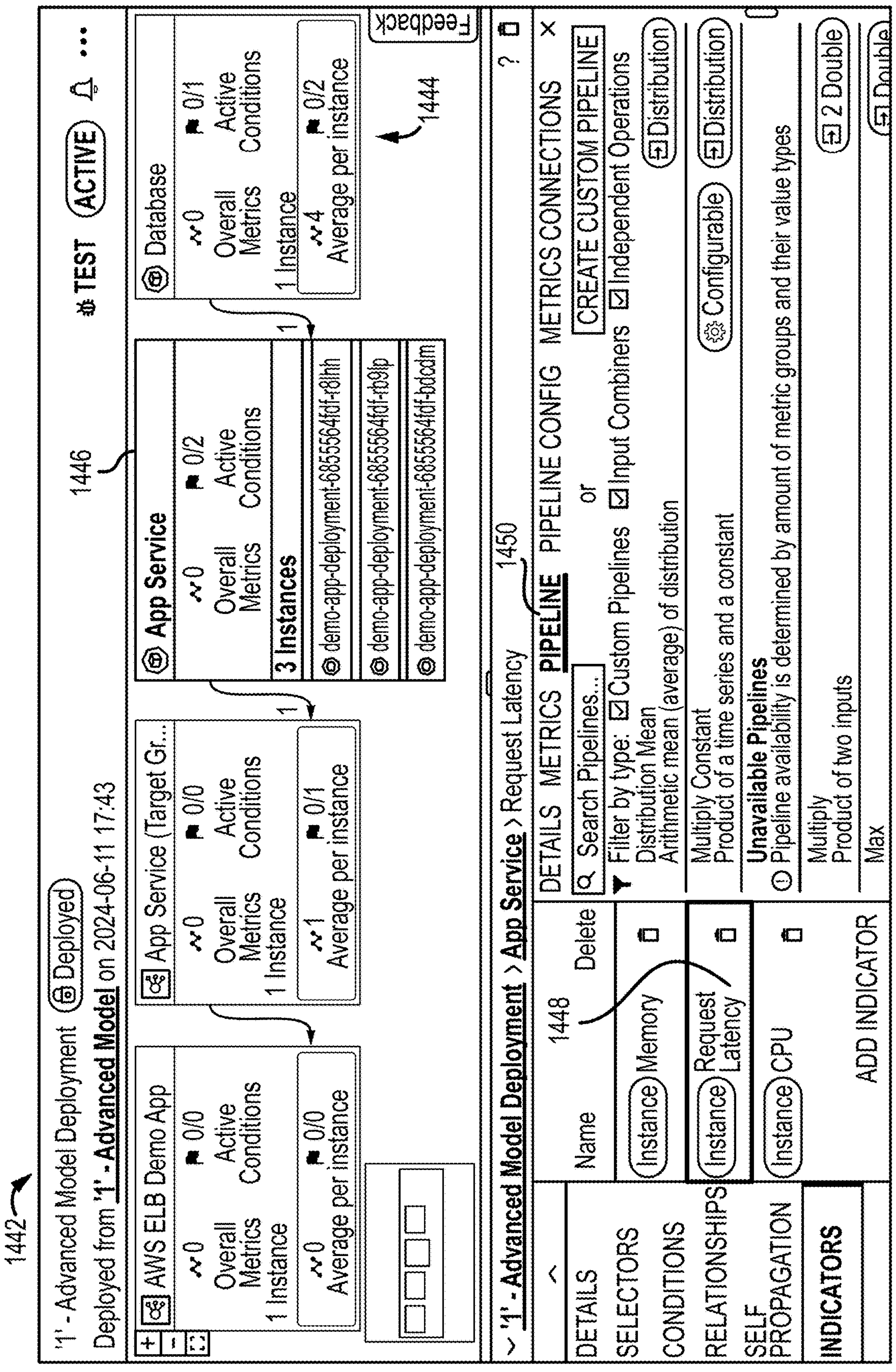

In step 1306, the infrastructure management system 202 may be used to link a metric pipeline template to a source connection. For example, FIG. 14I illustrates an example interface 1442 showing a bound system model 1444 of a deployed system infrastructure. In this example, a region of the interface 1442 provides access to various properties associated with an "app service" element 1446, such as details, selectors, conditions, relationships, propagations, and indicators. In this example, an indicator 1448 that provides "request latency" metric data may be linked to a pipeline. For example, a user may select one or more pipelines from a menu 1450 that shows available pipeline templates. Once linked, metric data from the indicator 1448 may be provided as input to a linked pipeline which processes the input data to output one or more derived metrics.

In step 1308, the infrastructure management system 202 may generate derived metrics according to the linked metric pipeline template. In some embodiments, the derived metrics may be provided as output to other connections, such as another indicator. The derived metrics may thus be reflected in any of the interfaces (e.g., dashboards) and used to better manage deployed system infrastructure, as described herein.

In some embodiments, the infrastructure management system 202 may provide functionality for chaining pipelines. For example, the infrastructure management system 202 may allow users to chain pipelines within a model as well as across different models. For example, a practical application of chained pipelines involves aggregating an instance-scoped indicator based on multiple metrics into a single overall-scoped indicator. To achieve that, an instance-scoped indicator can first be created and selector(s) that match all metrics of interest may be defined. If multiple metrics are expected to match, then a combining pipeline may be created (or pre-defined pipeline may be referenced) on the indicator. Next, an overall-scope indicator on the same element (or any other) may be created. The overall-scope indicator may use indicator-type selector referencing the instance-scoped indicator. For instance-to-overall linkage, a combining pipeline is typically required. Another practical application of chained pipelines is that indicators can select on indicators in other model elements. Here, an indicator for an element for which there exists a relationship can be used as the input. This way, the infrastructure management system 202 can walk along the model graph edge to find the relevant metrics.

Figure 15A:
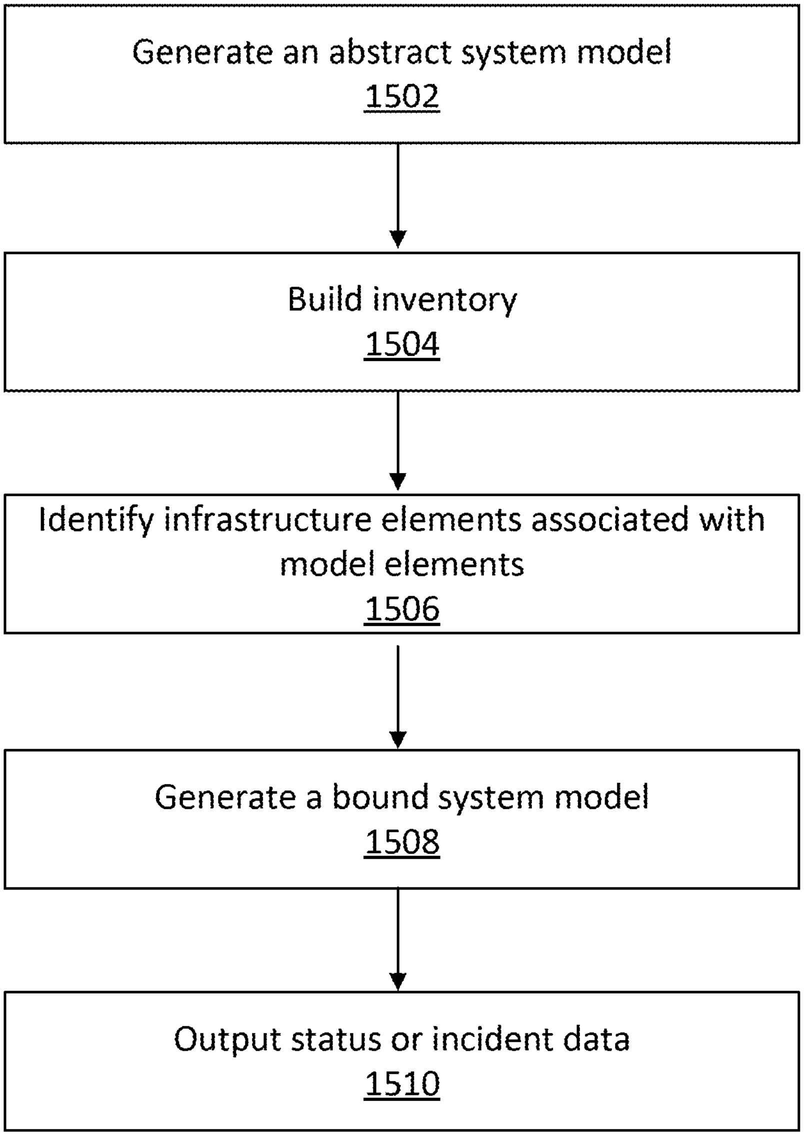
FIG. 15A illustrates an example process according to some embodiments.

FIG. 15A illustrates an example process according to some embodiments. In step 1502, an abstract system model comprising one or more model elements corresponding to one or more infrastructure elements of the deployed system infrastructure is generated. Each model element of the one or more model elements specifies one or more selectors, and for each model element of the one or more model elements, each selector of the respective one or more selectors of the model element includes an indication of at least one infrastructure element, from the one or more infrastructure elements, that is associated with the model element. In step 1504, an inventory of the one or more infrastructure elements is built. In step 1506, for at least one model element of the one or more model elements, at least one infrastructure element of the inventory associated with the at least one model element is identified as indicated by the respective one or more selectors of the at least one model element. In step 1508, a bound system model comprising one or more associations between the one or more model elements of the abstract system model and the inventory of the one or more infrastructure elements is generated. The one or more associations are determined based at least in part on the identified at least one infrastructure element of the inventory associated with the at least one model element. In step 1510, data indicative of a status of the deployed system infrastructure, an incident occurring within the deployed system infrastructure, or both, is outputted as generated using the bound system model.

Figure 15B:
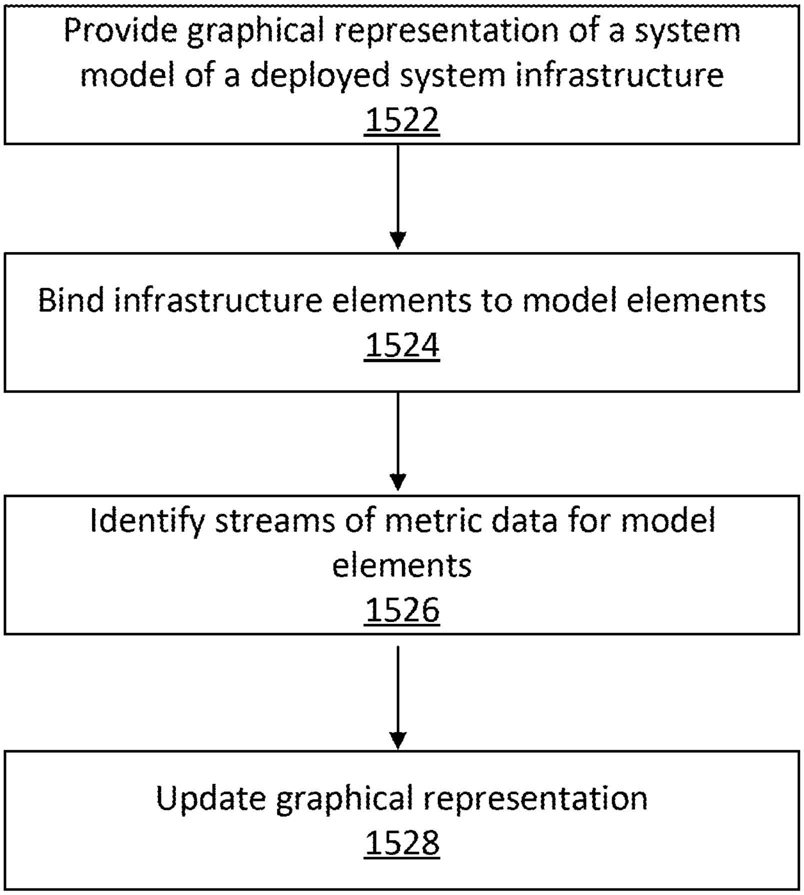
FIG. 15B illustrates an example process according to some embodiments.

FIG. 15B illustrates an example process according to some embodiments. In step 1522, a graphical user interface (GUI) comprising a graphical representation of one or more model elements of a system model of the deployed system infrastructure is provided. The GUI is configured to enable a user to: define at least one selector, the at least one selector comprising a rule for binding a set of one or more infrastructure elements of the deployed system infrastructure to a first model element of the one or more model elements; and define at least one indicator to identify at least one stream of metric data for the first model element from a metric data source. In step 1524, responsive to receiving user input defining the at least one selector, a set of one or more infrastructure elements are bound to the first model element. In step 1526, responsive to receiving user input defining the at least one indicator, the at least one stream of metric data is identified for the first model element. In step 1528, the GUI is updated to include a representation of: the set of one or more infrastructure elements bound to the first model element, and the at least one indicator.

Figure 15C:
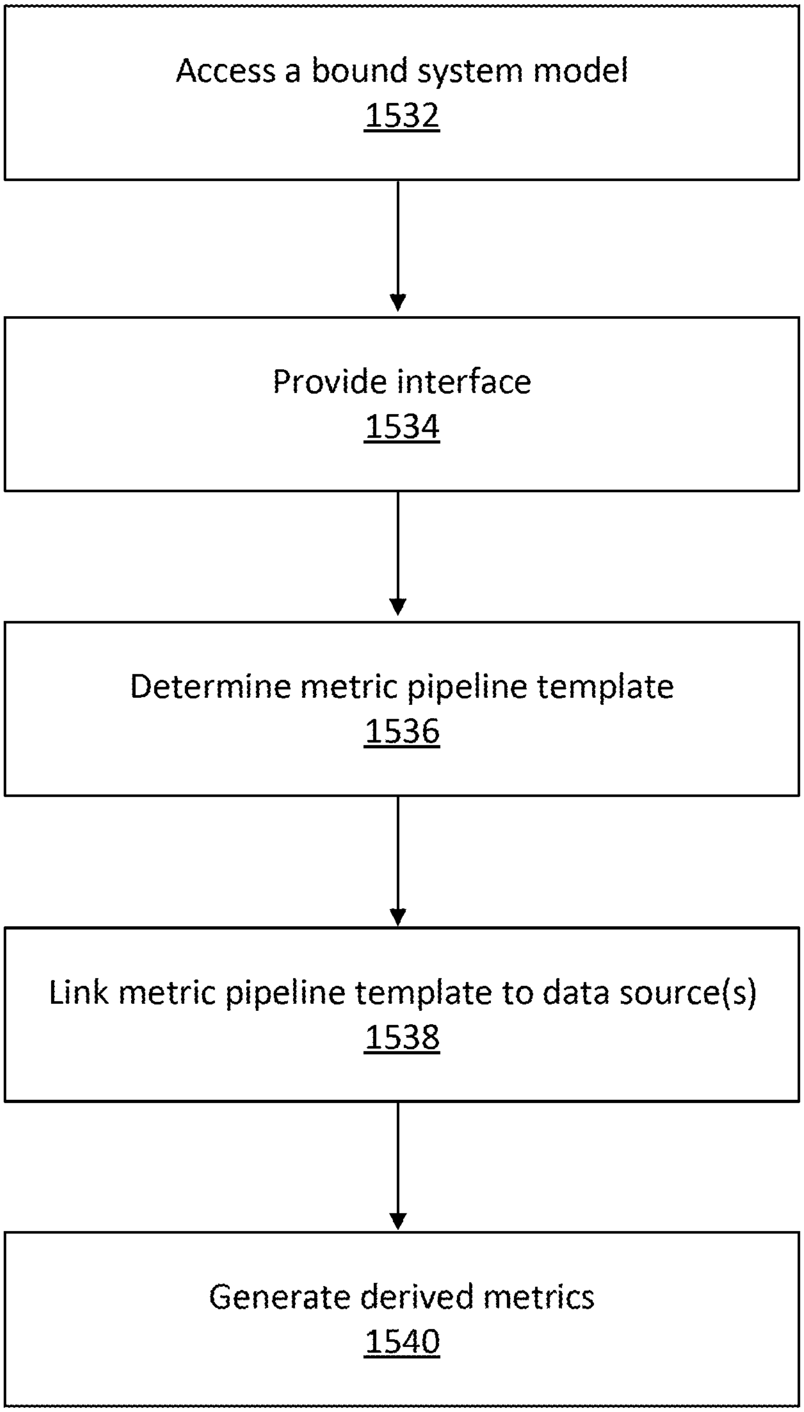
FIG. 15C illustrates an example process according to some embodiments.

FIG. 15C illustrates an example process according to some embodiments. In step 1532, a bound system model comprising one or more associations between one or more model elements of an abstract system model that represents a deployed system infrastructure and one or more inventory elements included in an inventory is accessed. The inventory may be populated based on one or more data sources associated with the deployed system infrastructure. In step 1534, a graphical representation of the abstract system model is provided in a graphical user interface (GUI). The GUI may provide options to define (or visually construct) a metric pipeline template to be associated with the bound system model. In step 1536, a definition for the metric pipeline template is determined based at least in part on user input via the GUI, wherein the metric pipeline template comprises a plurality of nodes that process inputs to generate derived metrics. In step 1538, a link between at least one data source associated with the deployed system infrastructure and the metric pipeline template is established based on user input via the GUI. In step 1540, the one or more derived metrics are generated based at least in part on inputs received based on the link established between the at least one data source and the metric pipeline template.

Figure 16:
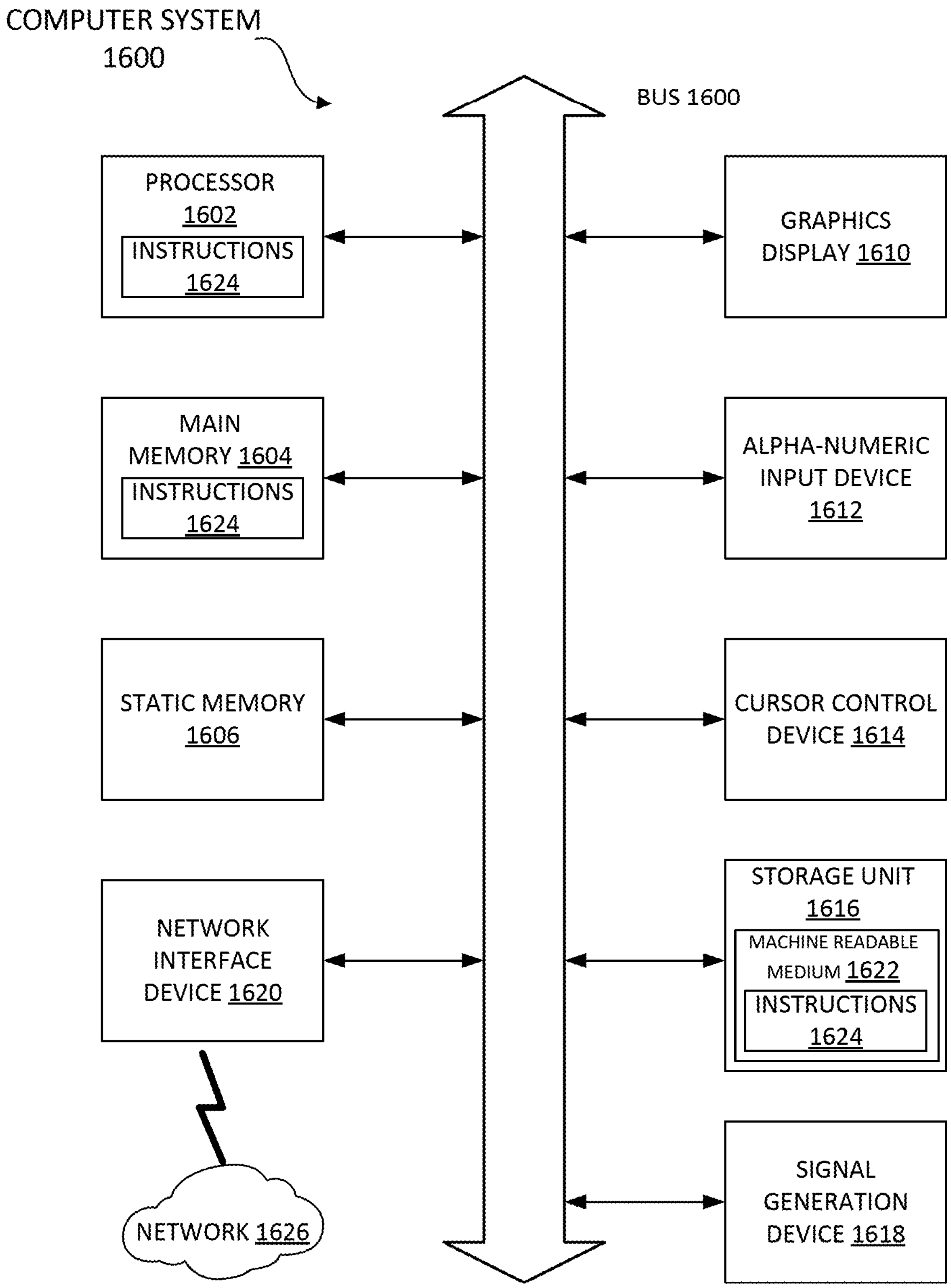
FIG. 16 is a block diagram illustrating an example computing system.

FIG. 16 is a block diagram illustrating a digital device in one example. The digital device may read instructions from a machine-readable medium and execute those instructions by a processor to perform the machine processing tasks discussed herein, such as the engine operations discussed above. Specifically, FIG. 16 shows a diagrammatic representation of a machine in the example form of a computer system 1600 within which instructions 1624 (e.g., software) for causing the machine to perform any one or more of the methodologies discussed herein may be executed. In alternative embodiments, the machine operates as a standalone device or may be connected (e.g., networked) to other machines, for instance, via the Internet. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 1624 (sequential or otherwise) that specify actions to be taken by that machine. Further, while only a single machine is illustrated, the term "machine" shall also be taken to include any collection of machines that individually or jointly execute instructions 1624 to perform any one or more of the methodologies discussed herein.

The example computer system 1600 includes a processor 1602 (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 1604, and a static memory 1606, which are configured to communicate with each other via a bus 1608. The computer system 1600 may further include a graphics display unit 1610 (e.g., a plasma display panel (PDP), a liquid crystal display (LCD), a projector, or a cathode ray tube (CRT)). The computer system 1600 may also include alphanumeric input device 1612 (e.g., a keyboard), a cursor control device 1614 (e.g., a mouse, a trackball, a joystick, a motion sensor, or other pointing instrument), a data store 1616, a signal generation device 1618 (e.g., a speaker), and a network interface device 1620, which also is configured to communicate via the bus 1608.

The data store 1616 includes a machine-readable medium 1622 on which is stored instructions 1624 (e.g., software) embodying any one or more of the methodologies or functions described herein. The instructions 1624 (e.g., software) may also reside, completely or at least partially, within the main memory 1604 or within the processor 1602 (e.g., within a processor's cache memory) during execution thereof by the computer system 1600, the main memory 1604 and the processor 1602 also constituting machine-readable media. The instructions 1624 (e.g., software) may be transmitted or received over a network 1626 via network interface 1620.

While machine-readable medium 1622 is shown in an example embodiment to be a single medium, the term "machine-readable medium" should be taken to include a single medium or multiple media (e.g., a centralized or distributed database, or associated caches and servers) able to store instructions (e.g., instructions 1624). The term "machine-readable medium" shall also be taken to include any medium that is capable of storing instructions (e.g., instructions 1624) for execution by the machine and that cause the machine to perform any one or more of the methodologies disclosed herein. The term "machine-readable medium" includes, but should not be limited to, data repositories in the form of solid-state memories, optical media, and magnetic media.

In this description, the term "engine" refers to computational logic for providing the specified functionality. An engine can be implemented in hardware, firmware, and/or software. Where the engines described herein are implemented as software, the engine can be implemented as a standalone program, but can also be implemented through other means, for example as part of a larger program, as any number of separate programs, or as one or more statically or dynamically linked libraries. It will be understood that the named engines described herein represent one embodiment, and other embodiments may include other engines. In addition, other embodiments may lack engines described herein and/or distribute the described functionality among the engines in a different manner. Additionally, the functionalities attributed to more than one engine can be incorporated into a single engine. In an embodiment where the engines as implemented by software, they are stored on a computer readable persistent storage device (e.g., hard disk), loaded into the memory, and executed by one or more processors as described above in connection with FIG. 16. Alternatively, hardware or software engines may be stored elsewhere within a computing system.

As referenced herein, a computer or computing system includes hardware elements used for the operations described here regardless of specific reference in FIG. 16 to such elements, including, for example, one or more processors, high-speed memory, hard disk storage and backup, network interfaces and protocols, input devices for data entry, and output devices for display, printing, or other presentations of data. Numerous variations from the system architecture specified herein are possible. The entities of such systems and their respective functionalities can be combined or redistributed.

What is claimed is:

1. A method of modeling a deployed system infrastructure of a cloud computing environment, the method comprising:

generating, by one or more processors, an abstract system model comprising one or more model elements corresponding to one or more infrastructure elements of the deployed system infrastructure, wherein:

each model element of the one or more model elements specifies one or more selectors, and for each model element of the one or more model elements, each selector of the respective one or more selectors of the model element includes an indication of at least one infrastructure element, from the one or more infrastructure elements, that is associated with the model element;

building, by the one or more processors, an inventory of the one or more infrastructure elements;

for at least one model element of the one or more model elements, identifying, by the one or more processors, the at least one infrastructure element of the inventory associated with the at least one model element as indicated by the respective one or more selectors of the at least one model element;

generating, by the one or more processors, a bound system model by combining the inventory of the one or more infrastructure elements with the abstract system model based on the one or more model elements, the respective one or more selectors of the one or more model elements, or a combination thereof, the bound system model mapping the one or more model elements of the abstract system model to corresponding infrastructure elements from the inventory based at least in part on the identified at least one infrastructure element of the inventory associated with the at least one model element, wherein the bound system model comprises one or more element bindings that associate respective model elements of the abstract system model with corresponding infrastructure elements of the inventory, one or more data bindings that associate metric data of the corresponding infrastructure elements with respective element bindings, and one or more relationship bindings that identify relationships among the element bindings; and outputting, by the one or more processors, data indicative of a status of the deployed system infrastructure, an incident occurring within the deployed system infrastructure, or both, the data generated using the bound system model.

2. The method of claim 1, wherein the one or more infrastructure elements comprise:

one or more physical elements of the deployed system infrastructure, one or more virtual elements of the deployed system infrastructure, or a combination thereof.

3. The method of claim 1, wherein building the inventory of the one or more infrastructure elements comprises obtaining information regarding the one or more infrastructure elements from:

a service hosting the deployed system infrastructure, an application programming interface (API), or a combination thereof.

4. The method of claim 1, wherein the respective one or more selectors of the at least one model element include, in the indication of the at least one infrastructure element associated with the at least one model element, one or more aspects of an ancestor element, the one or more aspect of the ancestor element used to determine the one or more associations between the one or more model elements of the abstract system model and the inventory of the one or more infrastructure elements.

5. The method of claim 4, wherein the one or more aspects of the ancestor element comprise:

a label of the ancestor element, a property of the ancestor element, or a combination thereof.

6. The method of claim 4, wherein identifying the at least one infrastructure element of the inventory associated with the at least one model element comprises:

(i) evaluating a first portion of the respective one or more selectors of the at least one model element that do not reference to the ancestor element, (ii) subsequent to operation (i), evaluating a second portion of the respective one or more selectors of the at least one model element that reference the ancestor element, and (iii) repeating operations (i) and (ii) until all of the respective one or more selectors of the at least one model element are evaluated.

7. The method of claim 4, wherein identifying the at least one infrastructure element of the inventory associated with the at least one model element comprises using:

a label-based match, a query, a heuristic, or a combination thereof.

8. The method of claim 1, wherein the respective one or more selectors of the at least one model element include, in the indication of the at least one infrastructure element associated with the at least one model element, one or more variables to substitute for one or more aspects of an ancestor element of the at least one model element.

9. The method of claim 1, wherein the at least one model element comprises a stream of telemetry associated with an ancestor element, the stream of telemetry comprising:

a metric, a log, an event trace, or a combination thereof.

10. The method of claim 1, wherein a child element comprises a relationship between abstract system model elements and/or inventory elements.

11. The method of claim 1, further comprising updating the bound system model in response to a detected change in the inventory of the one or more infrastructure elements.

12. The method of claim 11 further comprising maintaining a history indicative of times at which the bound system model is updated.

13. A system comprising at least one processor and memory storing instructions which, when executed, cause the system to perform:

generating an abstract system model comprising one or more model elements corresponding to one or more infrastructure elements of the deployed system infrastructure, wherein:

each model element of the one or more model elements specifies one or more selectors, and for each model element of the one or more model elements, each selector of the respective one or more selectors of the model element includes an indication of at least one infrastructure element, from the one or more infrastructure elements, that is associated with the model element;

building an inventory of the one or more infrastructure elements;

for at least one model element of the one or more model elements, identifying the at least one infrastructure element of the inventory associated with the at least one model element as indicated by the respective one or more selectors of the at least one model element;

generating a bound system model by combining the inventory of the one or more infrastructure elements with the abstract system model based on the one or more model elements, the respective one or more selectors of the one or more model elements, or a combination thereof, the bound system model mapping the one or more model elements of the abstract system model to corresponding infrastructure elements from the inventory based at least in part on the identified at least one infrastructure element of the inventory associated with the at least one model element, wherein the bound system model comprises one or more element bindings that associate respective model elements of the abstract system model with corresponding infrastructure elements of the inventory, one or more data bindings that associate metric data of the corresponding infrastructure elements with respective element bindings, and one or more relationship bindings that identify relationships among the element bindings; and outputting data indicative of a status of the deployed system infrastructure, an incident occurring within the deployed system infrastructure, or both, the data generated using the bound system model.

14. The system of claim 13, wherein the one or more infrastructure elements comprise:

one or more physical elements of the deployed system infrastructure, one or more virtual elements of the deployed system infrastructure, or a combination thereof.

15. The system of claim 13, wherein building the inventory of the one or more infrastructure elements comprises obtaining information regarding the one or more infrastructure elements from:

a service hosting the deployed system infrastructure, an application programming interface (API), or a combination thereof.

16. The system of claim 13, wherein the respective one or more selectors of the at least one model element include, in the indication of the at least one infrastructure element associated with the at least one model element, one or more aspects of an ancestor element, the one or more aspect of the ancestor element used to determine the one or more associations between the one or more model elements of the abstract system model and the inventory of the one or more infrastructure elements.

17. A non-transitory computer-readable storage medium comprising instructions which, when executed by one or more hardware processors, cause performance of a set of operations comprising:

generating an abstract system model comprising one or more model elements corresponding to one or more infrastructure elements of the deployed system infrastructure, wherein:

each model element of the one or more model elements specifies one or more selectors, and for each model element of the one or more model elements, each selector of the respective one or more selectors of the model element includes an indication of at least one infrastructure element, from the one or more infrastructure elements, that is associated with the model element;

building an inventory of the one or more infrastructure elements;

for at least one model element of the one or more model elements, identifying the at least one infrastructure element of the inventory associated with the at least one model element as indicated by the respective one or more selectors of the at least one model element;

generating a bound system model by combining the inventory of the one or more infrastructure elements with the abstract system model based on the one or more model elements, the respective one or more selectors of the one or more model elements, or a combination thereof, the bound system model mapping the one or more model elements of the abstract system model to corresponding infrastructure elements from the inventory based at least in part on the identified at least one infrastructure element of the inventory associated with the at least one model element, wherein the bound system model comprises one or more element bindings that associate respective model elements of the abstract system model with corresponding infrastructure elements of the inventory, one or more data bindings that associate metric data of the corresponding infrastructure elements with respective element bindings, and one or more relationship bindings that identify relationships among the element bindings; and outputting data indicative of a status of the deployed system infrastructure, an incident occurring within the deployed system infrastructure, or both, the data generated using the bound system model.

18. The non-transitory computer readable medium of claim 17, wherein the one or more infrastructure elements comprise:

one or more physical elements of the deployed system infrastructure, one or more virtual elements of the deployed system infrastructure, or a combination thereof.

19. The non-transitory computer readable medium of claim 17, wherein building the inventory of the one or more infrastructure elements comprises obtaining information regarding the one or more infrastructure elements from:

a service hosting the deployed system infrastructure, an application programming interface (API), or a combination thereof.

20. The non-transitory computer readable medium of claim 17, wherein the respective one or more selectors of the at least one model element include, in the indication of the at least one infrastructure element associated with the at least one model element, one or more aspects of an ancestor element, the one or more aspect of the ancestor element used to determine the one or more associations between the one or more model elements of the abstract system model and the inventory of the one or more infrastructure elements.

* * * * *